United States Patent
LaPier et al.

(10) Patent No.: US 6,333,931 B1
(45) Date of Patent: *Dec. 25, 2001

(54) METHOD AND APPARATUS FOR INTERCONNECTING A CIRCUIT-SWITCHED TELEPHONY NETWORK AND A PACKET-SWITCHED DATA NETWORK, AND APPLICATIONS THEREOF

(75) Inventors: David C. LaPier, New Providence, NJ (US); David R. Oran, Acton, MA (US); Clay H. Neighbors, Reston; Khaled A. Gouda, Herndon, both of VA (US); Andrew Adamian, Potomac, MD (US)

(73) Assignee: Cisco Technology, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/221,912

(22) Filed: Dec. 28, 1998

(51) Int. Cl.[7] .................................................. H04Q 11/00
(52) U.S. Cl. ......................... 370/385; 370/410; 370/352
(58) Field of Search .................................. 370/352–563, 370/385, 466, 467, 410, 522; 379/88.17, 202, 201.01–201.05, 201.11, 201.12, 202.01, 203.01; 348/14

(56) References Cited

U.S. PATENT DOCUMENTS

| | | | |
|---|---|---|---|
| 5,793,771 | * 8/2000 | Darland et al. | 370/467 |
| 5,828,666 | * 10/1998 | Focsaneau et al. | 370/389 |
| 5,862,339 | * 1/1999 | Bonnaure et al. | 709/227 |
| 5,898,839 | * 4/1999 | Berteau | 709/227 |
| 5,933,490 | * 8/1999 | White et al. | 379/221 |
| 5,987,118 | * 11/1999 | Dickerman et al. | 379/264 |
| 6,021,126 | * 10/1998 | White et al. | 370/352 |
| 6,084,892 | * 7/2000 | Benash et al. | 370/701 |
| 6,111,893 | * 8/2000 | Volfsun et al. | 370/466 |
| 6,112,305 | * 8/2000 | Dancs et al. | 713/156 |

* cited by examiner

Primary Examiner—Chau Nguyen
Assistant Examiner—Jasper Kwoh
(74) Attorney, Agent, or Firm—Hickman Palermo Truong & Becker LLP; Christopher J. Palermo

(57) ABSTRACT

A method and apparatus are disclosed for interconnecting a circuit-switched telephone network and a packet-switched data network for communication among them. A signaling trunk of a circuit-switched telephone network is coupled to a signaling access server that is also coupled to a signaling, management and control network. One or more voice trunks of the telephone network are coupled to one or more network access servers, which are also coupled to the control network to thereby receive instructions from the signaling access server. The network access servers are also coupled to a packet-switched data network, such as the global packet-switched network known as Internet. The signaling access server can receive call setup messages and other messages in standard telephone network protocol formats and convert them into call setup messages in a special protocol for communications between the signaling access server and the network access servers. The signaling access server can instruct the network access servers to establish a call, containing voiceband information such as modem-based data calls, from the voice trunks to the data network. Accordingly, the public switched telephone network and the Internet may be interconnected and may inter-communicate without modifying the protocols of either one.

19 Claims, 23 Drawing Sheets

METHOD AND APPARATUS FOR INTERCONNECTING A CIRCUIT-SWITCHED TELEPHONY NETWORK AND A PACKET-SWITCHED DATA NETWORK, AND APPLICATIONS THEREOF

FIELD OF THE INVENTION

The present invention generally relates to telecommunications. The invention relates more specifically to interconnecting a circuit-switched telephone network to a packet-switched data network, and methods of using the interconnected networks.

BACKGROUND OF THE INVENTION

The public switched telephony network (PSTN) is made up of carriers who have agreements to interconnect with one another and switch calls to among one another. The PSTN comprises numerous switching systems, which are stored program controlled computers comprising line terminations. The switching systems connect to other switching systems, forming indirect links from customer premises to customer premises around the world.

In a common channel signaling (CCS) network, switching systems interconnect using bearer channels and signaling channels. Bearer channels generally are 64 kbit/second channels that carry voice traffic such as modem calls. Signaling channels carry call information in a separate network; this is known as out-of-band signaling because call signaling information is communicated outside the audible voice band of calls. ITU Recommendation Q.700 describes this type of PSTN in detail.

Only carriers may connect to the signaling network. However, as a result of national and international deregulation of telephone systems, many new carriers are entering or are about to enter the field. For example, in the United States, in the past there have been approximately seven (7) major signaling carriers and numerous independent carriers, but in the future, there will be many new local exchange carriers. Internet Service Providers (ISPs), for example, are expected to rush into the local exchange switching market.

In a regulated environment, the major signaling carriers could establish common standards and rely on trust of one another to ensure that proper signals were carried in the signaling network. In a deregulated environment, the signaling network is perceived as a less trustworthy environment. In particular, in the past, the physical security of SS7 switching facilities provided the primary overall security of an SS7 switching network. Now, there is less assurance that new carriers will maintain the same level of physical facility security that the major carriers have enforced in the past.

Further, in the deregulated environment, a carrier cannot be trusted to connect to the network and use it in a proper manner. For example, a carrier could generate calls for no reason. A carrier could claim to have reachability to another location when in fact it doesn't have that capability. A carrier could express state information about its circuits incorrectly. A carrier could generate Initial Address Messages to distant switches and then wait for them to time out. All these operations are improper and potentially harmful to other network elements and to the private data networks that are connected to such network elements.

In data networks, firewalls are available that are based on UNIX computer systems, and may operate in standalone fashion or are integrated into routers. Firewalls can be used to selectively admit or deny data packets based on rules or policies. Such firewalls, however, cannot be used in SS7 telephone networks or their component systems because their hardware and software is incompatible. For example, lower SS7 messaging layers require unique firmware and hardware for terminating trunks. Further, SS7 is a message-oriented protocol that requires the use of special messages for graceful startup and shutdown of links. These messages are not supported in available firewalls.

Accordingly, there is a need to improve signaling security and data channel security between signaling network entities.

In particular, there is a need to protect internetworks, LANs and WANs from undesirable, undefined, or malicious signals and messages originating in local exchange carriers or other carriers outside such data networks.

There is also a need for a system and method that can interconnect a data network, and servers thereof, to a circuit-switched telephony network that uses time-division multi-plexed signaling, for a variety of purposes. In particular, there is a need for a system and method that can interconnect a data network to a circuit-switched telephony network that uses Signaling System 7 protocols for signaling.

SUMMARY OF THE INVENTION

The foregoing needs and objects, and other needs and objects that will become apparent from the following description, are fulfilled by the present invention, which comprises, in one aspect a telecommunications apparatus that can interconnect a circuit-switched telephone network and a packet-switched data network to enable communication among the networks. The apparatus has a first server coupled to a signaling trunk of the telephone network to interchange call signaling messages therewith, and coupled to a control network. One or more second servers each are coupled to a voice trunk of the telephone network to communicate voice-band information thereon, and coupled to receive instructions from the first server through the control network, and coupled to the data network to communicate data thereon. First and second software components are executed by and controlling the first server and the second server, respectively, and interact cooperatively to establish a call originating in the telephone network and containing voiceband information and terminating in the data network, based on call signaling information received from the signaling trunk by the first server.

One feature of this aspect is that the first and second software components interact cooperatively to establish a call originating at one of the second servers and containing voiceband information and terminating in the telephone network, based on call signaling information generated by the first server and provided on the signaling trunk.

Another feature is that the second servers are coupled to the data network by an Internet Protocol (IP) backbone apparatus, and the second servers are coupled to the first server and to a management network by the control network, and the control network, the management network, the first server, and the second server communicate using IP.

In another feature, the signaling trunk and the voice trunk originate in a Common Channel Signaling telephone network. Another feature is that the signaling trunk is a Signaling System 7 (SS7) trunk, and the data network is a global, packet-switched network that operates using Internet Protocol (IP) and Transmission Control Protocol (TCP). According to another feature, the signaling trunk is coupled to a Signal Transfer Point of the telephone network and each of the second servers is coupled to receive the voiceband information from a switch of the telephone network.

In yet another feature, the signaling trunk is coupled from the first server to a digital cross connect apparatus that is coupled to the telephone network, and each of the second servers is coupled by an associated voice trunk to the digital cross connect apparatus to receive the voiceband information therefrom. Still another feature is that the apparatus includes a cross-connect apparatus logically coupled between the telephone network and both the signaling trunk and the voice trunk, and means, coupled between the signaling trunk and the first server, for communicating call routing signals from the digital cross-connect apparatus through the signaling trunk and to the first server. The software components are configured to receive call signaling messages from the means for communicating and over the control network, and to communicate the call signaling messages back over the control network to the second servers.

Still another feature is that the software components comprise instructions which, when executed by the first server, cause the first server to carry out the steps of receiving a call setup message from the telephone network that contains a master telephone number; sending a responsive message to the telephone network that contains a specific telephone number associated with one of the second servers; and setting up a call between the telephone network and one of the second servers that is associated with the specific telephone number. A related feature is that the software components further comprise instructions which, when executed by the first server, cause the first server to carry out the steps of receiving a call offer message from the telephone network that contains the specific telephone number.

Another related feature is that the software components further comprise instructions which, when executed by the first server, cause the first server to carry out the steps of determining that the one of the second servers has insufficient resources to set up the call; communicating a call release message from the first server to the telephone network; communicating a second responsive message from the first server to the telephone network, wherein the second responsive message contains a second specific telephone number that is associated with a second one of the second servers.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for interconnecting a circuit-switched telephony network and a packet-switched data network are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

System Overview

The present disclosure will describe an invention which, in one embodiment, provides a distributed system for interconnecting one or more Network Access Servers, which are coupled to a data network such as the Internet, to a circuit-switched Time Division Multiplexing telephone network that uses Signaling System 7 protocols for signaling. The interconnection is achieved, in part, using a protocol converter that is configured as a Signaling Access Server ("SAS") and that interworks with a Network Access Server ("NAS"). "Interworks" means, for example, that the Signaling Access Server commands and manages the Network Access Servers using a signaling and control network; it is also possible for the NAS to place outgoing calls through the SAS to an SS7 network.

Figure 1A:
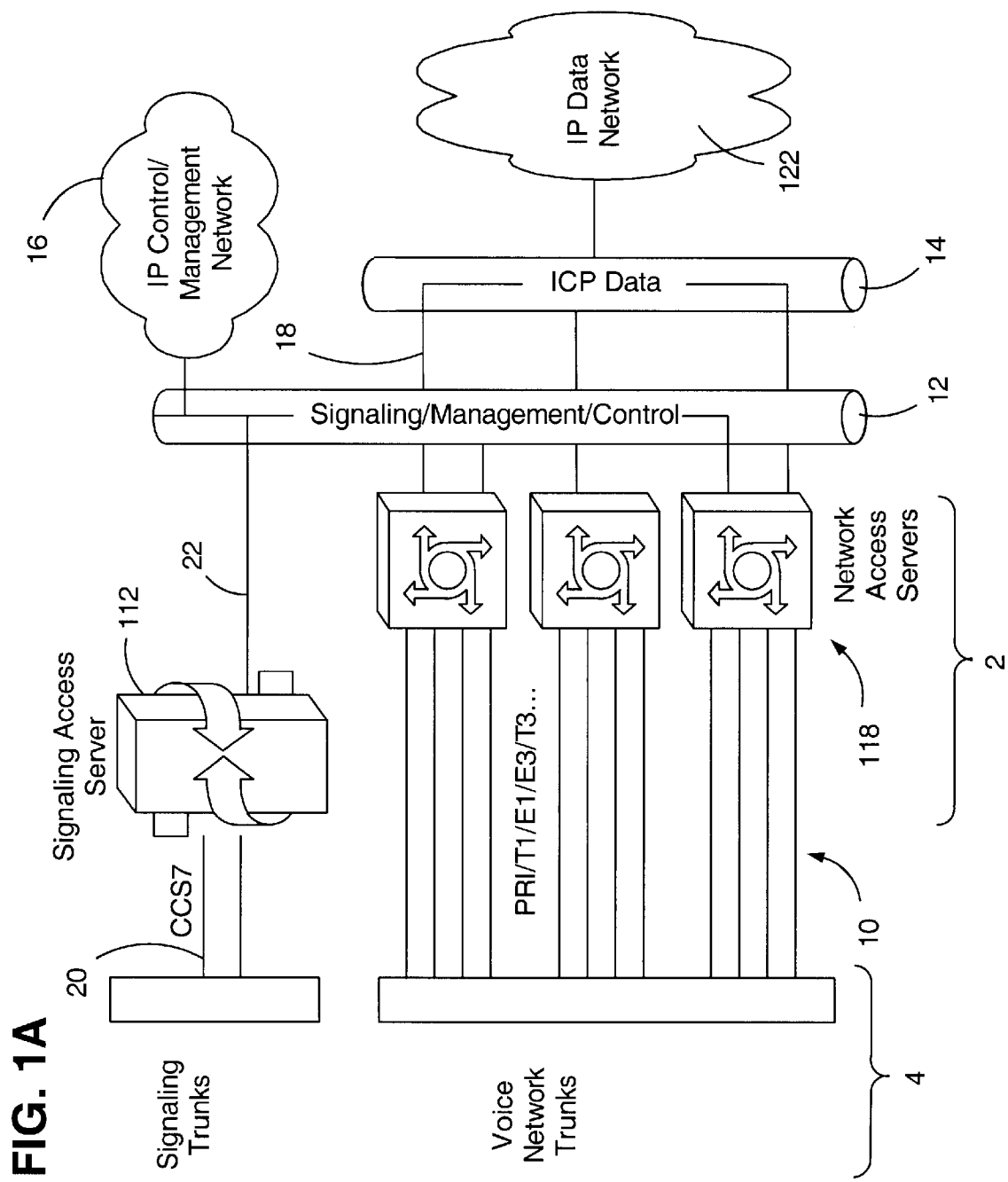
FIG. 1A is a block diagram of a preferred embodiment of a call monitoring system coupled to a telephony network and a data network.

FIG. 1A is a block diagram of the logical placement of a preferred embodiment of a call monitoring system 2 within a telephony network 4 and a data network. System 2 comprises one or more Network Access Servers 118, located at one or more service provider points of presence. Each Network Access Server 118 is coupled to and provides termination for a pre-determined number of voice network trunks 10. Each Network Access Server 118 has a first Internet Protocol network interface coupled to a data network backbone 14 and a second Internet Protocol network interface coupled to the service provider's management, signaling and control network 12. There may be more than two IP network interfaces so that the system supports redundant IP links for communication between the NAS and SAS.

The data network backbone 14 is coupled to an external IP data network 122, such as the Internet. The data network backbone is owned and operated by the service provider, which may be an Internet Service Provider. The service provider's management, signaling and control network 12 is generally maintained securely, according to telephone industry standards, and is generally more trusted than the IP data network 122.

The voice network trunks 10 may originate from any type of Time Division Multiplexing network infrastructure, and may be ISDN Primary Rate Interface trunks, T1 trunks, E1, T3, E3, etc. The voice network trunks 10 are matched with compatible digital interfaces at each Network Access Server 118. In the preferred embodiment, the voice network trunks 10 comprise only bearer channels. Thus, the voice network trunks do not carry associated signaling channels. Instead, all signaling channels of telephone network 4 terminate at Signaling Access Server 112.

One or more Signaling Access Servers 112 are coupled to one or more SS7 signaling trunks 20. Each Signaling Access Server 112 terminates the SS7 signaling links and handles voice network maintenance messages, as well as call control messages. A particular Signaling Access Server 112 may be co-located with the Network Access Servers 118, or located near a circuit switch or Service Control Point of a telephone service provider. One Signaling Access Server 112 may provide signaling and call processing services for a large number of Network Access Servers 118. Each Signaling Access Server 112 may be replicated for redundancy. From the point of view of the network 4, each Signaling Access Server 112 represents a terminating and originating Service Control Point.

The SS7 signaling trunks 20 may be A-Links, or F-Links that have been separated from their associated voice trunks and delivered to the Signaling Access Server 112 using separate facilities. Alternatively, SS7 signaling may be backhauled over voice network trunks 10. In still another alternative, the SS7 signaling may be encapsulated by a separate apparatus and backhauled over the IP Control/Maintenance Network 16.

The Signaling Access Server 112 communicates with the Network Access Servers 118 over the management, signaling and control network 12. The Signaling Access Server 112 is coupled to the management, signaling and control network 12 by connection 22. Preferably, Signaling Access Server 112 communicates over the network 12 with Network Access Servers 118 using an agreed-upon protocol, which may be similar to the UDP protocol. Advantageously, only layer 3 of the ISDN protocol is needed when the system operates using UDP.

Functions of the Signaling Access Server 112 include SS7 signaling; carrying out call control in communication with a Network Access Server; establishing and managing bi-directional calls; fault management; compiling and reporting on telephony statistics; implementing custom features; and providing call detail accounting.

Each Network Access Server 118 provides bearer channel termination; implements modem pools; provides IP routing; implements authentication, authorization, and accounting (AAA) functions; generates telephony tones using digital signal processors; provides virtual private network management; manages faults that occur with bearer channels; and compiles and reports on statistical information relating to bearer channels. For example, a Network Access Server 118 may provide routing functions that carry out authentication functions and call completion functions. Preferably, each Network Access Server 118 has a Q.931 protocol stack for use with ISDN Primary Rate Interface (PRI). Each NAS also contains a time division multiplexer (TDM) that chooses a channel and selects and assigns a free modem from among the modems in the NAS. Each NAS may accept a loopback circuit, which may be accomplished by installing a driver and modifying microcode that controls the TDM so as to permit circuits to go into a loopback.

Figure 1B:
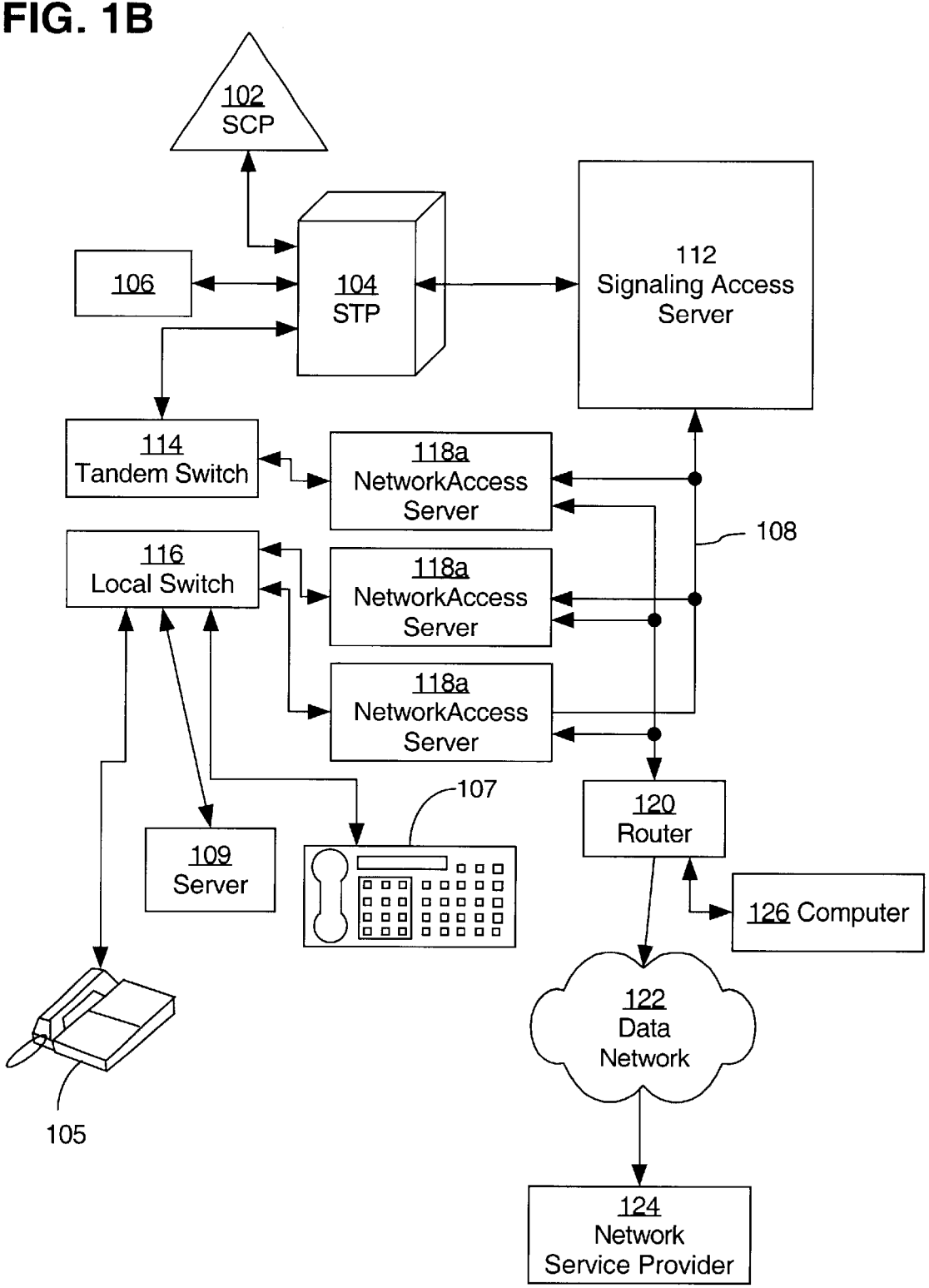
FIG. 1B is a network diagram of further details of the system of FIG. 1A.

FIG. 1B is a network diagram of further details of the system of FIG. 1A. Signaling Access Server 112 is coupled to a local area network or LAN 108 that comprises numerous network devices, such as Network Access Servers 118a–118c. An example of a Network Access Server is the Cisco Model AS5300, commercially available from Cisco Systems, Inc., San Jose, Calif. Such Network Access Servers contain modems or digital signal processors for handling data calls communicated between nodes of the LAN 108 and external nodes such as server 109.

FIG. 1B shows an exemplary configuration in which only one Signal Transfer Point (STP) 104 of one carrier is coupled to Signaling Access Server 112. Thus, there is only one external point at which signaling information from network 4 can reach Signaling Access Server 112. However, many Signaling Access Servers 112 may be connected to numerous carriers. In this environment, there is an acute need to protect the Signaling Access Server 112, and the LAN 108, from malicious or undesirable signaling messages, requests, or other information.

Signaling Access Server 112 communicates using SS7 messages. The SS7 messages are communicated using a stack comprising ISUP format messages, MTP-3 format messages, MTP-2 format messages, and MTP-1 format messages. The stack may also use TCAP, SCCP, MTP-3, MTP-2, and MTP-1 protocols.

Figure 1C:
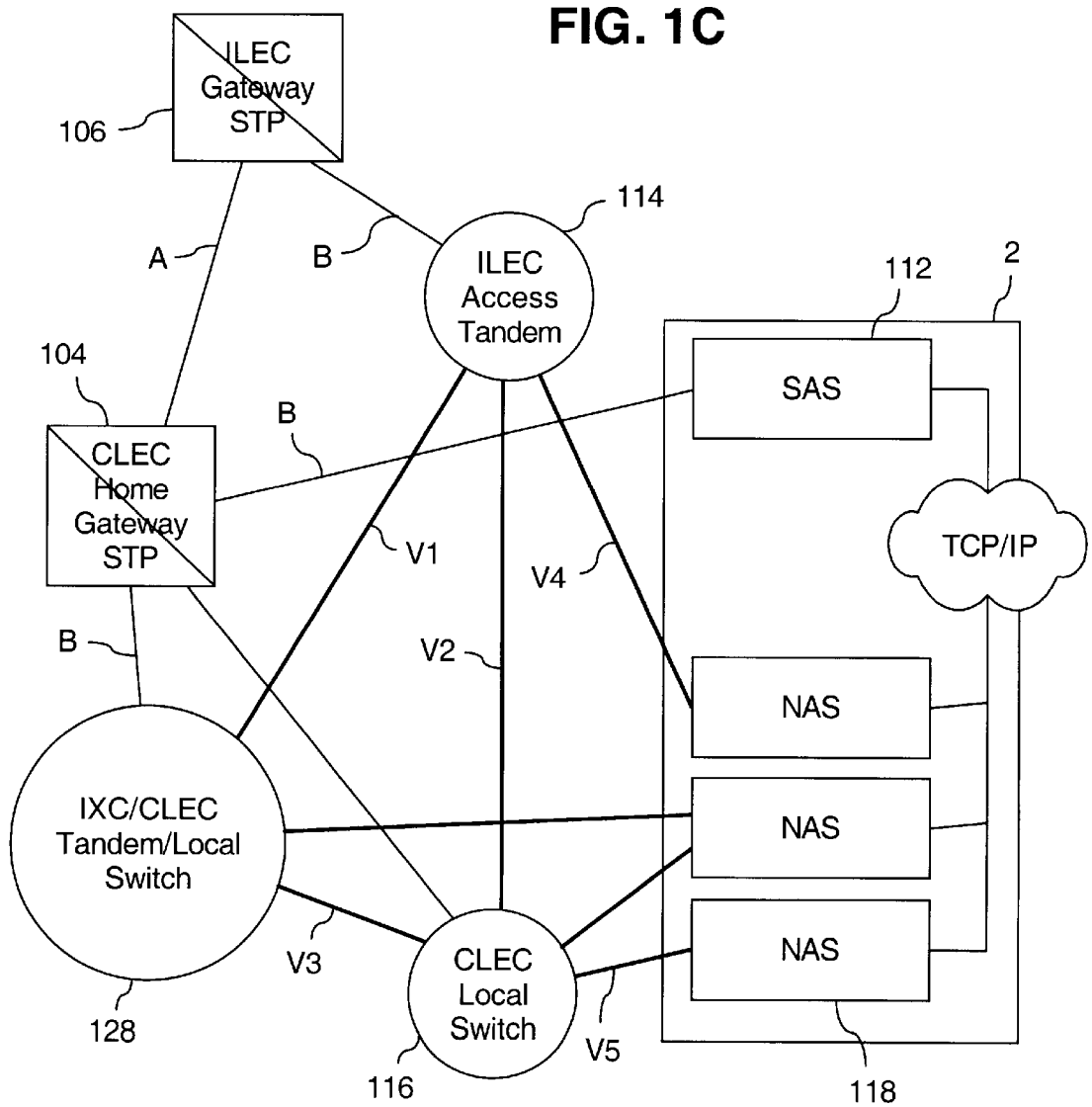
FIG. 1C is a block diagram of the logical placement of a preferred embodiment of the system of FIG. 1A.

FIG. 1C is a block diagram of the logical placement of a preferred embodiment of the system 2 in a telephone network. Signaling Access Server 112 is coupled by an A-link to Signal Transfer Point (STP) 104, which may be associated with a Competitive Local Exchange Carrier (CLEC) home gateway. The Network Access Servers 118 are coupled by voice links V to one or more switches such as local switch 116, tandem switch 114, and tandem/local switch 128. The STP 104 may be coupled by a B-link to another STP 106 that is associated with an Incumbent Local Exchange Carrier (ILEC) gateway. The STP 106 may be coupled to the tandem switch 114 and if so, the tandem switch thereby provides ILEC access. The STP 104 is also coupled by A-links to the tandem/local switch 128 and local switch 116. The tandem/local switch 128 communicates with an inter-exchange carrier and a CLEC where as the local switch 116 is associated with the CLEC. In this configuration, the system 2 emulates an end office switch that terminates calls.

Signal transfer points 104, 106 generally comprise packet switches that create a star network for communication of signaling information. An STP may carry out global title translation and other network-related services. Service control points, such as SCP 102, carry out network-related services, such as global title translation or mapping an 800-type telephone number to an address or point code. The general structure and functions of STPs and SCPs are well known in the field.

In the preferred embodiment, the Signaling Access Server 112 and Network Access Servers 118 communicate using a special signaling protocol. In one embodiment, the special signaling protocol is based on Q.931 with certain custom enhancements. Alternatively, the communications may involve delivering the SS7 signaling directly to the Network Access Server and having it operate as an SS7 signaling point itself. The preferred embodiment, however, has several important advantages, including:

1. The Network Access Server 118 need not implement SS7 protocols, especially certain low-level legacy protocols such MTP-1 or MTP-2, which are burdensome and may require special hardware or firmware.
2. The Network Access Server 118 can be configured with increased capacity ("scaled") according to the number of bearer channels supported in a particular platform. In contrast, not all platforms are well suited to the task of terminating SS7 signaling.
3. Configuring the SS7 signaling in a separate platform permits aggregation and improved management, because the Signaling Access Servers and Network Access Servers need not be co-located. In contrast, one Signaling Access Server can service many Network Access Servers that are in different geographic locations.
4. The Signaling Access Server is specialized for signaling termination and conversion. Accordingly, it can be more easily optimized for high performance and scalability.
5. The SAS can provide signal interworking between the Network Access Servers and the large number of SS7 variants that are currently in use around the world, without adding complexity to the Network Access Servers.
6. The SAS is implemented based on a general-purpose computer system that implements various open standards. Therefore, the computer system can host other applications, and interface more easily with existing applications running on other hosts.
7. There is no need to expand or upgrade end-office telephone call switches to deal with increased traffic. Instead, the SAS can be scaled-up, and can be scaled-up less expensively than modifying a switch.
8. The SAS enables custom features to be added more easily.
9. The SAS can provide interfaces to Intelligent Network applications to provide intelligent call routing. Intelligent call routing helps obtain optimal usage of Network Access Server resources.

Connecting the System in the Networks

An advantage of the system 2 is that it can be deployed in a variety of different contexts. For example, current telecommunications systems involve differing markets such as ILEC, CLEC, IXC, and ISP; systems having greatly varying scales or sizes, such as from 100 to many thousands of signaling channels; different geography such as single site, metropolitan area, national, or international, and different SS7 signaling link topologies.

In the simplest configuration, the system 2 is coupled to a system that uses all A-links, which are delivered directly over TDM multiplexed trunks to the Signaling Access Server 112, regardless of the location of the SAS. Generally, such A-links use T1/E1 or V.35 interfaces that can terminate directly onto I/O cards that are in the Signaling Access Server 112, as shown in FIG. 1A.

Figure 2A:
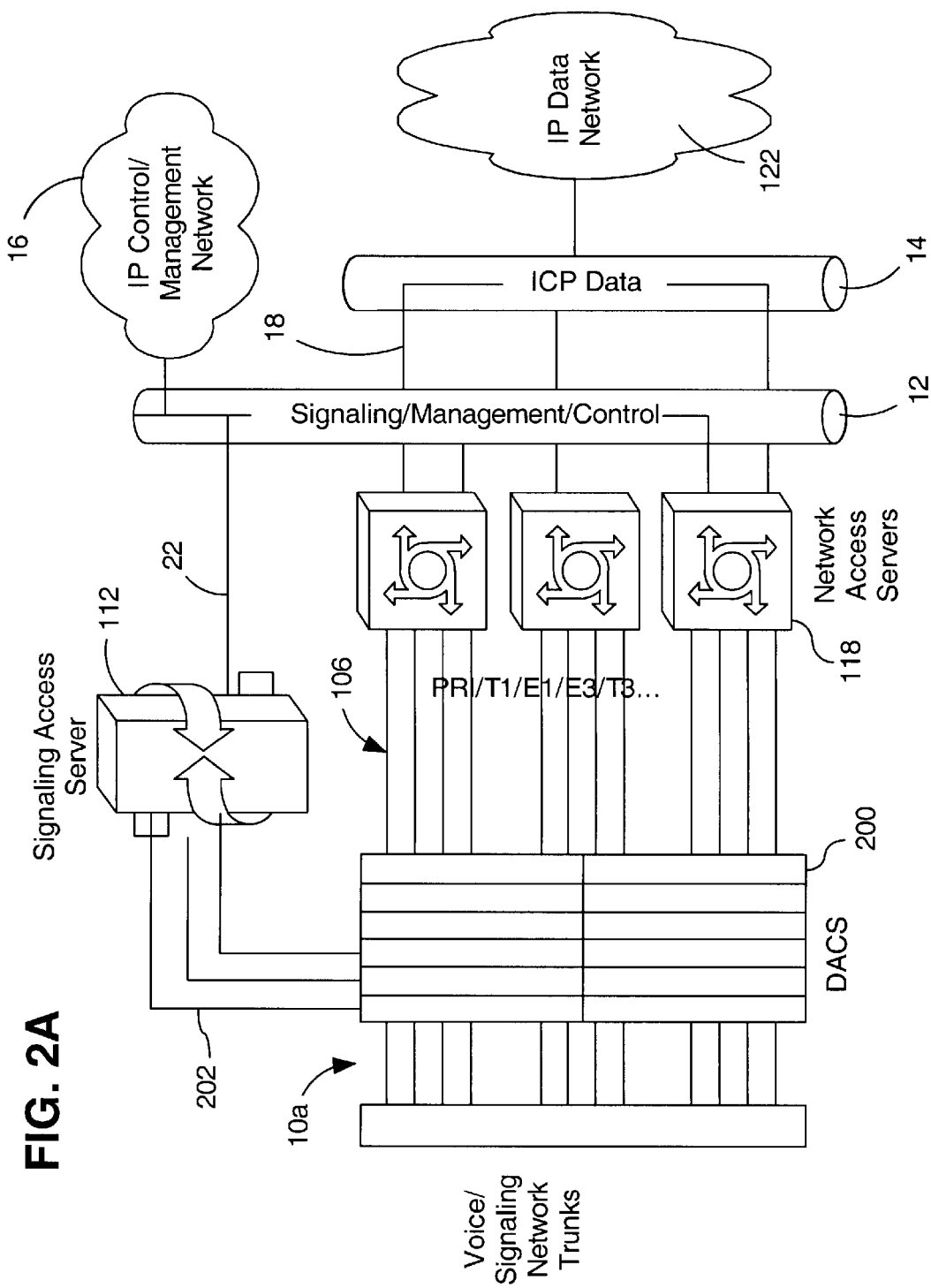
FIG. 2A discloses an alternate configuration of the system of FIG. 1C.

FIG. 2A discloses an alternate configuration, in which the SS7 system uses F-links. Each F-link is multiplexed in the SS7 trunks, and DS0s carry bearer traffic. In this configuration, the signaling channels need to be separated out ("groomed") and delivered to the SAS. Voice/signaling network trunks 10a are coupled to a digital cross-connect 200, such as an add/drop multiplexer. Signaling channel information is groomed from the trunks 10a and delivered on signaling trunks 202, which are coupled to Signaling Access Server 112. The voice/signaling network trunks 10a are also passed through unchanged and provided to the Network Access Servers 118, as indicated by trunks 10b.

Figure 2B:
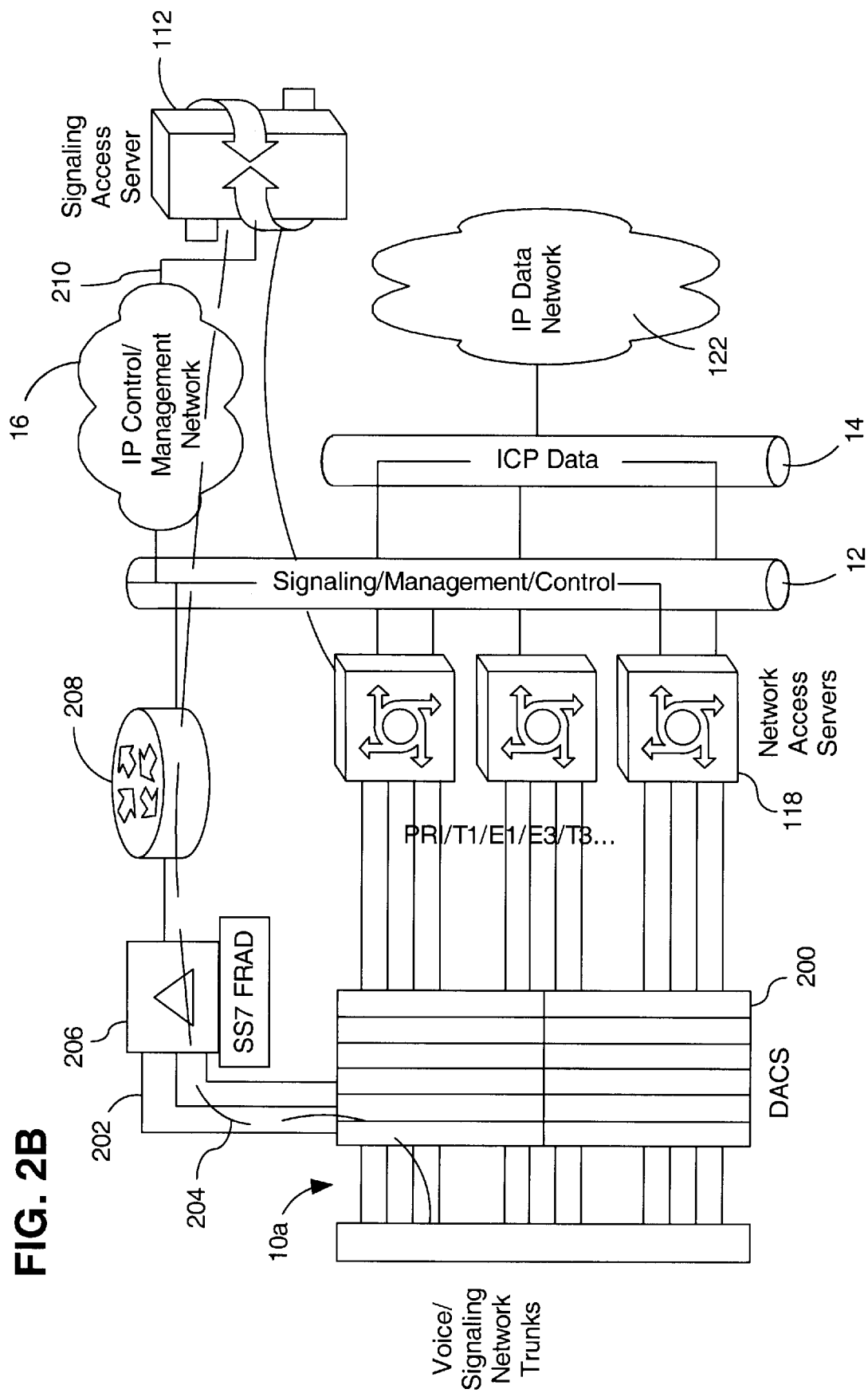
FIG. 2B discloses another alternate configuration of the system of FIG. 1C.

FIG. 2B discloses yet another alternate configuration, in which the SAS is not physically co-located with the Network Access Servers. In this configuration, the cost and difficulty of backhauling the separated F-links from the digital cross-connect 200 to the SAS may be substantial. Additional multiplexing equipment may be needed to groom the signaling links and additional circuits may be needed to bring the signaling back to the Signaling Access Server. Accordingly, one approach is to tunnel certain F-link protocols, such as MTP-3 and higher protocols, through the IP control/management network 16. As shown in FIG. 2B, voice/signaling network trunks 10a arrive at the digital cross-connect 200. F-link protocol information is groomed from the trunks 10a and coupled to an SS7 FRAD 206 by trunks 202. Generally, the path of the separated F-link information is shown by line 204. FRAD 206 is coupled to a device 208, which is coupled to the signaling and management control network 12. The SS7 FRAD 206 terminates the lower layers of the SS7 protocol stack and transports the upper layers, such as layer MTP3 and above, over a packet network. The F-link information is communicated through IP control/management network 16 and arrives at the Signaling Access Server 112 over IP protocol link 212.

The foregoing configurations rely upon a IP intranet, in the form of backbone 14 and network 18. Accordingly, the IP connections of the Signaling Access Server 112 and Network Access Server 118 must be reliable. Therefore, it is preferable to provide dual, fault-tolerant IP connections to backbone 14 and network. It is also desirable for Signaling Access Server 112 and Network Access Servers 118 to have fault-tolerant software that can switch from a first connection to a second connection when the first connection fails.

The Network Access Server

The Network Access Server 118 acts as the interworking gateway between the public switched telephone network and the data network. The Network Access Server comprises, in combination, the functionality of a router, TDM data bus, and a plurality or pool of DSPs or DSP resources. The Network Access Server includes an interface to the telephone network and to the data network. The Network Access Server 118 also terminates the bearer trunks that carry modem or ISDN circuit-data calls over the telephone network. The router component of the Network Access Server interprets signaling and directs the bit-stream of the call to the appropriate DSP for analog-to-digital conversion. The NAS interprets signaling and authorization packets for AAA functions, and routes the packetized information to its appropriate destination.

Figure 12:
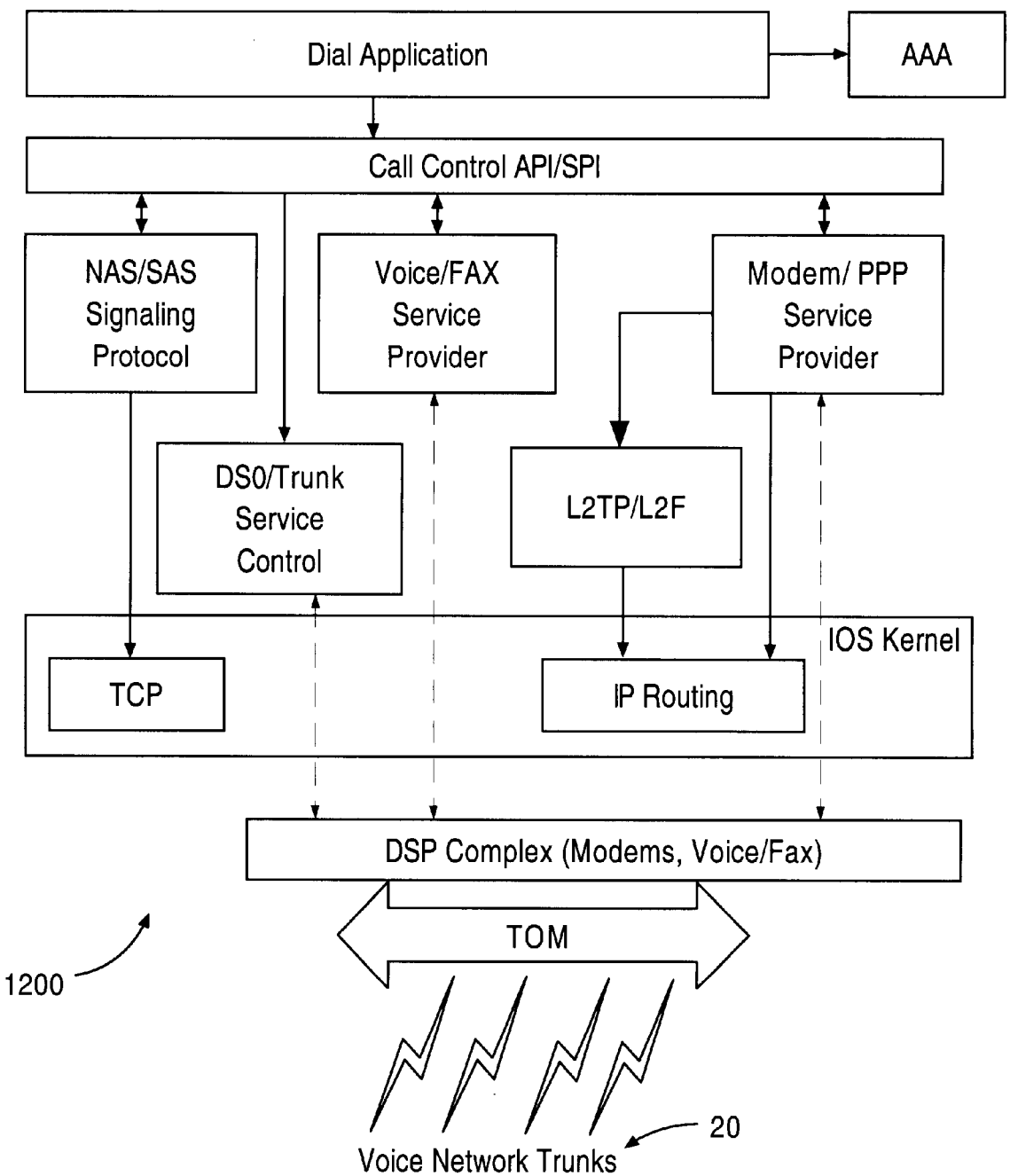
FIG. 12 is a block diagram of an embodiment of software elements that may be executed by Network Access Server.

In the preferred embodiment, each Network Access Server 118 is a programmed computer system that has the general functions provided by Model AS5200, AS5300, or AS5800, which are commercially available from Cisco Systems, Inc. FIG. 12 is a block diagram of an embodiment of a software architecture 1200 that may be executed by Network Access Server 118.

Signaling Access Server 112

In the preferred embodiment, Signaling Access Server 112 is a telecommunications network protocol interworking apparatus, or protocol converter, that provides the capability to interwork signaling protocols such as Q.931, SS7/C7, and others. In the preferred embodiment, each Signaling Access Server 112 is a programmed computer system that has the general functions provided by the SC2200 signaling controller, commercially available from Cisco Systems, Inc., and that is configured as set forth in this document. The Signaling Access Server 112 may support the protocols, messages, information elements, and information element mappings described in APPENDIX 1 to this document.

FUNCTIONS

In the preferred embodiment, each Signaling Access Server 112 implements the following functions. One or many of the functions may be omitted in alternative embodiments, and therefore, the following function list should be regarded as exemplary and not as a list of absolute requirements.

1. Protocol interworking between SS7 and Network Access Servers.
2. Element management, provided using a command-line interface that provides alarm and performance management.
3. Call detail records.
4. Basic trace capability for protocol conversion operations.
5. Application programming interface to enable applications to run on the SAS and perform custom actions.
6. Support for quasi-associated links and fully-associated links.
7. Support for co-located and distributed Network Access Servers.
8. Resource management and call control functions.
9. Local number portability and terminating functions.

In some embodiments, the SAS may provide one or more of the following functions:

1. Generation of call detail records in custom formats.
2. Originating switch functions.
3. Management and counting of virtual private network sessions.
4. Custom routing of calls to different Network Access Server resource pools.
5. Call screening based on calling line identifiers.
6. Number manipulation and translation.
7. Custom protocol development to accommodate proprietary protocol variants of different carriers or equipment manufacturers.
8. Service creation environment.
9. Conversion analyzer.
10. Connection to SSPs in an advanced intelligent network.
11. Statistical data collection for traffic analysis.
12. PBX feature transparency.
13. Initiating outbound calls into the SS7 network.
14. User authentication and privacy, beyond the features of the conventional SS7 network, such that access to the data network 122 is carried out in a secure manner.

HARDWARE OVERVIEW

A signal Access Server 112 may be implemented based on the protocol converter that is described in more detail in U.S. Pat. No. 6,111,893 entitled "Universal Protocol Conversion," issued on Aug. 29, 2000, by Lev Volftsun, Clay H. Neighbors, David S. Turvene, Fred R. Rednor, Anatoly V. Boshkin, and Mikhail Rabinovitch, the entire contents of which are hereby incorporated by reference as if fully set forth herein. The above-reference as if fully set forth herein. The above-referenced patent document discloses structural and functional details of an embodiment of a protocol converter that can be used to implement the Signaling Access Server 112. For purposes of context in this document, however, an overview of such structures and functions in an alternative embodiment is now provided.

Figure 13:
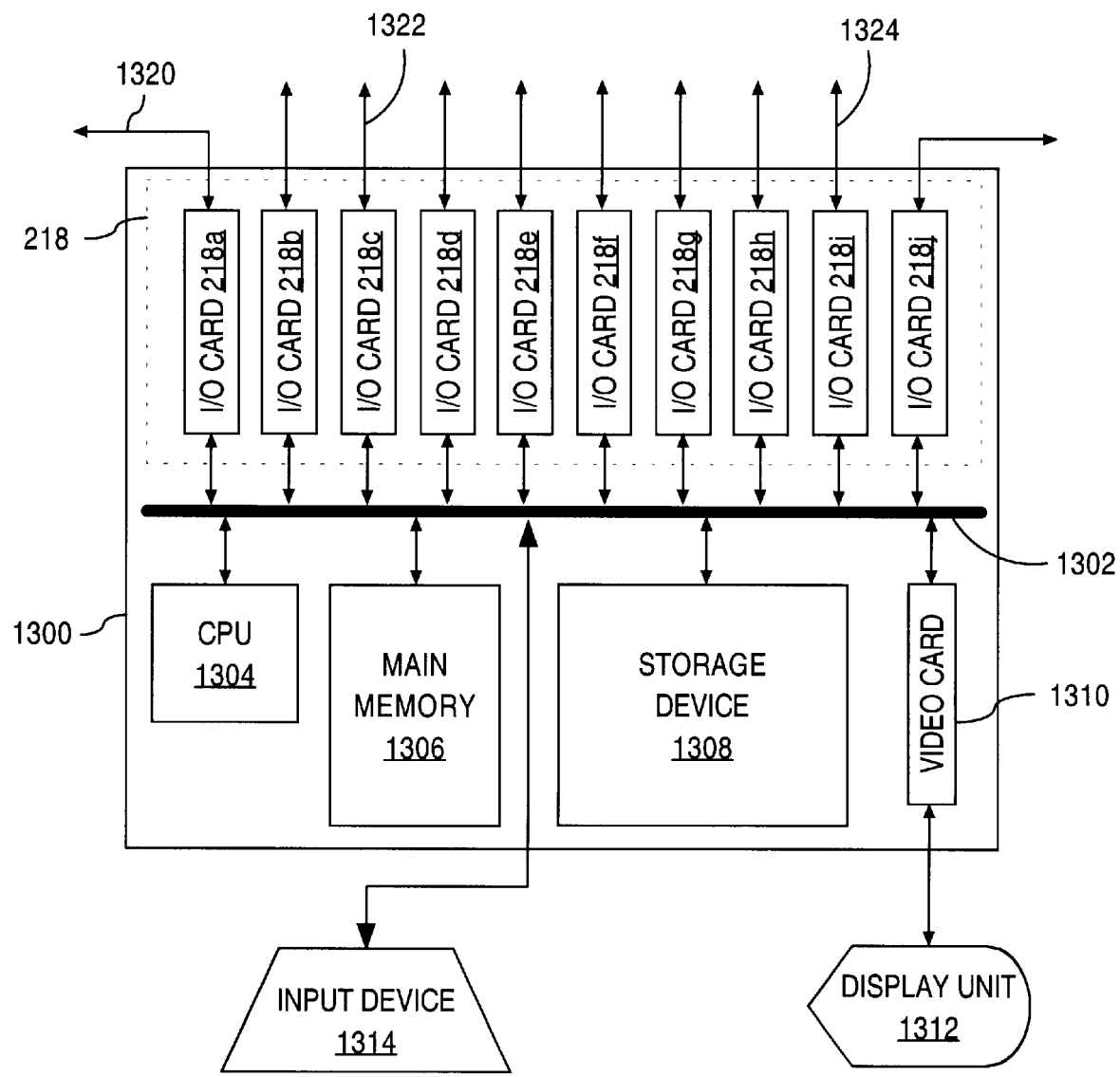
FIG. 13 is a block diagram of hardware components of a Signaling Access Server.

Referring to FIG. 13, the hardware components, computer system 1300, of a protocol converter include a bus 1302 or other communication mechanism for communicating information between internal components of the computer system 1300. A central processing unit ("CPU") 1304, comprising one or more processors, is coupled with bus 1302 for processing information. Computer system 1300 also includes a main memory 1306 coupled to bus 1302 for storing information and instructions to be executed by CPU 1304. Main memory 1306 typically includes a random access memory ("RAM") or other dynamic storage device, for storing temporary variables or other intermediate information during execution of instructions to be executed by CPU 1304. Main memory 1306 may also include a read only memory ("ROM") or other static storage device for storing static information and instructions for CPU 1304. A storage device 1308, such as a magnetic disk, magnetic tape, or optical disk, is provided and coupled to bus 1302 for storing information and instructions.

In some implementations, computer system 1300 includes a video card 1310 coupled to bus 1302 for controlling display unit 1312, such as a cathode ray tube (CRT), a liquid crystal display (LCD), a video monitor or other display device, to display information to a computer user. An input device 1314 is coupled to bus 1302 for communicating information and command selections from a user to CPU 1304. Typically an input device includes a keyboard with alphanumeric, symbolic, and cursor direction keys for receiving input from a user in the form of commands and data entry and communicating the input to CPU 1304. The input device typically includes a cursor control input device, such as a mouse or a trackball, integral with or separate from the keyboard, for controlling cursor movement on display unit 1312, and communicating direction information and command selections to CPU 1304. A cursor control input device typically has two degrees of freedom in two axes, a first axis (e.g., x) and a second axis (e.g., y), that allows the device to specify positions in a plane. In other implementations, these devices are connected to the computer system via a local area network such as Ethernet.

Computer system 1300 also includes a communication interface 218 coupled to bus 1302 and comprising, for example, a plurality of I/O cards 218a through 218j. Ten I/O cards 218a through 218j are shown in FIG. 13, but any number of I/O cards, modems, transceivers, or other I/O devices may be used. Communication interface 218 provides a two-way data communication coupling to one or more coding units and zero or more other signaling units. Some of the I/O cards 218a–218j can be coupled directly to SS7 or DPNSS links via multiplexer/digital cross connect (not shown).

At least one of the I/O cards, for example I/O card 218a, is coupled to a coding unit through control link 1320. Communication interface 218 may include an integrated services digital network (ISDN) card, terminal adapter, or modem for providing a data communication connection to a corresponding type of telephone line. As another example, communication interface 218 may include a local area network (LAN) card to provide a data communication connection to a compatible LAN, for example an Ethernet network. Wireless links, such as infrared, for communication interface 218 may also be implemented. In any such implementation, communication interface 218 sends and receives electrical, electromagnetic or optical signals that carry digital or analog data streams representing various types of information, in the form of carrier waves transporting the information.

This configuration enables the use of a computer system 1300 for establishing data calls arriving over voice connections to a data network. For example, such functionality is provided by computer system 1300 in response to CPU 1304 executing one or more sequences of one or more instructions arranged in main memory 1306. Such instructions may be written into main memory 1306 from another computer-readable medium, such as storage device 1308. Execution of the sequences of instructions contained in main memory 1306 causes CPU 1304 to perform the process steps described herein. One or more processors in a multi-processing arrangement may also be employed to execute the sequences of instructions contained in main memory 1306. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to CPU 1304 for execution. Such a medium may take many forms, including but not limited to non-volatile media, volatile media, and transmission media. Non-volatile media include, for example, optical or magnetic disks, such as storage device 1308. Volatile media include dynamic memory, such as main memory 1306. Transmission media include coaxial cables, copper wire and fiber optics, including the wires that constitute bus 1302. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to CPU 1304 for execution. For example, the instructions may initially be borne on a magnetic disk of a remote computer and downloaded to computer system 1302. The remote computer can load the instructions into its dynamic memory and send the instructions over a telephone line using a modem. A communications interface 218 local to computer system 1300 can receive the data on a telephone line or other network or telecommunication link and place the data on bus 1302. Bus 1302 carries the data to main memory 1306, from which CPU 1304 retrieves and executes the instructions. The instructions received by main memory 1306 may optionally be stored on storage device 1308 either before or after execution by CPU 1304. The received instructions may be executed by CPU 1304 as it is received, and/or stored in storage device 1308, or other non-volatile storage for later execution. In this manner, computer system 1300 may obtain application code in the form of a carrier wave.

SOFTWARE ARCHITECTURE

Figure 14:
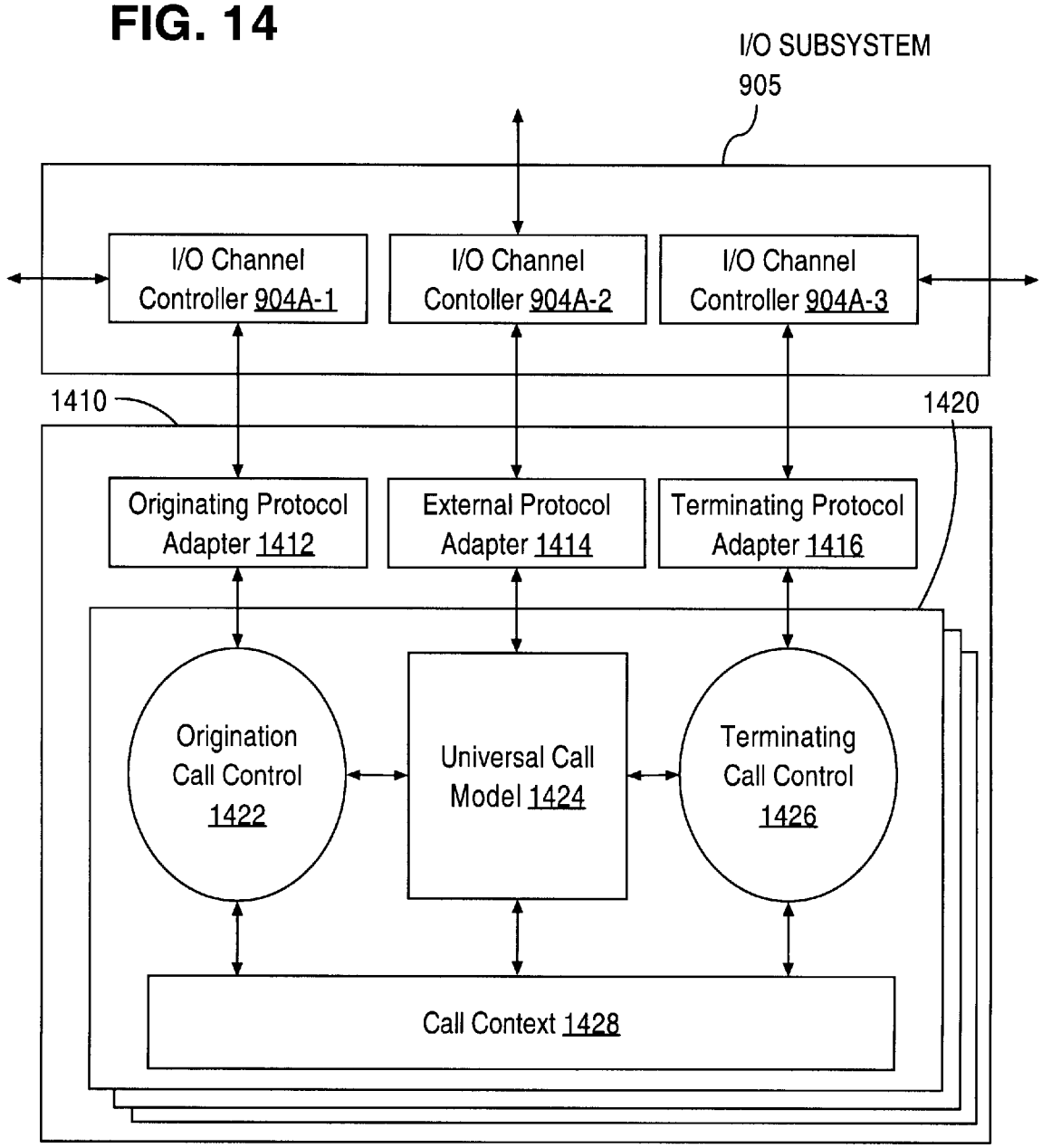
FIG. 14 is a block diagram of software elements relating to protocol conversion that may be executed by a Signaling Access Server.

FIG. 14 schematically illustrates a software architecture relating to protocol conversion implemented on a computer system 1300 of a protocol converter that implements Signaling Access Server 112. The software architecture includes an I/O subsystem 1400 for handing OSI Layer 2 (data link layer) messages and a protocol conversion engine 1410 for handling messages at OSI Layer 3 (network layer) and above. I/O subsystem 1400, containing I/O channel controllers 1402, 1404, and 1406, is configured for handling incoming connection requests and other incoming messages. For example, I/O subsystem 1400 can convert OSI Layer 2 frames and packets that transport the message into an OSI Layer 3 networking protocol data unit, which is a populated data structure that represents the contents of the messages. Specifically, I/O subsystem 1400 may be configured to convert LAP-D (Link Access Protocol-D) frames or Ethernet frames into protocol data units. Moreover, the I/O subsystem 1400 is also responsible for converting protocol data units generated by the protocol conversion engine 1410 into frames and packets as appropriate for transmission in the telecommunications network. Each I/O channel controller 1402, 1404, and 1406 is responsible for messages from a network channel handled by a corresponding I/O card of communications interface 218.

The protocol conversion engine 1410 includes a plurality of protocol adapters, implemented to support respective protocols or protocol families, and a number of call instances corresponding to each active call. A protocol adapter is a software module responsible for interfacing the protocol conversion engine 1410 with the I/O subsystem 1400. Specifically, a protocol adapter, when loaded and executed, is configured to connect with I/O subsystem 1400 in order to route protocol-specific messages between an I/O channel and the appropriate call instance. Multiple instances of the same protocol adapter may be loaded and executed, each of which is associated with a respective I/O channel. Although the protocol adapters are fundamentally bi-directional, it is convenient to refer to an originating protocol adapter 1412, an external protocol adapter 1414, and a terminating protocol adapter 1416, based on their particular function during a call. Thus, a protocol adapter can be employed as an originating protocol adapter 1412 for one call and as a terminating protocol adapter 1416 for another call.

An originating protocol adapter 1412 is capable of decoding an incoming message to determine the call with which the message is associated. Each message transmitted on a signaling channel contains a protocol-dependent value that serves to disambiguate messages for different calls from the same logical signaling channel. Every telecommunications protocol provides some means for matching up a message with an associated call. For example, a specific call identifier is embedded in the message (e.g., the Call Reference field used in ISDN_PRI) or the bearer channel identifier is embedded (e.g. with DPNSS and SS7/ISUP). Preferably SAS 112, which is capable of supporting many different protocols, is not limited to any particular means of matching up messages with the associated calls. Also, each call is identified internally with a unique integer identifier for the signaling unit, referred to as a "Global Call Reference," which is generated when the call is first instantiated. The Global Call Reference distinguishes simultaneously handled calls from one another. When concatenated with a network or other identifier of the signaling unit, the Global Call Reference serves to create a Universal Call Reference for the call that is unique for the network.

Accordingly, the originating protocol adapter 1412 is configured to associate the Global Call Reference with a corresponding call instance 1420. The corresponding call instance 1420 is responsible for processing the call, including converting, if necessary, the protocol from the originating side to be compatible with the protocol at the terminating side. If the originating protocol adapter 1412 can locate the corresponding call instance 1420 for the message, then the protocol adapter 1412 routes the message to the call instance 1420 for further processing as described hereinafter. On the other hand, the originating protocol adapter 1412 may not be able to find the corresponding call instance 1420, for example, because the message is the first message pertaining to a call. In that case, the originating protocol adapter 1412 is designed to instantiate a new call instance 1420 corresponding to the particular phone call and to route the message into the new call instance for further processing.

When a new call instance 1420 is instantiated, for example by originating protocol adapter 1412, an appropriate channel for the call is determined based on an analysis of the content of the incoming messages and the path by which the message arrived. The logic for selecting a channel may be static or dynamic. For example, static logic may be implemented by a hard-coded table in a configuration file resident in storage device 1308, and dynamic logic may be set up at run-time based on such factors as channel availability. A combination of static and dynamic techniques may be used as well. The channel is associated with a particular terminating protocol adapter 1416 and, hence, indicates the proper I/O channel controller 1406 and protocol on the terminating side. The terminating protocol adapter 1416 can route messages from associated call instances to the corresponding I/O channel controller 1406, to a network node, and ultimately to the destination telephone. In accordance with the bi-directional nature of protocol adapters, a terminating protocol adapter 1416 is configured also to receive protocol-specific messages from the terminating side of the network and pass them to the appropriate call instance. Likewise, an originating protocol adapter 1412 can receive messages from a call instance 1420 and pass them onto the corresponding I/O channel controller 1402 for transmission to the appropriate destination.

An external protocol adapter 1414 is a special kind of protocol adapter for interconnecting the protocol converter with an external system involved with the call. For example, the external protocol adapter 1414 enables external systems to be involved in real-time Intelligent Networking (IN) call control such as Transaction Control Application Part (TCAP) communications with a C7 network Service Control Point (SCP). As another example, external protocol adapter 1414 can employ a proprietary protocol for communicating with an external Fraud Control System involved in non-real-time control over the call. For implementing voice over packet-switching networks, the external protocol adapter 1414 is used for real-time communication with a coding unit such as an originating coding unit and a terminating coding unit. Accordingly, the external protocol adapter 1414 is responsible for connecting with the appropriate I/O channel controller 1404 in the I/O subsystem 1400 for sending and receiving messages with the coding unit and routing the messages to and from the proper call instance 1420. In addition, external protocol adapter 1414 is capable of instantiating one or more new call instances based upon a message received from the external channel. In such an event, the other protocol adapters 1412 and 1416 are directed to initiate a call from a logical "originating" node to a terminating node.

A call instance 1420 is instantiated by an originating protocol adapter 1412 (or an external protocol adapter 1414) for processing a call and performing protocol conversion, if necessary. A call instance 1420 may be implemented in a variety of ways, including by a separate process, thread, or an interruptible flow of execution that can be resumed. When the call instance 1420 is instantiated, memory for originating call control ("OCC") 1422, universal call model ("UCM") 1424, and terminating call control ("TCC") 1426 is allocated and initialized. The call instance 1420 also contains a call context 1428, which is a region of memory for storing information about the current call. Some call-related information that persists beyond the duration of the call may be stored in a database in main memory 1306 or storage device 1308 to implement billing records.

Preferably, OCC 1422, UCM 1424, and TCC 1426 are implemented as state machines by objects in an object-oriented programming language such as C++ or by other data structures in other programming languages. A state machine is an automaton that transitions from one of a finite number of states to another of those states in response to particular inputs. The output of a state machine occurs upon a state transition and is based on the destination state, and typically also on the input and/or source state. The OCC 1422, UCM 1424, and TCC 1426 state machines model a call from the perspective of the originating protocol, a universal protocol, and the terminating protocol, respectively.

OCC 1422 models a call from the perspective of the originating protocol. More specifically, OCC 1422 receives messages in the originating protocol from originating protocol adapter 1412 and, in response, transitions from one state to another state, resulting in outputting a non-protocol specific (i.e., universal protocol specific) message to UCM 1424. Conversely, OCC 1422 receives non-protocol specific messages from UCM 1424 and, by responsively transitioning from one state to another, outputs originating protocol specific messages to originating protocol adapter 1412.

Likewise, TCC 1426 models the call from the perspective of the terminating protocol. More specifically, TCC 1426 receives non-protocol specific messages from UCM 1424 and, by responsively transitioning from one state to another, outputs terminating protocol specific messages to terminating protocol adapter 1412. Conversely, TCC 1426 receives messages in the terminating protocol from terminating protocol adapter 1416 and, in response, transitions from one state to another state, resulting in outputting a non-protocol specific (i.e., universal protocol specific) message to UCM 1424.

UCM 1424 manages the call according to a universal call model that uses the universal protocol produced by OCC 1422 and TCC 1426. For the most part, UCM 1424 merely passes the universal protocol messages between the OCC 1422 and TCC 1426, thereby implementing a protocol conversion of the originating protocol into the terminating protocol via a universal protocol. UCM 1424 may conditionally send messages to OCC 1422 and TCC 1426, however, based on the capabilities and requirements of the originating and terminating protocols, respectively. For example, some protocols require acknowledgement messages to be sent in response to a call setup message and others protocols do not. In this case, UCM 1424 is configured to determine whether the originating protocol needs the acknowledgement message and cause one to be generated, if needed.

Since UCM 1424 is positioned to intercept messages passed between the OCC 1422 and the TCC 1426, UCM 1424 can perform many kinds of message processing in addition to protocol conversion. In accordance with one embodiment of the present invention, UCM 1424 is configured to implement feature transparency. Specifically, if the primary communication network 130 is unable to handle a particular feature even after protocol conversion, UCM 1424 arranges for the feature to be communicated over the auxiliary communication network 132 using external I/O channel controller 1404, as described in more detail hereinafter.

SS7 SIGNALING MODES

Signaling Access Server 112 is able to function in any of the three modes of signaling that are used in SS7, namely associated, non-associated, and quasi-associated signaling.

In associated mode, the signal links run directly in parallel with the bearer links. All connections are point-to-point, therefore, routing is not required. In non-associated mode, there is a separate logical path for the signal and bearer links. Signal links generally go through multiple STPs to get to their final destination.

In quasi-associated mode, there is a separate logical path for the signal and bearer links, but a minimal number of transfer points are used to reach the destination.

SS7 NETWORK INTERFACES

Signaling Access Server 112 can connect to the SS7 network through its input/output cards, details of which are described more specifically in the above-referenced co-pending patent application. For example, the Signaling Access Server 112 connects to the SS7 network using V.35 interfaces, T1/E1 or DS0 interfaces.

SAS AS AN INTELLIGENT NETWORK APPLICATION

The above-referenced co-pending patent application describes a "universal call model" that is used to represent states of a call that is being processed by the universal protocol converter. The universal call model of Signaling Access Server 112 has stable states that are entered at particular times during a call, referred to as "points-in-call." Access to external intelligent network applications is based on a model of "triggers" that may be enabled at defined points-in-call. The triggers use the TCAP protocol to exchange messages with other applications in an SS7 network.

Preferably, two types of triggers are defined. In a "one-way trigger," the Signaling Access Server 112 delivers a message to an intelligent network application, and does not wait for any response. In a two-way trigger, the Signaling Access Server 112 sends a request to an intelligent network application, and suspends call processing until a response is received, or a time-out occurs.

RUNNING OTHER APPLICATIONS ON THE SAS HOST PLATFORM

The computer system used to implement the Signaling Access Server 112 may also execute one or more other intelligent network applications. In this configuration, one or more separate applications execute on the SAS host and can interact with other intelligent network components in an SS7 network. The separate applications may share data with the primary call processing application executed by Signaling Access Server 112, and may deliver such data to remote applications using transaction processing.

For example, a separate application may carry out intelligent routing to the appropriate Network Access Server based on the type of service that is required. This type of application could improve utilization of Network Access Server resources by re-directing calls to the Network Access Server that is best able to supply the required service.

LOCAL NUMBER PORTABILITY FUNCTIONS

Signaling Access Server 112 provides local network portability functions for calls terminating at an Network Access Server 118 or originating from the Network Access Server.

Local network portability is a circuit-switched network capability that allows users to move or port their telephone numbers to a different local service provider, without changing their existing public directory numbers. Local number portability uses a unique 10-digit location routing number to identify each switch in the network for call-routing purposes. As in the similar 800-number service, a database is used to store the routing information for subscribers who have moved or ported to another local service provider. The local number portability database contains the directory numbers of all ported subscribers and location routing number of a switch that serves them.

For calls terminating at the Network Access Server, local number portability translation occurs at the local exchange on the originating side of the call. The originating exchange switch launches local number portability database queries, and routes calls based on the returned response. Once the originating switch performs a local number portability database query, it sets a new bit called the translated call number indicator in the forward call indicator parameter for the initial address message. This bit indicates, to other switches in the call path, that the local number portability query already has been performed.

For calls originating from the Network Access Server, in one embodiment, the Signaling Access Server 112 acts as a client to an SCP application that can perform number translation for local number portability. For Network Access Server-originated calls, Signaling Access Server 112 launches a TCAP query to the SCP application after collecting all dialed digits. The translated number obtained from the SCP is then used to route the call appropriately.

EXTERNAL INTERFACES

The Signaling Access Server 112 communicates externally in four (4) ways. Signaling Access Server 112 communicates with one or more Network Access Servers 118 using the Q.931 protocol defined in this document, over IP connections. Signaling Access Server 112 communicates with an SSP or other elements in the SS7 network over signal channels that use the ANSI SS7 protocol, or other SS7 variants. Signaling Access Server 112 may communicate with an external network management system or with an external data network using Simple Network Management Protocol (SNMP) SET and GET commands, or using FTP file transfers. Also, Signaling Access Server 112 may communicate with a client or human end user using commands and responses in a command-line language ("man-machine language" or MML).

INTERNAL COMPONENTS OF SIGNALING ACCESS SERVER

Figure 9:
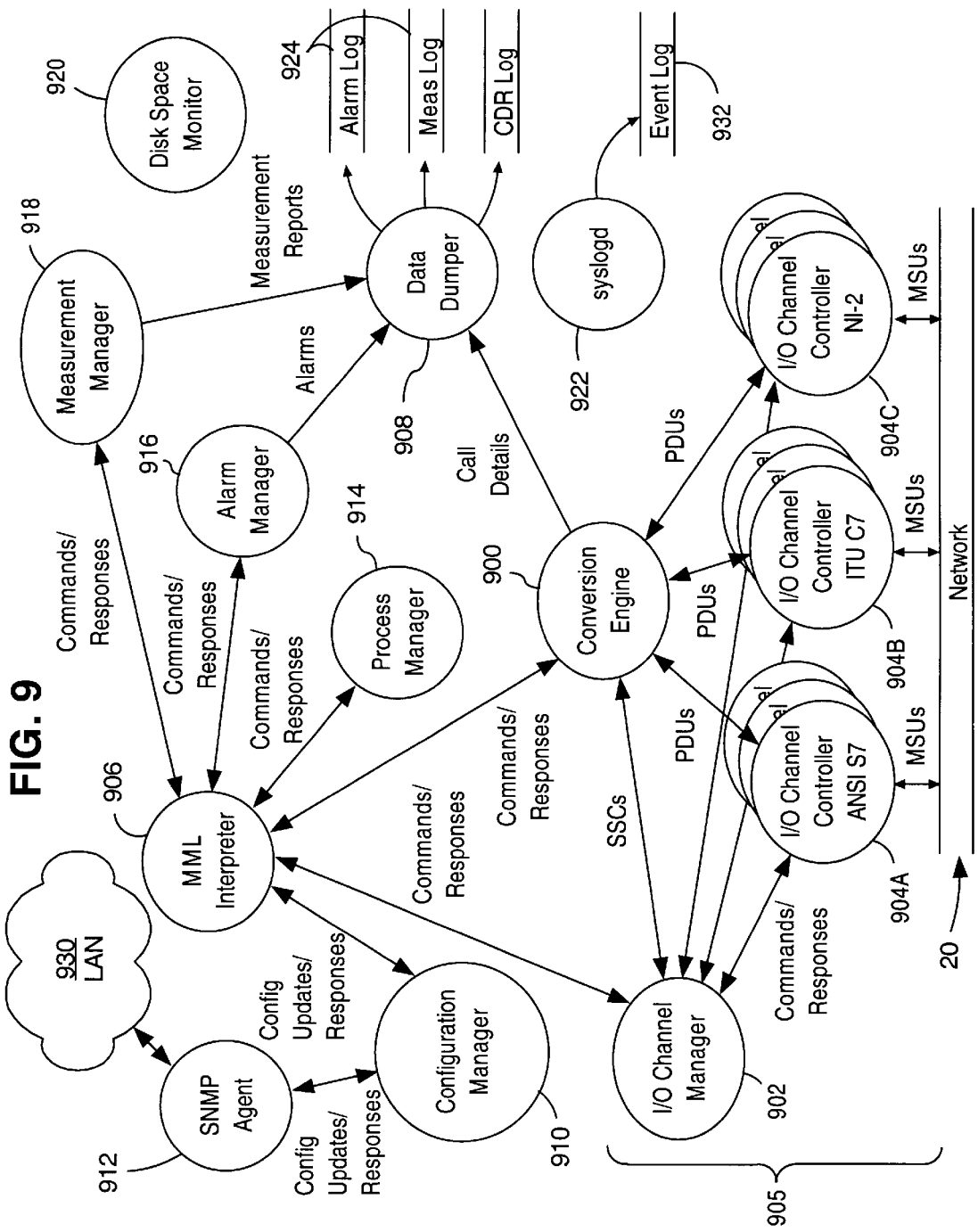
FIG. 9 is a block diagram of internal components of Signaling Access Server including the means of intercommunication among the components and the output produced by the components.

FIG. 9 is a block diagram of internal components of Signaling Access Server 112 including the means of intercommunication among the components and the output produced by the components. Each of the components of FIG. 9 may be implemented as one or more software elements prepared in a conventional programming language, and each component may execute as a separate process or thread in Signaling Access Server 112.

Conversion engine 900 is the logical center of the Signaling Access Server 112 and performs protocol conversion operations, and manages interworking of call processing and circuit management on all controlled signal paths. Converter engine 900 may also collect call measurement information, logs alarms, logs call detail records, and carries out circuit management. Converter engine may also log call trace information and allow other processes to control call trace functions.

Conversion engine 900 is coupled to an i/o channel manager 902 which in turn is coupled to one or more i/o channel controllers 904A, 904B, 904C. The i/o channel manager 902 controls the overall operation of the i/o channel controllers using command and response dialogues with the i/o channel controllers. For example, i/o channel manager 902 changes the service state of channels in response to service state change messages received from conversion engine 900. The i/o channel manager 902 handles re-configuration, sets and clears alarms for the i/o subsystem, and negotiates channel service states with the conversion engine 900. The i/o channel manager 902 also notifies the conversion engine 900 of any changes in channel service states, and allows external processes to control input/output functions and the i/o channel controllers.

Each i/o channel controller 904A, 904B, 904C provides an interface from the other components of Signaling Access Server 112 to the network 20. Generally, each i/o channel controller may maintain the lower levels of a protocol stack. An i/o channel controller may wrap message data units in a header and sends them to the conversion engine 900 as protocol data units. Further, an i/o channel controller may accept outgoing protocol data units from the conversion engine 900, strip the header, and send them as message data units to the network 20. The i/o channel controllers also may monitor the status of i/o channels and collect measurement information.

Each controller is associated with a particular SS7 protocol variant. For example, i/o channel controller 904A is responsible for communicating in ANSI SS7 protocol. I/o channel controller 904B is responsible for communicating in ITU C7 protocol. I/o channel controller 904C uses the Q.931 protocol variant that is defined in this document.

A man-machine language ("MML") interpreter 906 is coupled to conversion engine 900, i/o channel manager 902, configuration manager 910, process manager 914, alarm manager 916, and measurement manager 918. The MML interpreter 906 receives one or more commands from a client, workstation or terminal that is coupled to the Signaling Access Server 112 for use by a user or administrator. The MML interpreter 906 interprets each command, determines where to send the command, and forwards the command to the appropriate element of the system. Thus, MML interpreter 906 enables a user to conveniently address and command the other elements of the Signaling Access Server 112 using a command-line language. The MML interpreter also interprets responses received from the other elements and processes of the system, carries out output formatting if necessary, and presents process output to the user.

Configuration manager 910 enables other elements of the Signaling Access Server 112 to register to receive notification of updates to shared data. For example, configuration manager 910 may notify registered processes when data updates occur, and may allow processes to notify it of data updates through its interface.

The configuration manager 910 is coupled through an agent 912 to an external data network 930. For example, agent 912 is coupled to a local area network 930 that uses the SNMP protocol. Agent 912 can request and receive network configuration updates that describe the devices, and their characteristics, which form the data network. For example, when the data network is an SNMP network, agent 912 can issue GET and SET commands in SNMP and thereby read and change values in management information bases ("MIBs") within devices of the local area network 930.

Alarm manager 916 maintains the current state of one or more alarms associated with Signaling Access Server 112. For example, alarm manager 916 may log alarms and allow other elements or processes to track the state of alarms through interfaces to those processes.

Measurement manager 918 maintains shared measurement information for Signaling Access Server 112. For example, measurement manager 918 may allow other processes to get or set measurements, log measurements, allow processes to track measurements through its interfaces, and may set or clear alarms when pre-defined thresholds are crossed.

A data dumper 908 process may be coupled to receive information from alarm manager 916, measurement manager 918, and conversion engine 900. The data dumper 908 receives, for example, log information, formats the log information, and writes the log information in one or more log files 924. The information received by data dumper 908 from conversion engine 900 may be in the form of call detail records. The alarm manager 916 may send alarm set information and alarm clear information to be recorded in the alarm log. The measurement manager 918 may send periodic reports of measurement totals, for each measurement category, to be logged in the measurement log.

The data dumper 908 may actively manage such information. For example, data dumper 908 may open new files and close old files when one or more pre-defined thresholds for file size, time, or number of records are crossed. Data dumper 908 may also move old files to a spool area when the old files are closed.

Process manager 914 manages the other processes of Signaling Access Server 112. Process manager 914 may perform orderly startup and shutdown of processes and process groups, and may monitor the status of processes such as whether a process is active or has crashed. The process manager 914 may also provide one or more interfaces that allow processes or process groups to be started or stopped by another process. For example, at system startup, i/o channel manager 902 may request process manager 914 to start up i/o channel controller processes. The process manager 914 may also send periodic "heartbeat" messages to each process to verify that each process is alive, and automatically re-start processes if they have failed.

Disk space monitor 920 is coupled to the process manager 914 and functions to manage and track space used by the Signaling Access Server 112 on one or more mass storage devices. In one embodiment, disk space monitor 920 is executed periodically to check free space on the disks or other mass storage used by Signaling Access Server 112. Based on this check, the disk space monitor 920 generates a return code that is used by the process manager 914 to set or clear a disk space alarm.

CALL DETAIL RECORDS

Some sort of call detail record is used in many known telecommunications support systems. For example, systems and applications for billing, traffic analysis, and fraud detection use call detail records as a major source of input data. Signaling Access Server 112 can produce call detail records that are similar to those produced by switches or other network elements, because Signaling Access Server 112 has complete access to all signaling messages passing through it.

Preferably, each call detail record produced by Signaling Access Server 112 is stored in ASCII format and has one or more comma-separated values. The call detail records are stored in spool files that can be collected by a billing system or other application. Each call detail record contains the values shown in Table 1:

Table 1—Call Detail Record Values

Record version number
Pre-translated calling number indicator
Calling number
Pre-translated dialed number indicator
Dialed number
Post-translated calling number indicator
Translated calling number
Post-translated dialed number indicator
Translated dialed number
Setup time
Seizure time
Answer supervision time
Disconnect time
Disconnect side
Release code
In signal path identifier
In traffic channel identifier
In protocol identifier
Out signal path identifier
Out traffic channel identifier
Out protocol identifier
Bearer capability flags
Originating line flags
Customer identifier Many different call detail record formats are in general use around the world. For example, in North America, the Bellcore format known as BAF (AMA) is widely used. In other regions of the world, Ericsson TMOS format, Siemens EWSD format, and a number of others are used. The values and structure of records in each format vary widely. Accordingly, Signaling Access Server 112 provides a mechanism of creating and storing call detail records in a format that different telephone company systems can use.

In one embodiment, the mechanism is an auxiliary batch program that performs call detail record format conversion as a post-processing step. The batch program receives as input a file of call detail records that have been logged in a universal format generated by Signaling Access Server 112, and produces an equivalent output file containing the converted call detail records.

Figure 10:
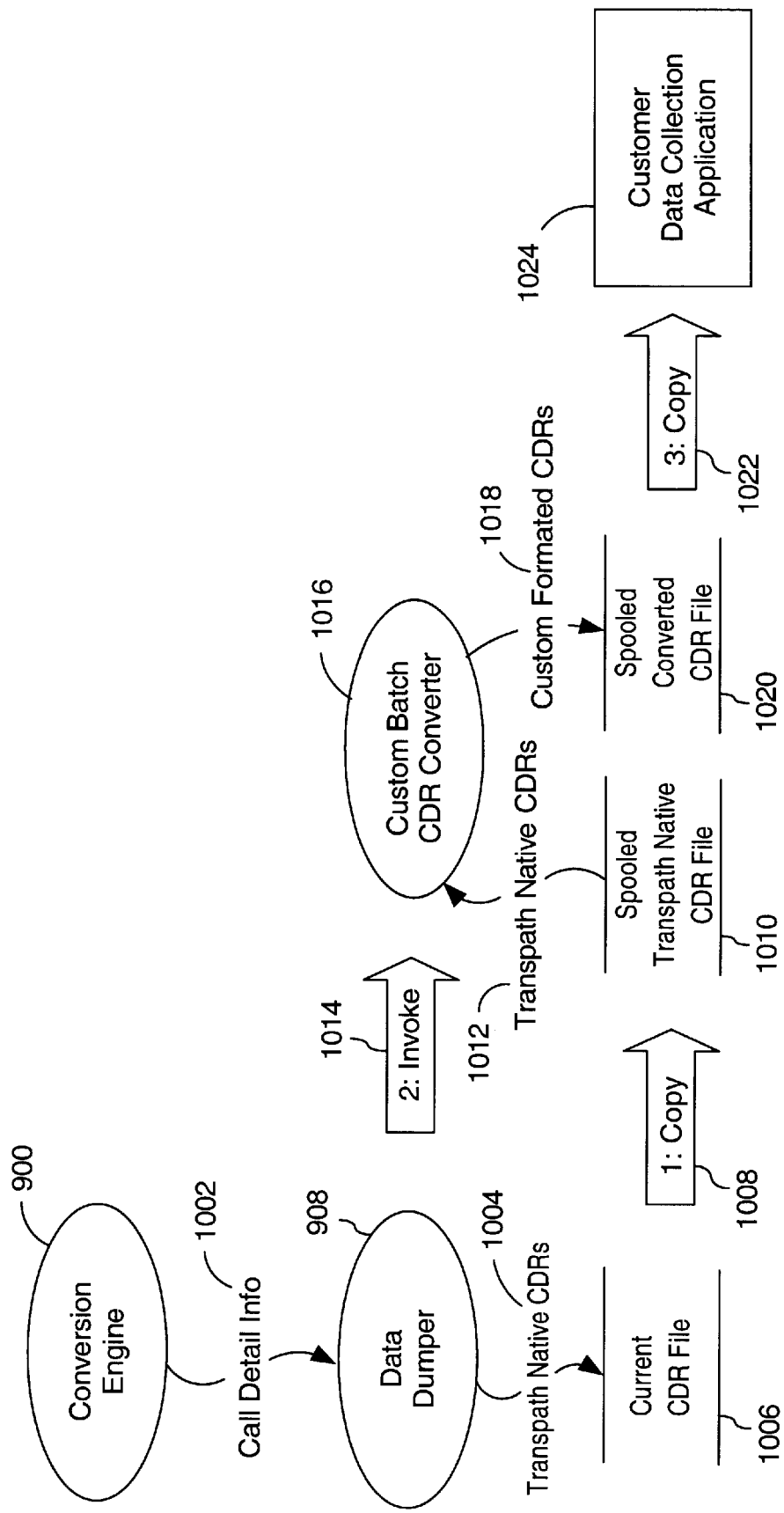
FIG. 10 is a block diagram of a process of converting call detail records.

FIG. 10 is a block diagram of a process of converting call detail records. Conversion engine 900 generates call detail information 1002 based on calls and messages that pass through the conversion engine and other elements of Signaling Access Server 112. Data dumper 908 receives the call detail information 1002 as input, formats the information into one or more comma-separated values, and generates call detail records 1004 as output, which are stored in current CDR file 1006. This process continues for so long as the Signaling Access Server 112 is in operation. Periodically, data dumper 908 causes the current CDR file 1006 to be copied to a spooled CDR file 1010.

A custom batch CDR converter 1016 is invoked, as indicated by arrow 1014. Invocation of converter 1016 may be carried out manual by a user using an MML command, or may occur automatically under program control of Signaling Access Server 112. Once invoked, converter 1016 receives the call detail records 1012 in the spooled CDR file 1010 as input. Converter 1016 reads the records, reformats one or more values in each record according to one or more conversion rules, and generates custom formatted call detail records 1018 as output in a converted CDR file 1020.

The converted CDR file 1020 is copied to an external data collection application 1024, as indicated by arrow 1022. The application 1024 may use the converted CDR file 1020 in any desired manner.

In one embodiment, the conversion rules by default produce records that are formatted in BAF (AMA) format. The converter 1016 may be executed as a background process that is initiated by the data dumper 908 each time that a call detail record file is closed. Also, one or more converters 1016 may be stored in Signaling Access Server 112, and a user may specify one of the converters 1016 in a configuration parameter value. In this embodiment, when the configuration parameter value is null or otherwise undefined, no conversion is done.

Some call detail record formats used by external applications may require data that the Signaling Access Server 112 does not collect or track. Accordingly, in another embodiment, the converter 1016 inserts a dummy value in the converted CDR records 1018 for each value that is not collected by the Signaling Access Server 112.

The record version number stored in each call detail record may be used to provide backward compatibility among different versions of converters 1016. For example, data dumper 908 can store call detail records in different format, tagging each record with the correct record version number value. The data dumper 908 may also maintain a separate database table for each format version.

ALARM LOG RECORDS

Signaling Access Server 112 may generate an alarm log record each time that an alarm is set or cleared. Each alarm log record is stored in an ASCII, comma-separated value format that can be converted to another format. Each record contains a value for each of the data items shown in Table 2.

Table 2—Alarm Log Record Values

Record version number
Timestamp of set or clear
Alarm category name
Alarm set or clear
Alarm severity
Alarmed component
Process reporting alarm state change Examples of alarm states that are recognized include: signaling link alignment lost; signaling link congestion; signaling link inhibit; signaling link blocked; signaling point timers have expired; unexpected conditions or events; abnormal conditions or events; or a process is out of service.

MEASUREMENT LOG RECORDS

In one embodiment, a measurement log record is generated every fifteen (15) minutes. Measurements for 15, 30, and 60 minutes are reported. The records are logged in an ASCII, comma-separated value format that can be converted to other formats. Each record contains the values shown in Table 3.

Table 3—Measurement Log Records

Record version number

Timestamp interval started

Interval length in seconds

Measurement category name

Measurement value

Measurement units

Measured component

Measurement values may be collected for the items set forth in APPENDIX 2.

EVENT LOG RECORDS

Referring again to FIG. 9, an event log process 922, which may be the UNIX system daemon "Syslogd," logs events of the Signaling Access Server 112. The event log process 922 is associated with the other processes of Signaling Access Server 112 and receives input from one or more of them. Each event log record is stored in an event log file 932 and stores the data values shown in Table 4.

Table 4—Event Log Record Values

Timestamp in GMT format

Host name

Process name

Process ID

Log Facility

Log Severity

Error number, if any

Text

The logged events may be forwarded to a remote system or remote console using an appropriate command to the event log process. For example, when the event log process is the Syslogd daemon, it may be configured to forward event log records using an appropriate UNIX command.

CALL TRACES

Conversion engine 900 may log call trace records for any signaling channel, under control of appropriate MML commands. Each call trace record may be stored in a binary format, and describes detailed processing of the conversion engine 900 for each protocol data unit. The call trace records may be examined off-line using a conversion analyzer or equivalent program. Thus, the call trace records provide a fingerprint of the lowest-level operations carried out by the system, and may help to resolve incompatibilities or other problems with call processing.

MAN-MACHINE INTERFACE

Signaling Access Server 112 preferably can receive, interpret, and respond to the following commands in the manner indicated below. In this description, capital letters indicate the name of a command, and triangular brackets enclose the names of parameters. For example, when "<number>" appears in this description, a user may enter the specified command by substituting a numeric value for "<number>".

The Alarm Acknowledge command has the format ACK-ALM:<almCategoryID>:<almCategoryName>, where <almCategoryID> is a numeric alarm category identifier and <almCategoryName> is a string value that identifies an alarm category name. The Alarm Acknowledge command is used by a user to indicate that an alarm has been recognized but not cleared.

The Block Circuit command has the format BLK-CIC:target:CIC:=<number>,[RNG=NUMBER], where <number> is a numeric circuit identifier value. The Block Circuit command is used to block a circuit or a range of circuits from carrying calls. A complementary Unblock Circuit command is also provided. Its syntax is UNBLK-CIC:target:CIC=<number>,[RNG=NUMBER], where the parameters are the same as for Block Circuit. The Unblock Circuit command makes circuits that have been blocked available to carry calls.

The Change Configuration command has the format CHG-CFG:<table>, where <table> identifies a configuration table name, selected from among the values "Components," "sigPath," or "processes". The Change Configuration command re-loads the specified configuration table.

The Change Log command has the format CHG-LOG:<procName>:<logLevel>, where <procName> is the name of a process to be logged and <logLevel> is a logging level value selected from among DBG, INF, NOT, WRN, ERR, CRT, ALR, and EMR. The Change Log command also can be issued with the string ALL as the <procName> value. This command will set all processes to the specified logging level value.

The Clear Alarm command has the format CLR-ALM:<compTypeName>:<almCategoryName>, where <compTypeName> is a name of a component type, and <almCategoryName> is the name of an alarm category. The Clear Alarm command clears an alarm category for a particular component.

The Clear Measurement command has the format CLR-MEAS:<compTypeName>:<measCategoryName>, where <compTypeName> is a name of a component type, and <measCategoryName> is the name of a measurement information category. The Clear Measurement command clears a measurement on a component.

The Help command has the format "HELP" and causes the Signaling Access Server 112 to display a help file for the MML commands that are recognized by the SAS.

The MML initialization command has the format MML-s [x], where x is a session identifier value. The MML initialization command initializes an idle MML session.

The Quit command has the format "QUIT" and causes the Signaling Access Server 112 to end the current MML session.

The Reset Circuit command has the format RESET_CIC:target:CIC=<number>,[RNG-NUMBER], where <number> is a circuit identifier code value. The Reset Circuit value makes one or more circuits, which have been previously blocked, available to carry calls.

The Retrieve Alarms command has the format "RTRV-ALMS" and causes the Signaling Access Server 112 to display all active alarms. A variant command, "RTRV-ALMS::CONT" displays all active alarms, and listens for alarm events until interrupted by a user command. For example, the interruption can be accomplished by pressing Control-C on the keyboard of the user terminal.

The Retrieve Configuration command has the format "RTRV-CFG:<cfg table>" where <cfg table> is the name of a configuration table, selected from among the values "Components," "alarmCats," and "measCats". The Retrieve Configuration command causes the Signaling Access Server 112 to display the specified configuration table.

The Retrieve Counter command has the format RTRV-CTR:<compTypeName>:<measCategoryName>, where <compTypeName> is the name of a component type, and <measCategoryName> is the name of a measurement category. The Retrieve Counter command causes Signaling Access Server 112 to display a measurement counter on a component.

The Retrieve Link Counter command has the format "RTRV-LNK-CTR:target:", where "target" is a link identifier, and causes the Signaling Access Server 112 to retrieve measurement information for the specified link.

The Retrieve Link command has the format "RTRV-LNK:target", where "target" is a link identifier, and causes the Signaling Access Server 112 to retrieve statistics associated with a link or a link set. Similarly, the Retrieve State command, "RTRV-LSET:target", retrieves the service state of a link for the link that is identified by the "target" value.

The Retrieve Network Element command has the format "RTRV-NE" and displays attributes of the Signaling Access Server 112.

The Retrieve Signaling Channel command has the format "RTRV-SC:<sigpathID> and displays attributes of signaling channel(s) that are identified by the <sigpathID> value. The value of <sigpathID> may be "ALL," in which case the Signaling Access Server 112 displays the names and attributes of all signaling channels.

The Retrieve Software command has the format "RTRV-SOFTW:<groupName> where <groupName> is the name of a specific process group. The Retrieve Software command causes Signaling Access Server 112 to display the status of the specified process group. The Retrieve Software command also may be issued in the format "RTRV-SOFT:<procName>", where <procName> is the name of a process. In this variant, the Retrieve Software command causes Signaling Access Server 112 to display that status of the specified process. The value of <procName> may be ALL, in which case Signaling Access Server 112 displays status information for all known processes.

The Retrieve Signaling Point command has the format "RTRV-SP-CTR:target" where "target" is a value identifying a particular signaling point. The Retrieve Signaling Point command displays all measurements for the indicated signaling point, or for every signaling point if the value "ALL" is used as the target value.

The Retrieve Traffic Channels command has the format "RTRV-TC:<sigPathID>, where <sigPathID> is a numeric identifier of a signaling channel. The Retrieve Traffic Channels command displays the status of all traffic channels for a signaling channel.

The Set Equipment State command has the format "SET-EQPT-STATE:target:state", where "target" is a numeric identifier of a circuit card in the Signaling Access Server 112, and "state" is a state to which the circuit card is to be set. The Set Equipment State command causes Signaling Access Server 112 to set or reset the state of the designated circuit card.

The Set Link State command has the format "SET-LNK-STATE:<target>:<state>, where <target> is a numeric value that identifies a link or a link set, and <state> is a value that identifies a state to which that link or link set is to be set. The Set Link State command causes Signaling Access Server 112 to set the service state of a link or link set to the designated state.

The Set Channel State command has the format "SET-SC-STATE:<sigPathID>:IS|OOS", where <sigPathID> is a numeric value that identifies a signaling channel. The second parameter is specified by the user as either "IS" or "OOS." When the second parameter is "IS," the Set Channel State command causes Signaling Access Server 112 to set the channel to In Service. When the second parameter is "OOS," Signaling Access Server 112 sets the channel to Out Of Service.

The Start Tracing command has the syntax "STA-SC-TRC:<sigPathID>:<parms>", and causes Signaling Access Server 112 to start call tracing on a signaling channel. The parameter <sigPathID> is a numeric value that identifies a signaling channel. The parameter "<parms>" is one or more optional parameters. The optional parameters can be "PRD=<number>", where <number> is a numeric value that identifies the duration, in seconds, for which tracing is to be carried out. The optional parameters also can be "LOG='FILENAME'", where FILENAME is the name of an output file in which trace information is to be stored.

The Start Process command has the syntax "STA-SOFTW:<process>", where <process> is the name of a process or a group of processes within Signaling Access Server 112. The Start Process command will start the designated process or group.

The Signaling Access Server 112 also responds to and implements a set of stop commands. For example, the Stop Tracing command has the format "STP-SC-TRC:<sigPathID>", where <sigPathID> is a value that identifies a signaling channel, or is the value ALL and thereby identifies all channels. The Stop Tracing command causes Signaling Access Server 112 to discontinue call tracing on the identified signaling channels. The Stop Process command has the syntax "STP-SOFTW:<process>:[KILL]", where <process> is the name of a process or a group of processes within Signaling Access Server 112. The Stop Process command causes Signaling Access Server 112 to stop the designated process or group. Alternatively, the Stop Process command may be issued with the parameter "ALL", in which case Signaling Access Server 112 will stop all processes and process groups, except for MML Interpreter 906 and Process Manager 914. The Stop Process command also may be issued with the parameter "ALL: [KILL]", which causes Signaling Access Server 112 to stop all processes and process groups, including MML Interpreter 906 and Process Manager 914.

CONFIGURATION AND MANAGEMENT

Signaling Access Server 112 is preferably configured using a computer program called Configuration Tool. In one embodiment, the Configuration Tool is a JAVA® application program that uses a three-tiered architecture. The Configuration Tool generates output in HTML format, so that a user may access the Configuration Tool using any Web browser program.

In the telephony equipment field it is conventional for intelligent network elements to have one or more software programs for managing the elements. These software programs are called Element Management Systems. Signaling Access Server 112 has an Element Management System in the form of the Configuration Tool and the network agent 912. A user may create a configuration using the Configuration Tool and validate the configuration using the Configuration Tool. When the Configuration Tool accepts the changed configuration, the Configuration Tool may cause a download of one or more configuration files to the Signaling Access Server 112. To activate the configuration files, the Configuration Tool instructs Signaling Access Server 112, through the agent 912, to deploy the new configuration.

Figure 11:
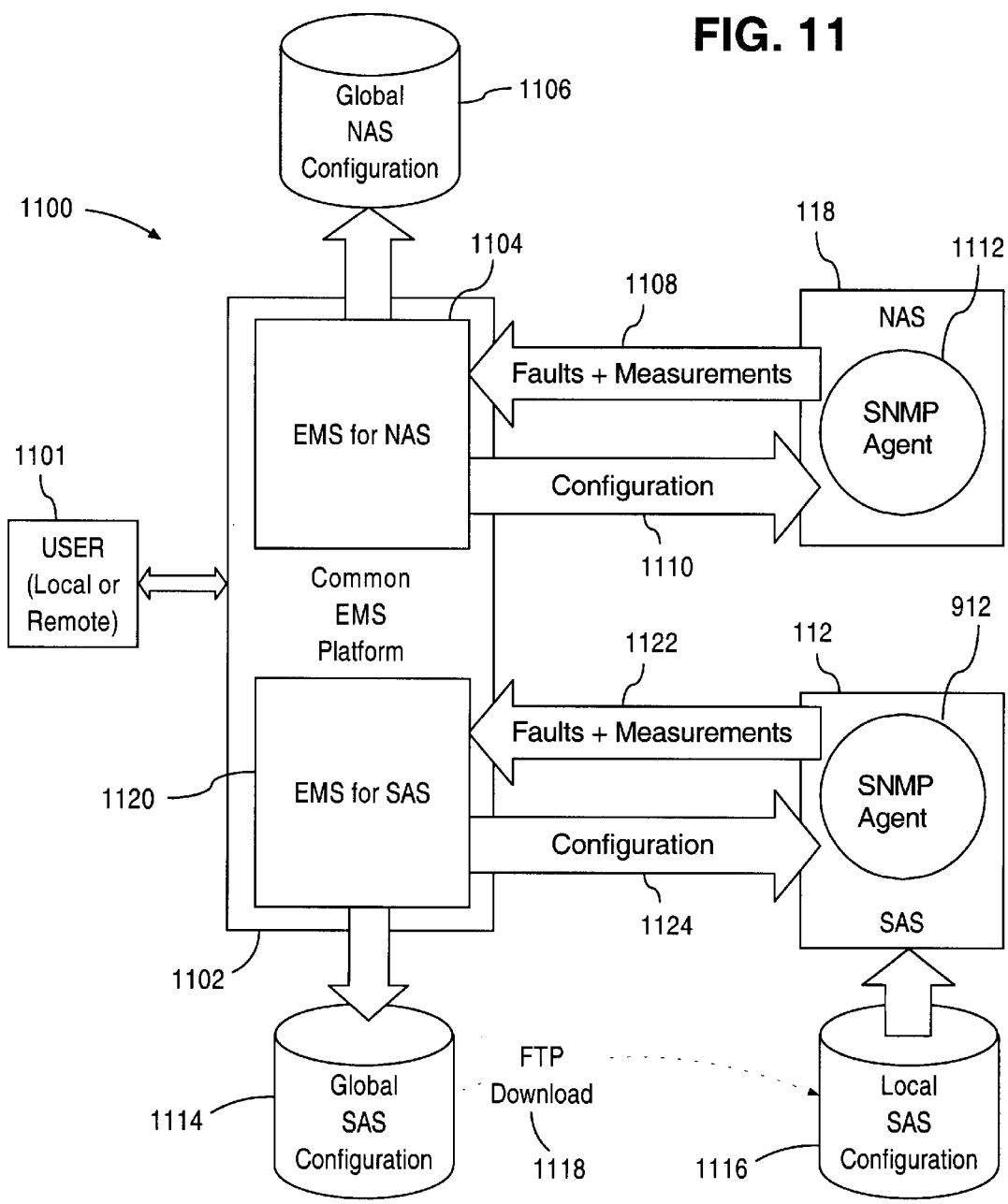
FIG. 11 is a block diagram of an integrated Element Management System.

In one embodiment, system 2 has an integrated Element Management System that operates with both Signaling Access Server 112 and Network Access Servers 118, thereby providing a single, consistent interface for management and configuration. FIG. 11 is a block diagram of an integrated Element Management System 1100. A common platform 1102, which may be a general-purpose computer system, hosts a first Element Management System 1104 for Network Access Server 118 and a second Element Management System 1120 for Network Access Server 112. A user or client software element 1101, which may be co-located with platform 1102 or remote from it, communicates with the platform, for example, using a Web browser and HTTP messages.

The first and second Element Management Systems 1104, 1120 each respectively create and store global configuration information in global configuration files 1106, 1114. The first element management system 1104 receives fault and measurement information 1108 from Network Access Server 118, and sends configuration information 1110 to the Network Access Server, suing SNMP messages and SNMP agent 1112. Similarly, the second element management system 1120 receives fault and measurement information 1122 from Signaling Access Server 112, and sends configuration information 1124 to the SAS, using network agent 912 of Signaling Access Server 112.

Other aspects of Signaling Access Server 112, which have been previously described, facilitate management of the SAS and its use in managing other network elements. For example, Signaling Access Server 112 produces call detail records that may be input into a billing application. Telephony measurement information is continuously collected by SAS and reported at periodic intervals in log files. The log files are spooled to a directory, from which they can be collected and analyzed by an external system. The measurement information may also be stored in a MIB that is stored in the Signaling Access Server 112. In this embodiment, an external network device on a data network may obtain measurement values from Signaling Access Server 112, for example, by issuing SNMP GET commands.

The alarm information produced by Signaling Access Server 112 may also be used in system management. The Alarm Manager 916 maintains the current state of all SAS alarms. The current state of any alarm can be retrieved using an MML command or using a GET command over SNMP. Each alarm is translated into an SNMP trap by the network agent 912. Each SNMP trap is forwarded to the Element Management System 1120 and may be displayed by user 1101 or logged by the Element Management System. In addition, a circular list or buffer of the most recent alarm log messages is maintained in the MIB of the Signaling Access Server 112, and can be retrieved using an SNMP GET command.

Initialization of SAS

When Signaling Access Server 112 is started, the following operations occur automatically as an initialization process in a preferred embodiment. The Signaling Access Server 112 executes the UNIX operating system, which carries a normal boot-up sequence. In this sequence, the system event logger 922 is started. When the default user run level is reached in the UNIX boot sequence, the network agent 912 and the process manager 914 are started.

Process manager 914 then begins startup of the application processes. Conversion engine 900, i/o channel manager 902, and i/o channel controllers 904A, 904B, 904C all start. As each process starts, it reads one or more configuration files to build objects and data structures in memory. The processes establish connections with the process manager 914, alarm manager 916, measurement manager 918, and configuration manager 910.

The i/o channel manager 902 checks the last saved service state for each of its signal channels. For those channels that should be in service, i/o channel manager 902 begins an initialization sequence for each channel.

For each signal channel interface of each Network Access Server 118, the following steps are performed. The initial state of the interface is set to Automatic Out Of Service. The i/o channel controller 904A, 904B, 904C waits for the Network Access Server 118 to connect to establish the interface. The service state of the channel is then changed to In Service. The i/o channel controllers 904A–C each then begin accepting messages from the Network Access Server 118 for a group of bearer channels. Message units received from the Network Access Server 118 are processed by the associated i/o channel controller and sent to conversion engine 900. Message units received from the conversion engine 900 and directed to this interface are sent to the Network Access Server 118 using UDP.

DYNAMIC RE-CONFIGURATION

As stated above, Signaling Access Server 112 may receive updates or changes to persistently stored configuration data. The Signaling Access Server 112 is dynamically re-configured according to changes in such data.

Generally, the network agent 912 is updated with a MIB attribute for the directory in which the new configuration files have been placed. When the MIB attribute is changed, the following events occur. The new configuration files are copied to a temporary working directory, preferably using FTP. Version information that describes the new configuration files is checked into an SCCS repository, which enables previous configurations to be restored. The updated configuration files are extracted from the repository into the current application directory. The configuration manager 910 is notified of an update to the changed configuration files. The configuration manager 910 notifies all processes that have registered to be notified about updates to configuration files. Each process detects any new, updated, or deleted objects using one or more library routines. Each process also updates its internal object model to reflect the changed configuration data.

If new Network Access Server E-1 interfaces are detected by library routines that are used for loading data into memory, then the following operations are performed. The initial state of the interface will be Automatic Out Of Service. The i/o channel controller 904A, 904B, 904C waits for the Network Access Server 118 to connect to establish the interface. The service state of the channel is then changed to In Service. The i/o channel controllers 904A–C each then begin accepting messages from the Network Access Server 118 for a group of bearer channels. Message units received from the Network Access Server 118 are processed by the associated i/o channel controller and sent to conversion engine 900. Message units received from the conversion engine 900 and directed to this interface are sent to the Network Access Server 118 using UDP.

If Network Access Server E-1 interfaces are deleted, the following steps are performed. The state of the interface is made to be Automatic Out Of Service. Any calls in progress on the current signaling channel are deleted. The interface is deleted. The i/o channel controller drops any messages from the Network Access Server 118 for the current interface. Message units received from the conversion engine 900 and directed to the interface will be dropped.

OVERLOAD HANDLING

Also in the preferred embodiment, the Signaling Access Server 112 includes an overload handling mechanism. The overload handling mechanism addresses situations in which the Signaling Access Server 112 is receiving more signal messages than it can process. Without an overload handling mechanism, Signaling Access Server 112 signal messages would be lost or not sent due to time-outs.

In one embodiment, the overload handling mechanism has the structure and form disclosed in co-pending U.S. patent application Ser. No. 09/107,839, entitled "Overload reduction in a communication system," filed Jun. 30, 1998 and naming as inventors Lev Volftsun, Clay H. Neighbors, and Fred R. Rednor.

In another embodiment, the following overload handling mechanism is used. When multiple signal channels are ready to be put into service simultaneously, there is a delay between the time when each signal channel is brought into service, and the time when the next signal channel is brought into service. The delay period is the same for all channels, and is configurable to a pre-determined, user-set value.

The Signaling Access Server 112 stores and executes overload handling software that implements a call gapping algorithm. "Gapping" means that a specified proportion of new call attempts are rejected by the Signaling Access Server 112 when overload is detected. Preferably, at least three (3) levels of gapping are used, although any number of gapping levels may be used. The gapping algorithm is triggered when any of several queues established between an I/O subsystem and call conversion engine of the Signaling Access Server 112 exceeds a specified percentage of the queue's total capacity. The actual percentage value is dynamically configurable for each of the gapping levels. The gapping proportion for each of the gapping levels is also dynamically configurable.

The gapping algorithm is deactivated for a particular gapping level when all of the queues between the I/O subsystem and the call conversion engine have more than the specified percentage of the queue's total capacity free. For calls that are rejected during gapping, the Signaling Access Server 112 clears the call down in a manner that conforms to the particular protocol in use on the signaling channel. Generally, a proper rejection message is sent to the originating network element. Call attempt messages are not ignored, and calls are not abruptly dropped.

Overload is detected by sampling the length of the conversion engine's main input queue. The more messages that are buffered, the more severe the level of overload that is then currently occurring.

The call gapping algorithm is based on the rationale that messages referring to calls already in progress should have a higher priority than messages setting up new calls. Under overload conditions, messages referring to calls in progress are processed as usual. A proportion of new call setup messages, however, is rejected until overload conditions abate. Since setting up new calls is the most processor-intensive aspect of call processing, this strategy provides a throttling effect as long as overload continues, while still allowing the Signaling Access Server 112 to do the maximum possible amount of useful call processing.

Preferably, calls are rejected at the lowest level possible in the system 2, before they reach the conversion engine. Further, correct performance under overload is achieved by tuning, and therefore, various parameters need to be adjusted to dynamically control behavior of the call gapping.

In a second approach to overload handling, protection is provided against overload during system start-up or circuit reset. The IOS brings new signal channels on-line gradually, rather than simultaneously. This approach ("staging") prevents the system from receiving an unexpected burst of traffic when it is unprepared for it.

In the staging approach, there are two tunable parameters. "Max Simultaneous Establish" is the maximum number of circuits that may be established at the same time. If its value is zero, there is no maximum, and staging behavior is disabled. The "Establish Dwell Time" parameter is the time interval to wait between the start of circuit establishment for one group of circuits and the start of circuit establishment for the next group of circuits. If zero, there is no delay. The dwell time includes the time required to complete initialization of each circuit group.

In either approach, several overload level values are defined, each progressively more severe. For example, Level 0 indicates no overload; Level 1 indicates light overload; Level 2 indicates medium overload; and Level 3 indicates heavy overload. The overload level values refer only to the call gapping algorithm and not to the staging algorithm.

Further, a set of parameter values is associated with each overload level other than Level 0. An Onset Threshold value identifies a percentage of total queue capacity at which the overload level will be in effect. An Abatement Threshold value indicates a percentage of total queue capacity at which the overload level will no longer be in effect. This prevents rapid cycling in and out of an overload level. The Abatement Threshold value must be less than the Onset Threshold value for cycling not to occur. The Rejection Percentage value identifies a percentage of new calls that will be rejected at the associated overload level. For example, 20% means 1 out of 5 new call setups will be rejected. An Alarm Category value identifies the category of alarm to be set while the associated overload level is in effect.

In one embodiment, in the first approach, sampling the queues is carried out by the I/O subsystem of the Signaling Access Server 112. Thus, the I/O subsystem detects overload, and sets or clears alarms related to overload conditions. The I/O subsystem notifies the call conversion engine using a channel management message when overload conditions change. A dedicated, high-priority input queue, read by the call conversion engine, is used for all management messages. The call conversion engine can thus always deal with management messages before any other message processing is done, even under overload conditions. The message indicates a change in global overload level, by level number value.

The call conversion engine recognizes and responds to changes in the global overload level. This indication is then propagated to other elements of the Signaling Access Server 112 as necessary.

The overload levels defined in the foregoing approaches are distinct from congestion that occurs on any particular signal channel being used by the call conversion engine. In an alternate embodiment, the Signaling Access Server 112 has an additional overload handling mechanism that responds to threshold values defined for and associated with each signal channel. In this approach, the conversion engine implements congestion control above level 2 for protocol variants that support it. The I/O subsystem collects measurements of message rate on a per-signal-channel basis. The I/O subsystem notifies the call conversion engine of congestion detected or cleared on individual signal channels.

Intra-system Signaling Protocol

An aspect of the invention is a signaling protocol that is used for communications between Signaling Access Server (s) 112 and Network Access Server(s) 118. Preferably, the protocol is based on the NI-2 variant of the ISDN Q.931 signaling scheme, hosted on IP rather than Q.921, which is standard. NI-2 is defined in Bellcore TR-NWT-1268. Generally, the protocol performs the following functions:

1. Initialization and synchronization of communication between a Signaling Access Server 112 and a Network Access Server 118.
2. Call setup, monitoring and teardown.
3. DS0 continuity testing or loopback.
4. Circuit Status Query.
5. Limited resource management for DS0s and DSPs, including taking channels in and out of service.

Each of these functions is described in detail below.

Maintenance Messages Including Continuity Extensions

A system that complies with North American SS7 standards must provide continuity testing. In the systems of FIGS. 1A, 1B, 1C, 2A, and 2B, however, the SAS cannot directly control the bearer channels, and therefore uses the Network Access Server to perform loopback for continuity testing. Accordingly, the preferred protocol is extended to control continuity testing operations. Also preferably, the Network Access Server may query the current state of the circuit from the Network Access Server for maintenance and testing.

In the Q.931 protocol standard, every message contains a protocol discriminator info element. This element may carry a value of Call Control or Maintenance. Messages also contain a message type info element. Normally, in the NI-2 variant of the Q.931 protocols, the only Maintenance message used is the Service message type, which indicates a change in service state on the sending side. The protocol of the present invention uses the Maintenance message structure, with additional message types defined for continuity testing control. Thus, each message of the protocol has a protocol discriminator info element value of "Maintenance," and the message type values are as defined in Table 5.

TABLE 5

MESSAGE TYPES

| CALL REF | MSG TYPE | FROM | TO | DESCRIPTION |
| --- | --- | --- | --- | --- |
| SAS-supplied value | COT ON | SAS | Network Access Server | Instructs Network Access Server to turn continuity testing |
| SAS-supplied value | COT ON ACK | Network Access Server | SAS | Acknowledges that Network Access Server has turned continuity testing on |
| SAS-supplied value | COT OFF | SAS | Network Access Server | Instructs Network Access Server to turn continuity testing off |
| SAS-supplied value | COT OFF ACK | Network Access Server | SAS | Acknowledges that Network Access Server has turned continuity testing off |
| Global value (zero) | CIRCUIT QUERY | SAS | Network Access Server | Requests Network Access Server to return service state of a bearer circuit |
| Global value (zero) | CIRCUIT QUERY RESP | Network Access Server | SAS | Returns result of circuit query from Network Access Server to SAS |

In Table 5, the column entitled "CALL REF" refers to a call reference value, which generally identifies a particular call. The value of the call reference may be a global value of zero, which does not identify a particular call. For the CIRCUIT QUERY RESP message, the Network Access Server returns the service state value in the Status information element of the message. Further, each message in the protocol carries a Channel ID value that identifies a particular bearer channel.

PROTOCOL INITIALIZATION AND NETWORK ACCESS SERVER/SAS SYNCHRONIZATION

NETWORK ACCESS SERVER CONFIGURATION

DS0 resources of each Network Access Server are explicitly and statically configured. One configuration task is to associate some or all of the Network Access Server resources with a particular SAS. The mapping of Network Access Server resources to one or more SASs is explicit to provide flexibility in establishing different dial outsourcing arrangements.

Network Access Servers identify particular DS0's using a trunk value and a timeslot value. The trunk value identifies the particular time division multiplexed interface on the Network Access Server, for example, T1/E1, PRI, T3/E3, or others. The timeslot value identifies the particular DS0 channel on that trunk. Ranges of timeslots are permitted, which makes specifying a particular association more convenient. In another embodiment, timeslots can be specified in a wildcard format so that, for example, a particular configuration can return to an entire trunk.

A SAS is identified by a DNS name value or by one or more IP address value, and TCP port value, which identifies the TCP port(s) allocated for the Network Access Server/ SAS protocol. Using the port specification, the Network Access Server and SAS may explicitly bind the communication protocol to their respective configurations. Preferably, the TCP port number is not selected from among TCP values that are well-known in the field. Using a non-well-known value allows the synchronization mechanism described herein.

Figure 3:
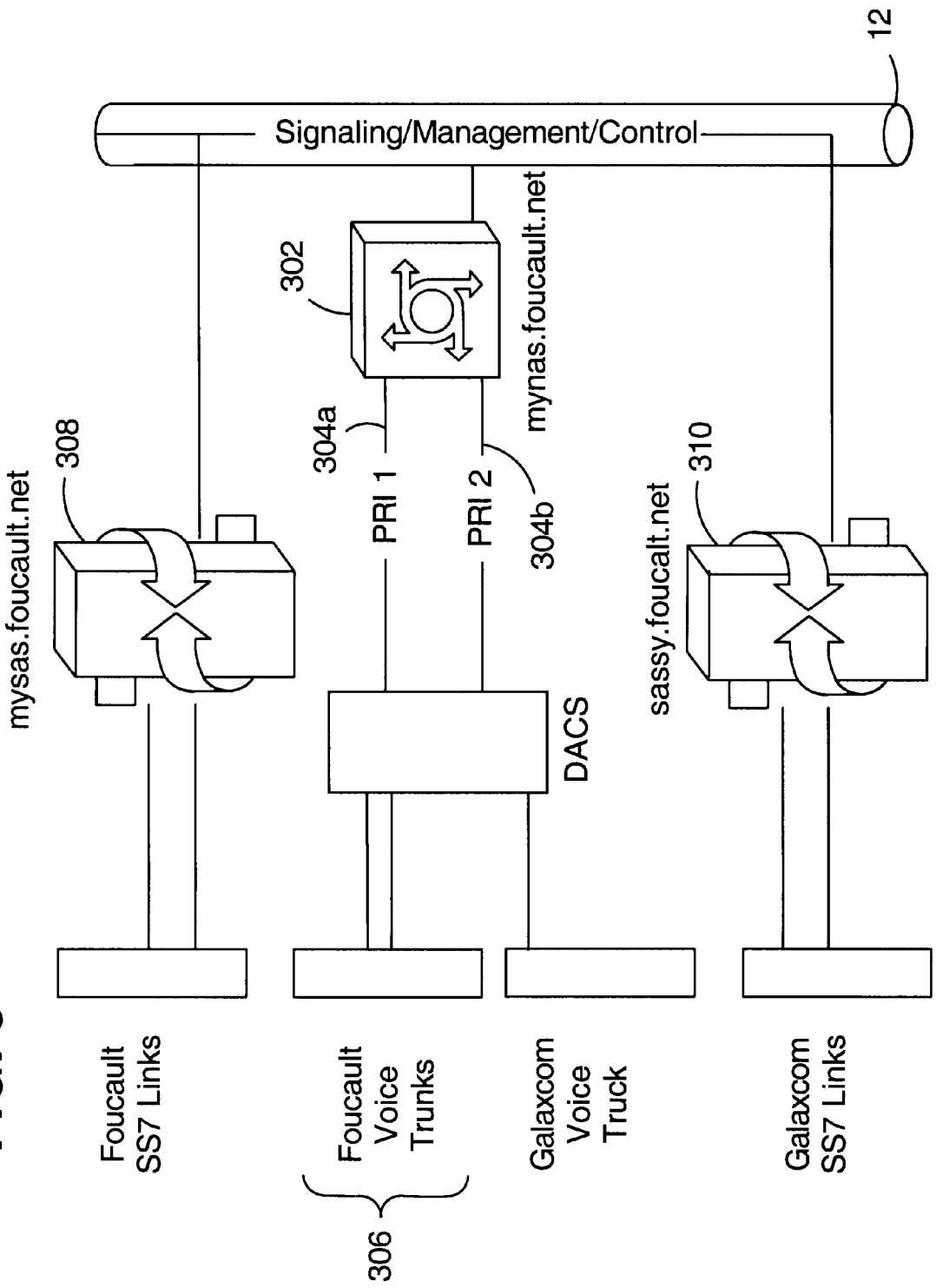
FIG. 3 is a block diagram of a configuration of multiple Network Access Servers and a Signaling Access Server.

FIG. 3 and the following description provide a simplified example of an alternate embodiment of a configuration of identifying and configuring multiple Network Access Servers and an SAS. For convenience, elements of FIG. 3 are described using DNS names. A service supplier called "Foucault" has an Network Access Server 302 named "mynas.foucault.net". Network Access Server 302 has two PRI links 304a, 304b coupled two it. The first PRI link 304a, and half the timeslots on the second PRI link 304b, are part of the Foucault voice network 306. These timeslots are managed by Foucault's SAS 308, which is named "mysas-.foucault.net". The remaining timeslots of the second PRI link 304b belong to an inter-exchange carrier, Galaxcom. This configuration may occur if, for example, Galaxcom merely needs a few dial termination ports in one of Foucault's points of presence. The Galaxcom timeslots are managed by Galaxcom's SAS 310, named "sassy.galaxcom-.net".

The SAS/Network Access Server configuration information in "mynas.foucault.net" would have the following values:

(PRI 1/*, PRI 2/1–12)→mysas.foucault.net:1658
(PRI 2/13–24)→sassy.galaxcom.net:2120

In this information, the value "PRI 1/*" includes a wildcard symbol, "*", that refers to all timeslots in the first PRI link 304a. The value "PRI 2/1–12" indicates timeslots 2 through 12, inclusive, in the second PRI link 304b.

NETWORK ACCESS SERVER PROTOCOL INITIALIZATION

The Network Access Server is responsible for initiating the Network Access Server/SAS protocol with each SAS it has configured. Redundant links are maintained between each NAS and its SAS. One of these links will be used for signaling messages at a time. If the currently active link fails, the NAS will switch to the backup link. If both of these links fail, the NAS declares the SAS to be down, and places the configured resources in "down" state. The NAS sets a timers, for example, a one-minute value, and tries repeatedly to re-establish communication with the SAS. When communication is re-established, the NAS places the configured resources in a "running" state. When the connection enters the "running" state, the Network Access Server issues a STATUS message declaring each of the configured resources to be "up". If a configured resource is down due to hardware failure or because it has been set "administratively down", then the configured resource is not declared to be "up".

SAS PROTOCOL INITIALIZATION

The Signaling Access Server 112 listens for UDP messages on each port it has configured. If a UDP message comes in, the Signaling Access Server 112 checks the source IP address and accepts the message if and only if the IP address matches one of the IP addresses the Signaling Access Server 112 has configured for the Network Access Server. Once the connection enters the "running" state, the Signaling Access Server waits for the Network Access Server to declare some or all of the configured resources to be operational via STATUS messages.

For load balancing purposes, it is preferable for each Network Access Server to be configured to use a different IP port, rather than one "well-known" port. Multiple I/O channel controllers may be running simultaneously. Each will listen for connections on a different port.

MAPPING BETWEEN CIRCUIT IDENTIFIERS AND NETWORK ACCESS SERVER IDENTIFIERS

Each SS7 circuit is identified by three values: an originating point code value, a destination point code value, and a circuit identification code. The Signaling Access Server 112 uses these three values to uniquely identify each SS7 bearer circuit. Each PRI circuit is identified by two values: the span ID, and the timeslot within the span. The SAS uses this information to uniquely identify each PRI bearer circuit.

Each Signaling Access Server 112 stores an internal mapping of bearer circuits on the public switched telephone network side to bearer circuits on the Network Access Server side of a connection. Accordingly, the SAS can determine which bearer circuit to use for the ongoing leg of a call when a call is originated from either the public switched telephone network side or the Network Access Server side.

Given information identifying a bearer circuit, the Signaling Access Server 112 can determine a valid route for signaling messages that will control that circuit. Routes are expressed in terms of signal paths. For SS7, each signal path represents an SS7 link set. For Network Access Servers 118, each signal path represents an IP connection to a Network Access Server.

A protocol variant value is associated with each signal path. The protocol variant value identifies the protocol variant that can be used on or with the signal path. For SS7 signal paths, any of the supported ISUP, TUP, or BTNUP protocol variants can be used, and the protocol variant value identifies the particular protocol. For Network Access Server signal paths, the protocol described in this document is used and identified by the protocol variant value.

CALL SETUP, MONITORING, AND TEARDOWN

Figure 4:
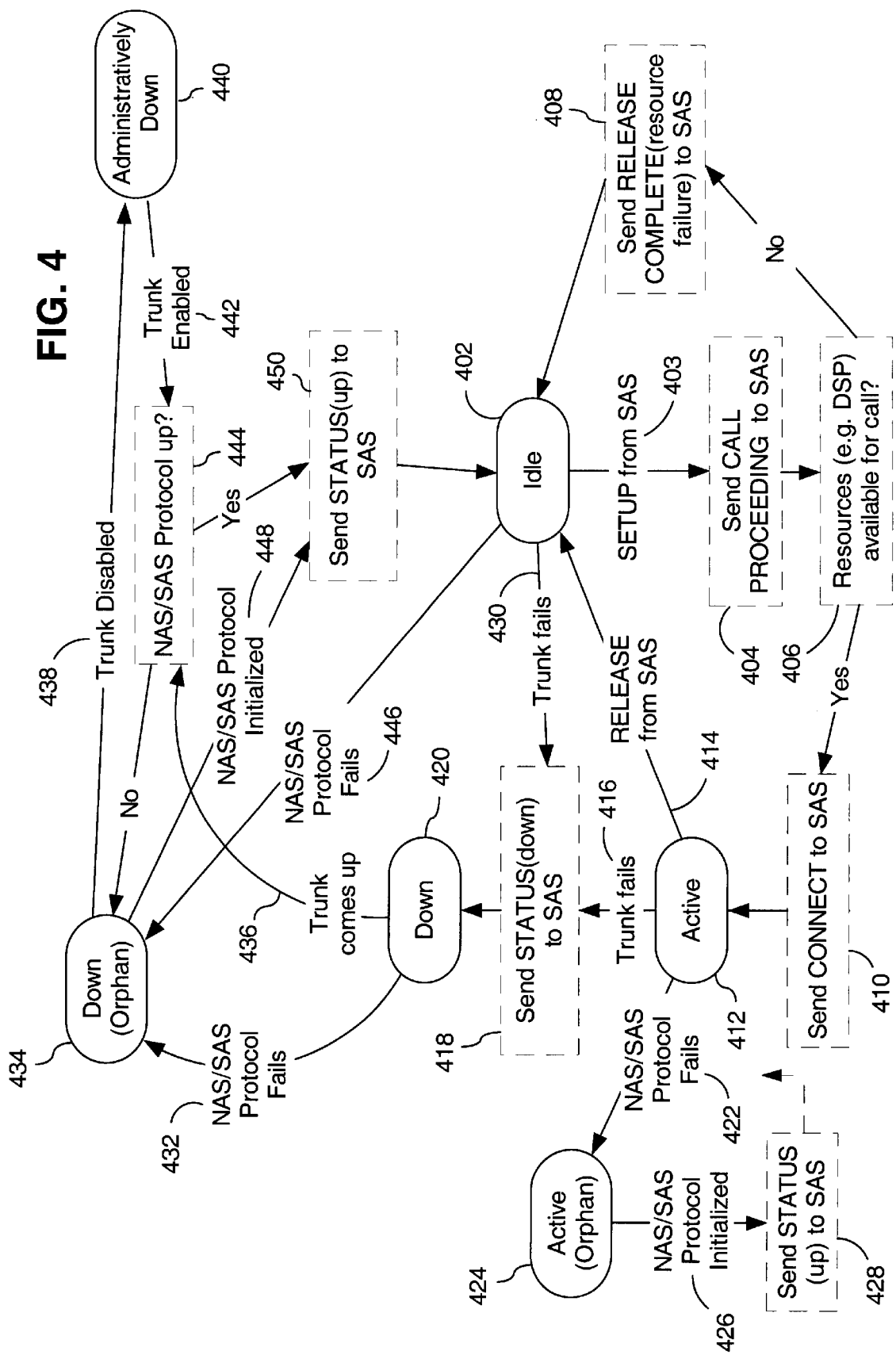
FIG. 4 is a state diagram of processes executed by a Network Access Server in processing calls.

FIG. 4 is a state diagram of processes executed by a Network Access Server 118 in setting up, monitoring, and tearing down calls.

A Network Access Server 118 initially is in the Idle state 402. When a new call is to be set up, a Signaling Access Server 112 sends a SETUP message to the Network Access Server 118, as indicated by block 403. In response, the Network Access Server 118 sends a Call Processing message back to the Signaling Access Server 112, as shown by block 404. The Network Access Server 118 then tests, as shown by block 406, whether the Network Access Server has sufficient resources to handle a new call, such as a digital signal processor to handle voice traffic. If insufficient resources are available, then the Network Access Server 118 sends a Release Complete message to the Signaling Access Server 112, as shown by block 408. The Network Access Server then returns to the Idle state.

If the Network Access Server 118 has enough resources for the call, then the Network Access Server sends a Connect message back to the Signaling Access Server 112, as indicated by block 410. The Network Access Server 118 then enters the Active state 412. Under normal conditions, the call continues until terminated by a calling party or called party or by an intermediate network element. Call termination is signaled from the Signaling Access Server 112 to the Network Access Server 118 by a Release message, as shown by block 414. Upon receiving the Release message, the Network Access Server 118 releases resources that have been assigned to the call and enters the Idle state 402.

Certain abnormal conditions can occur. For example, a trunk connected to the NAS may fail, as shown by block 416. In this condition, Network Access Server 118 sends a Status message carrying a Down value to Signaling Access Server 112, as indicated by block 418. The Network Access Server 118 then enters the Down state 420.

The Network Access Server 118 may also enter the Down state 420 from the Idle state 402 if, for example, the trunk fails, as shown by path 430.

As another example, the Network Access Server/SAS protocol may fail, as indicated by block 422. In this case, the Network Access Server 118 enters the Active Orphan state 424, indicating that the Network Access Server is active and available but has been logically separated or orphaned from its associated Signaling Access Server 112. The Network Access Server 118 then waits, as shown by block 426, until the Network Access Server/SAS protocol is initialized in the manner previously described. After initialization, the Network Access Server 118 sends a Status message to the Signaling Access Server 112, with the value Up to indicate that the Network Access Server has returned to the active state 412.

Network Access Server 118 may transition from the Down state 420 in several ways. In one case, if the Network Access Server/SAS protocol fails, as shown by block 432, then the Network Access Server 118 transitions to the Down Orphan state 434. The Down Orphan state 434 indicates that the Network Access Server 118 is down and has become logically separated or orphaned from its associated Signaling Access Server 112. If the Network Access Server/SAS protocol is subsequently initialized, as shown by block 448, then the Network Access Server 118 will send a Status (Up) message to Signaling Access Server 112, as shown by block 450, and re-enter the Idle state 402.

Alternatively, if the trunk is disabled when the Network Access Server 118 is in the Down Orphan state, as shown by path 438, then the Network Access Server will enter the Administratively Down state 440. Network Access Server 118 transitions out of the Administratively Down state 440 only when the trunk is re-enabled, as shown by path 442. In that case, Network Access Server 118 tests whether the Network Access Server/SAS protocol is up, as shown by block 444. If so, then control is transferred to block 450 in which the Network Access Server 118 issues the Status (Up) message to the SAS, and enters the Idle state 402.

The Network Access Server 118 may also transition from the Down state 420 when the trunk comes up, as shown by path 436. In that case, Network Access Server 118 tests whether the Network Access Server/SAS protocol is up, as shown by block 444. If so, then control is transferred to block 450 in which the Network Access Server 118 issues the Status (Up) message to the SAS, and enters the Idle state 402.

Network Access Server 118 also enters the Down Orphan state 434 from the Idle state 402 if the Network Access Server/SAS protocol fails, as shown by block 446.

It will be apparent from FIG. 4 and the foregoing description that most call completion tasks are carried out by Signaling Access Server 112. Resource allocation, however, is a key function carried out by the Network Access Server 118.

In the preferred embodiment, each DS0 resource executes its own state machine of the type shown in FIG. 4. This may be accomplished, for example, using object-oriented programming techniques such that each DS0 channel invokes an independent program thread when the DS0 channel is used.

SAS SERVICE STATES

Figure 5:
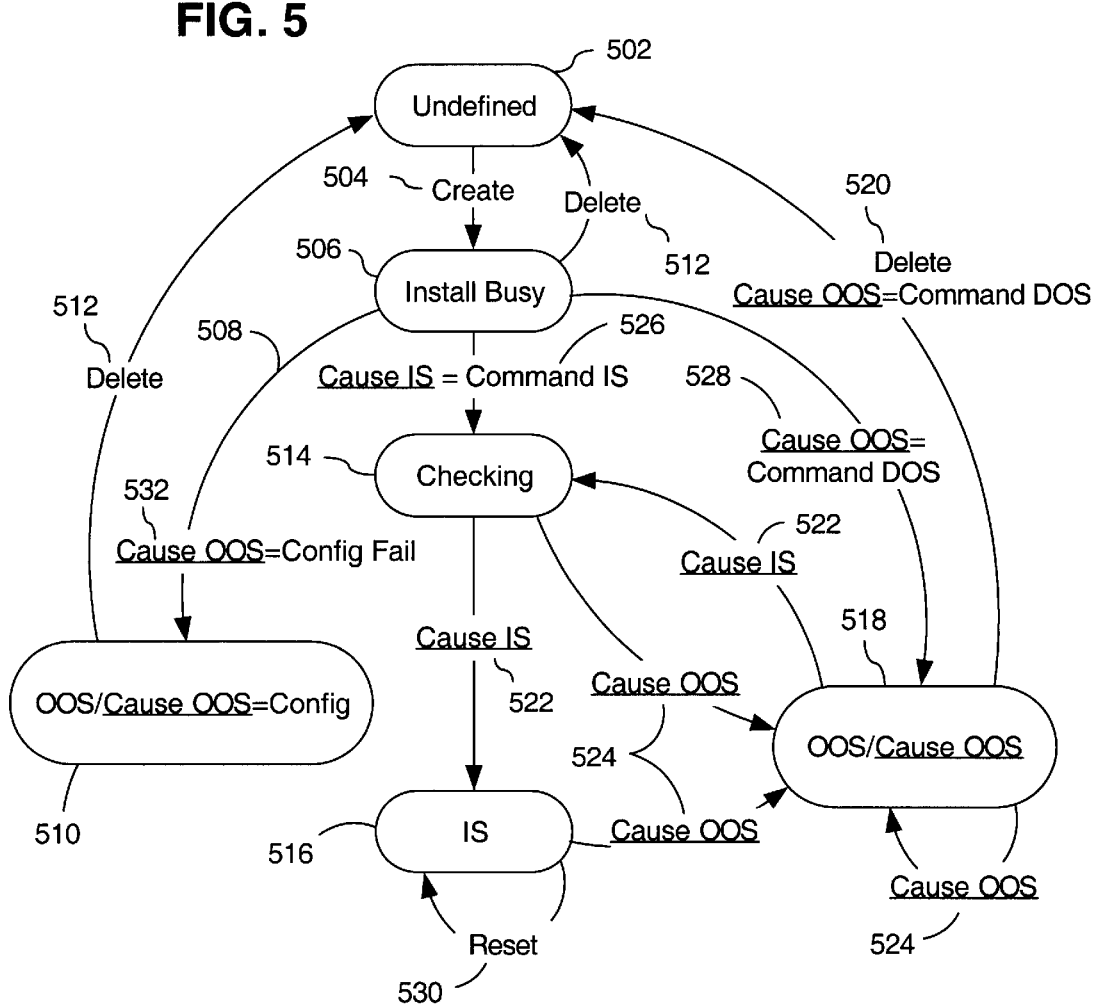
FIG. 5 is a state diagram of processes carried out by a Signaling Access Server.

FIG. 5 is a state diagram of processes carried out by a preferred embodiment of Signaling Access Server 112. FIG. 5 and Signaling Access Server include the following states and transition events.

The Undefined state 502 means that an entity does not exist in the Network Element configuration. The Undefined state 502 is the starting state for the Signaling Access Server 112.

The Install Busy state 506 means that an entity has just been created in the Network Element database, but has not yet been commanded in-service or out-of-service.

The Checking state 514 is a transitional state to which the Signaling Access Server 112 transitions just before entering the In Service state 516. In the Checking state 514, the SAS performs validation on the configuration and supporting entities. If the configuration is erroneous, a transition is made to the Out Of Service Config state 510. If a supporting entity is failed, for example, if an I/O card fails, or there is a standing out-of-service condition, then a transition is made to the Out Of Service state 518.

The In Service state 516 indicates that the entity is fully operational and capable of providing service to a requesting entity. For example, a C7 link can provide service to the Conversion Engine 900.

The Out Of Service/Cause Out Of Service state 518 is entered when the entity is not providing service to a requesting entity. The reason for lack of service is defined in the Cause value. There may be multiple reasons for the entity to be in the Out Of Service state 518.

The Out Of Service/Config state 510 is entered when the entity is not providing service because the user-defined configuration is erroneous. This state is a "dead" state out of which the entity may transition only if the entity is deleted.

The following transition events, shown in FIG. 5, cause Signaling Access Server 112 to transition from one state of FIG. 5 to a different state.

The Create transition event 504 indicates that the entity has just been created in the Network Element database, for one of three reasons. A first reason is default creation, for example, a network element object must always exist. A second reason is that the entity presence is automatically recognized, for example, a physical card exists in the system. A third method of generating the Create transition event 504 is an explicit management command to the Signaling Access Server 112, for example, a command to create an entity.

The Delete transition event 512 indicates that the entity has just been deleted from the Network Element database. Any later operation identifying a deleted entity will be rejected by Signaling Access Server 112.

The Delete Commanded Out of Service transition event 520 indicates that the entity was in the Out of Service state 518 due to a Commanded Out of Service request, and the entity has been deleted from the Network Element database.

The Cause In Service transition event 522 indicates that all causes for the Out of Service state 518 have been resolved. The Cause In Service transition event 522 indicates a transition toward the In Service state 516.

The Cause Out of State transition event 524 indicates that a transition toward the Out of Service state 518 has occurred, for one of several reasons. Examples of reasons include supporting entity failure; supporting entity commanded Out of Service; Commanded out of service; Local inhibit; remote inhibit; congestion; and others. Based on the order of events received, multiple causes may exist in an entity. For example, a link may be in an Out of Service state because of Local Inhibit as well as Supporting Entity Failure. Once the Supporting Entity Failure clears, the link must stay in the Out of Service state because it is inhibited.

The Cause In Service Commanded In Service transition event 526 indicates that a user has requested taking the entity in service.

The Cause Out Of Service Commanded Out Of Service transition event 528 indicates that the user has requested the entity to be taken out of service.

The Reset transition event 530 indicates that the entity is re-initializing, due to a sequence of events, or user command. An example of a triggering event sequence is a Reset signal issued by a card, process or signaling channel; a Reset may cause the entity to clear transient memory and continue processing. The transition occurs from the In Service state and returns to the In Service state.

The Cause Out of Service Config Fail transition event 532 is caused by an anomaly in the user configuration, resulting in a failure to provision the entity. For example, if a user requests that a signal channel be added using the same timeslot as a previously added signal channel, the entity will transition from the Install Busy state to the Out Of Service Config state.

CONTINUITY TESTING

Figure 6:
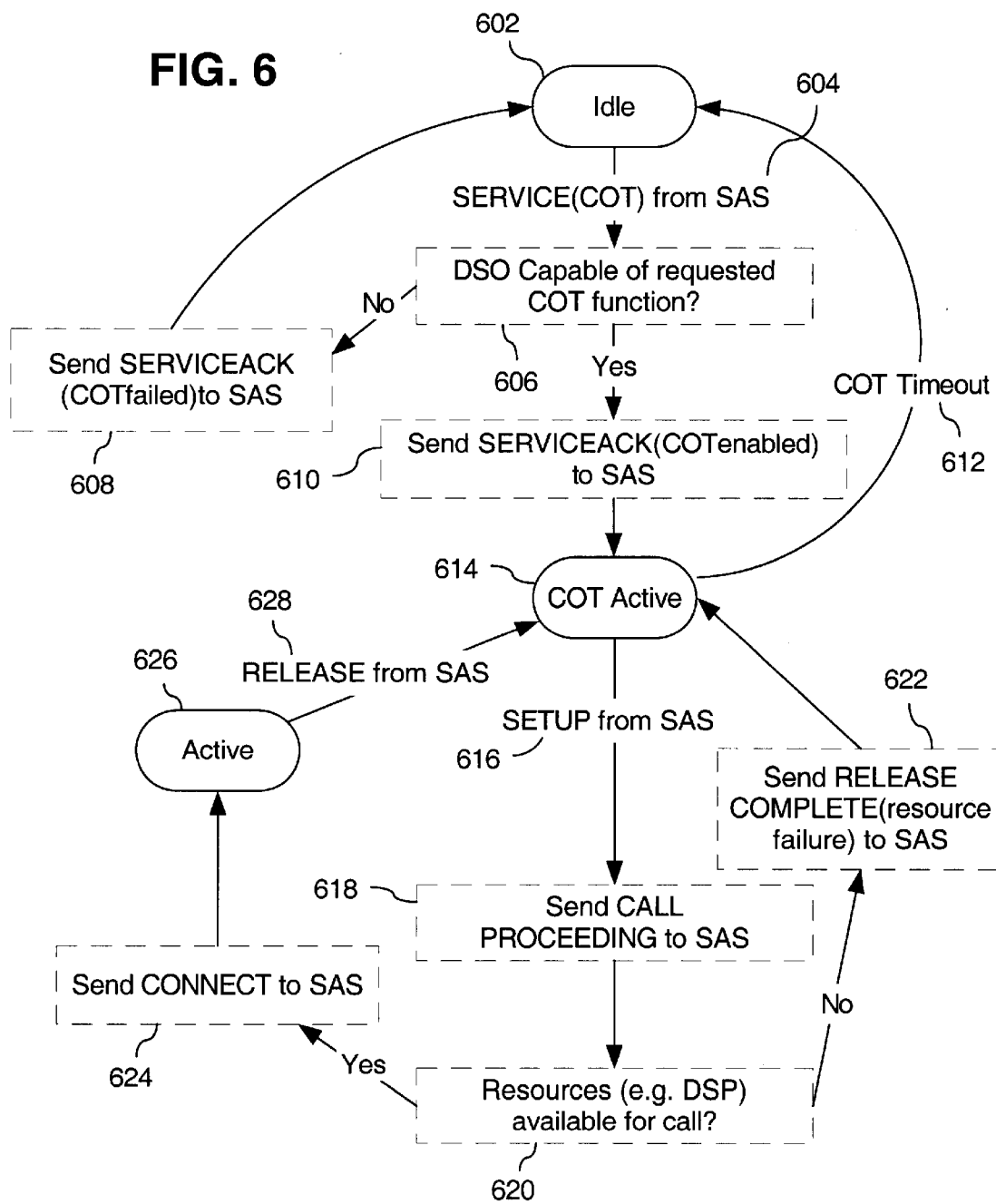
FIG. 6 is a state diagram of processes carried out by the Network Access Server to perform continuity testing.

FIG. 6 is a state diagram of processes carried out by the Network Access Server 118 to perform DS0 continuity testing. The SS7 network 4 may request such testing through the Signaling Access Server 112. In the preferred embodiment, the states, transition events, and processes shown in FIG. 6 are integrated into software elements that carry out the processes of FIG. 4. Alternatively, separate software components may be used.

Initially the Network Access Server 118 is in the Idle state 602. To request continuity testing, Signaling Access Server 112 sends a Service (COT) message to the Network Access Server 118, as shown by block 604. The Network Access Server 118 then tests whether the DS0 is capable of carrying out the requested continuity testing function, as shown by block 606. If the DS0 cannot carry out the requested continuity testing function, then the Network Access Server 118 sends a failure message to the Signaling Access Server 112, as shown by block 608. The failure message may be the message "SERVICEACK (COT failed)". The Network Access Server 118 then returns to Idle state 602.

If the DS0 is capable of proper testing, then the Network Access Server 118 sends an affirmative acknowledgment message back to the Signaling Access Server 112, as shown by block 610. The Network Access Server then enters the COT Active state 614. The remaining states and transition events of FIG. 6 correspond to like-named states and transition events of FIG. 4.

Call Processing

The system 2 may be applied to numerous functions or applications that involve interconnection of telephone companies' intelligent network infrastructure to a data network, for example, the Internet.

For example, the system 2 may provide a dial termination function that enables Internet access to be achieved over the public switched telephony network. In this application, end users with modems or ISDN terminal adapters access the Internet by making a telephone call to an Internet Service Provider's point of presence. The point of presence has one or more Network Access Servers 118. The Network Access Servers 118 answer the calls and establish a PPP connection to the end user's modem or a router coupled to the end user's computer.

In this configuration, the system 2 can carry out Network Access Server resource and call congestion management. For example, the SAS can monitor resource usage at various Network Access Servers and direct calls to a particular Network Access Server depending on the load. The system 2 may also implement dial outsourcing. For example, an SAS or Network Access Server can be provisioned by a local exchange carrier and calls can be directed to Network Access Servers associated with different Internet Service Providers according to a subscription profile associated with a user. In a more advanced form of dial outsourcing, PPP tunneling protocols such as L2TP can allow any Network Access Server to handle a call for any Internet Service Provider, with the SAS providing call routing, failure recovery, and other functions.

The system 2 may also implement a dial origination function. In this application, an Internet Service Provider may dial out to users as well as allow users to dial in. Dial origination may be used to provide dial-backup links as part of a virtual private network. Dial origination may also be used to provide, on demand, extra bandwidth using N×64 switched trunks. Further, dial origination can provide ISP dialout, whereby an Internet Service Provider can call the customer to deliver email, "push" content, and other information. For this application, the Network Access Server and SAS provide certain originating switch functions.

The system 2 may also implement a voice-over-Internet Protocol application, by which a Network Access Server may accept voice calls, fax calls, and dial termination calls, and carry such calls over the Internet. The calls may terminate either at a device that operates natively using Internet Protocol, or the calls may be coupled to another gateway and rejoin the public switched telephone network ("hop on/hop off"). For this application, the Network Access Server and SAS provide certain originating switch functions.

The system 2 may carry out access control. For example, based on attributes of a message, system 2 applies a pre-defined access control policy and allows or refuses the message accordingly. The attributes or criteria may be time of day, destination, type of service, protocol used, source or calling number, number, whether the call has been transferred, and other criteria.

The system 2 may carry out calling line ID blocking, for example, by having the SAS suppress the calling line id information element in messages sent to the SS7 network.

The system 2 may carry out originating point code screening. Point codes are network addressing elements. ISUP messages or TCAP messages carry the value of a calling number, a called number, whether the call has been transferred, and a generic address parameter with the actual phone number that the call is going to. For example, in 800 number calling, there may be multiple different 800 calls, all using different 800 numbers that arrive at the same termination point of a subscriber or customer. Different callers dial different numbers for different services, but the calls all arrive, translated, at the same number. To properly service such calls, the subscriber or customer wants the originally-dialed 800 number delivered to it so that the customer can determine the specific service that is being requested by the caller. System 2 can identify the originating point code and provide the destination number.

System 2 can implement or enforce regulatory requirements as to how called numbers are treated, for example, whether a number needs to be screened. The utility regulatory agencies of different U.S. states have different rules for treatment of called numbers. System 2 can store a table of such rules and can apply different treatment or policies based on the laws of the state to which the call is destined. For example, the system 2 can admit or deny messages depending on their point code and where the system 2 is located or where the call is going.

System 2 may implement thresholding based on a calling number or address or other service characteristics, and according to pre-defined policy rules. For example, a calling card may be "turned off" if it is used too many times within a particular short period of time.

System 2 may also carry out network address translation to ensure a match among numbering formats used in different systems. This capability allows system 2 to provide private addresses for Network Address Servers 118 and related elements.

System 2 may carry out number translation, in which the system translates numbers to account for differences in dialing plans. The system can modify dialed digits that arrive to make it easier for the networks to route a call.

The system can protect against attacks against the data network. For example, system 2 can count messages and occurrences of events, and decide whether events are inappropriate at some preset level. If so, system 2 can block further related messages from entering the data network. The system 2 can also detect and block illegal messages that are outside the scope of a protocol definition.

Signaling Access Server 112 can store access control lists of network addresses. The access control lists may be used to block messages that contain calling numbers identified in the lists. In this way, Signaling Access Server 112 can carry out fraud prevention and block attacks on the telephone network or the data network.

Signaling Access Server 112 can store access control lists of destination point codes. The access control lists may be used to block call processing messages that are directed to one of the point codes identified in the lists.

The system 2 may provide call billing functions, thereby offloading or augmenting billing functions that are conventionally provided in Service Control Points. For example, the system 2 may implement an Advice of charge function. The Signaling Access Server 112 can query an originating switch in the network and determine whether the switch can carry out Advice of charge. If not, Signaling Access Server 112 can carry out the function on behalf of the switch.

Figure 2C:
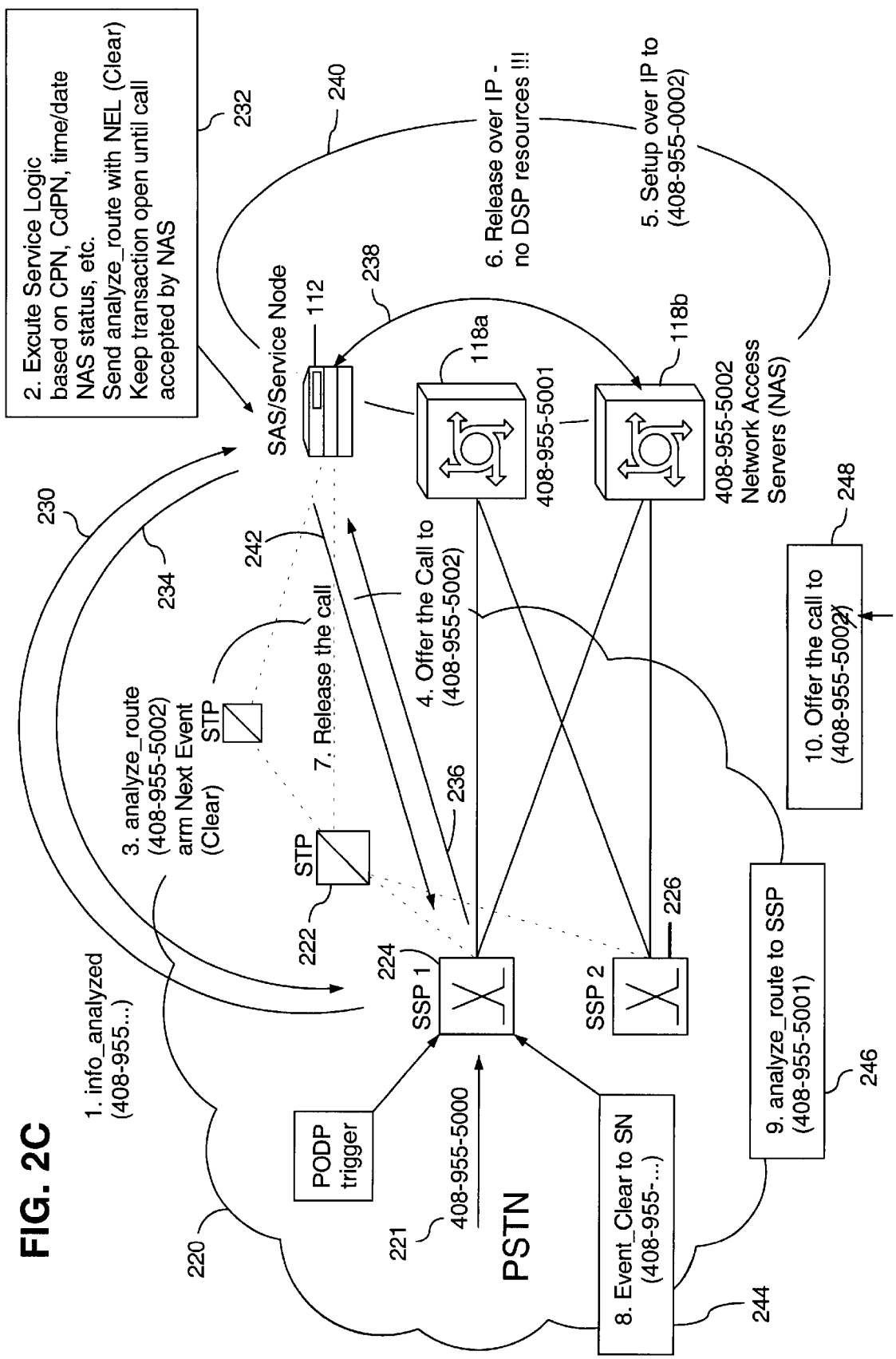
FIG. 2C is a block diagram of a process of routing a call using the system of FIG. 1A.

FIG. 2C is a block diagram of an example of a process of routing a call using the system 2. Many other call processing functions may be implemented using Signaling Access Server 112.

By way of example, FIG. 2C shows a simplified network environment comprising Signaling Access Server 112, a first Network Access Server 118a, and a second Network Access Server 118b. The Signaling Access Server 112 is coupled to public switched telephone network 220, which comprises signal transfer point 222. The signal transfer point 222 is coupled to a first SSP 224 and a second SSP 226.

Also for purposes of example, FIG. 2C illustrates a call processing scenario in which an external client is seeking dial-up access to an Internet Service Provider that has a single point of presence dial-in number, and multiple servers that can provide services to the client. Call processing begins when a dialed number, identifying the dial-in number, arrives in the network 220, as indicated by arrow 221. Assume the telephone number is "408-555-5000". The dialed number arrives in an SS7 message at SSP 224. The SSP 224 analyzes the information in the message, determines that Signaling Access Server 112 is associated with the dialed number, and forwards the message to Signaling Access Server 112, as indicated by arrow 230.

As indicated by block 232, Signaling Access Server 112 executes internal service logic. The particular steps carried out are based on the called party number, time and date, status of the Network Access Servers. In the example of FIG. 2C, Signaling Access Server 112 sends an "analyze_route" message back to SSP 224, as indicated by arrow 234. The "analyze_route" message includes a number uniquely associated with one of the Network Access Servers. For example, Signaling Access Server 112 provides the number "408-955-5002", which is uniquely associated with Network Access Server 118b. The Signaling Access Server 112 establishes a transaction for the call, and keeps the transaction open until the call is accepted by an Network Access Server in later steps.

SSP 224 then offers the call, with the specific number that has been received from Signaling Access Server 112, back to the SAS, as indicated by arrow 236. The Signaling Access Server 112 sends a call setup message to Network Access Server 118b, which is uniquely associated with the specified number, as indicated by arrow 238. If Network Access Server 118b cannot accept the call, then the Network Access Server sends a Release message back to the Signaling Access Server 112, as indicated by arrow 240. In response, Signaling Access Server 112 sends a Release message to the SSP 224, as shown by arrow 242. SSP 224 notifies the network 220 that the call is terminated by sending an "Event_Clear" message, as shown by block 244.

Signaling Access Server 112 then attempts to set up the call at a different Network Access Server, by sending another "analyze_route" message 246 to the SSP 224. The second "analyze_route" message contains a different called number, such as "408-555-5001", that is uniquely associated with a different Network Access Server, such as Network Access Server 118a. SSP 224 then offers the call to Signaling Access Server 112, and provides the different number, as indicated by block 248. If Network Access Server 118a has sufficient resources to carry out the call, the call will complete through that Network Access Server.

Figure 7A:
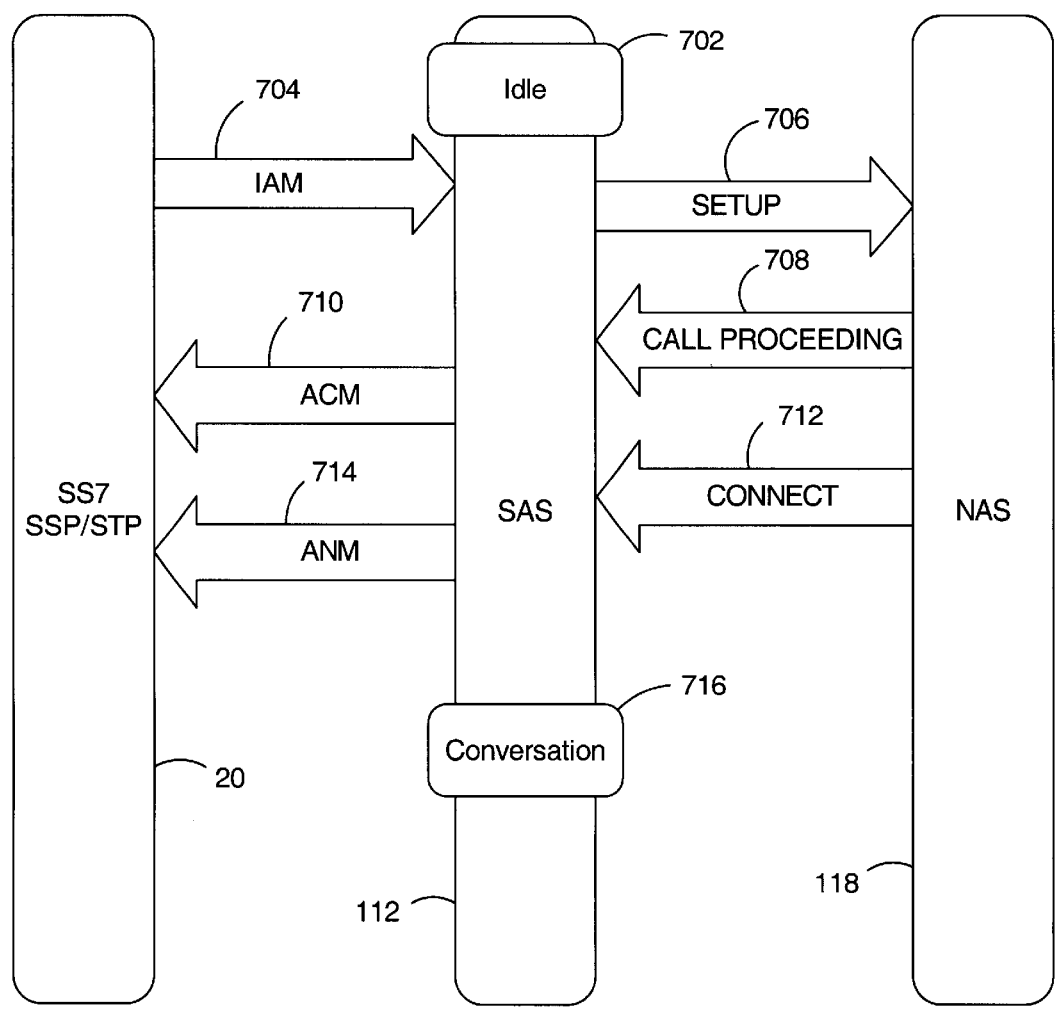
FIG. 7A is a call flow diagram showing messages communicated in carrying out certain call processing functions.

FIG. 7A is a call flow diagram showing messages communicated between SS7 network 20, Signaling Access Server 112 and Network Access Server 118 in carrying out certain call processing functions. The processes illustrated in FIG. 7A and the related diagrams assume that the system 2 is in an operational state and that catastrophic events do not occur during the call. The term "operational state" in this context means that the SS7 links to the Network Access Server are running, and the SAS/Network Access Server protocol has been initialized. The term "catastrophic event" means a crash of the Network Access Server or SAS or loss of a link.

FIG. 7A specifically shows messages communicated for normal setup of a call, originated by the public switched telephone network as represented by SS7 trunks 20, without alerting, and without continuity testing. Initially the Signaling Access Server 112 is in the Idle state 702. The network 20 delivers an Initial Address Message 704 to the Signaling Access Server 112. Signaling Access Server 112 sends a Setup message 706 to one of its associated Network Access Servers 118. The Network Access Server 118 responds with a Call Processing message 708. Signaling Access Server 112 interprets the Call Processing message as an affirmative acknowledgment and, accordingly, Signaling Access Server 112 sends an acknowledgment message 710 to network 20.

Network Access Server 118 then establishes a call connection. For example, in the ISP dial-up context, Network Access Server 118 may select a modem or other connecting device at the premises of an Internet Service Provider. When the connection has been established, Network Access Server 118 sends a Connect message 712 to Signaling Access Server 112. The Signaling Access Server 112 responds by sending an Answer message 714 to network 20. Conventionally, the Answer message indicates that a called party has answered a telephone or other network element, however, in this context the Answer message indicates that call setup is successful and a connection has been established. Signaling Access Server 112 then enters a Conversation state 716 in which a voice conversation or data conversation occurs.

Figure 7B:
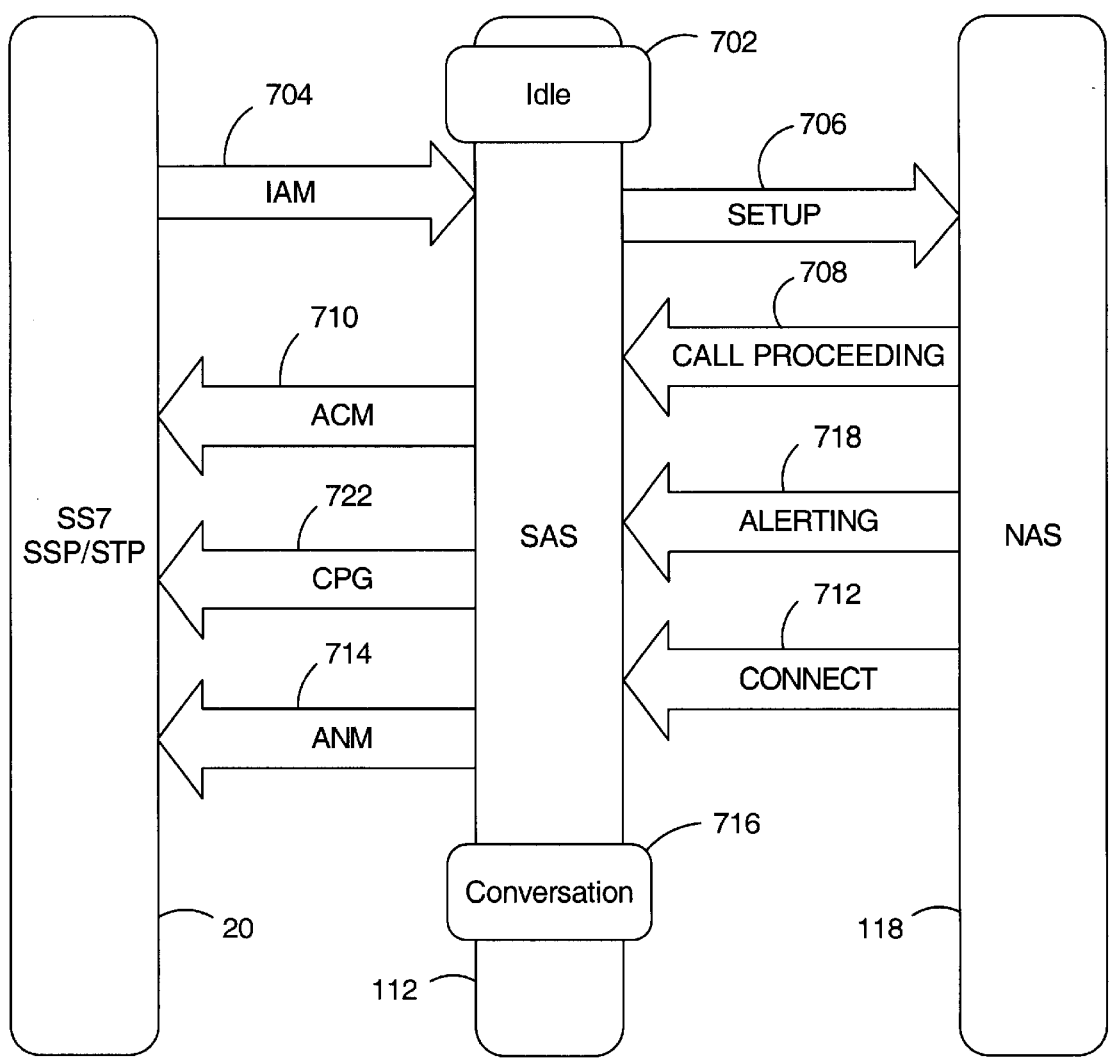
FIG. 7B illustrates messages exchanged as in FIG. 7A, with an alerting function applied to the call.

FIG. 7B illustrates messages exchanged among the same elements of system 2 as in FIG. 7A, but with an alerting function applied to the call. In this scenario, after sending the Call Proceeding message, Network Access Server 118 additionally sends an Alerting message 720 to Signaling Access Server 112. Alerting is an indication to the caller that the called party's line is ringing. The Signaling Access Server 112 sends an additional Call Progressing ("CPG") message to the network 20, which indicates the called party's line is ringing.

Figure 7C:
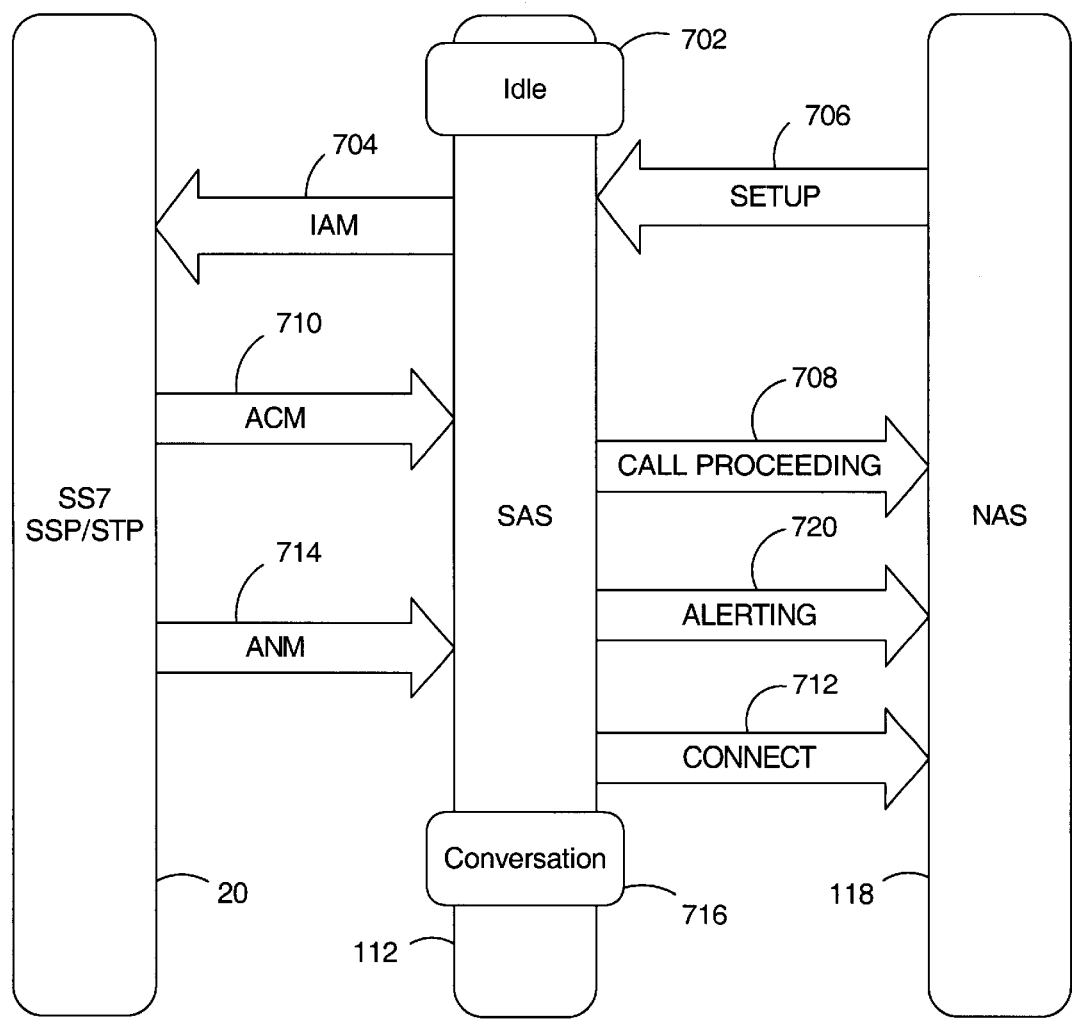
FIG. 7C illustrates messages exchanged as in FIG. 7A, when establishing a call that is originated by a Network Access Server.

FIG. 7C illustrates messages exchanged among the elements of system 2 when establishing a call that is originated by Network Access Server 118. Generally, the system executes the same messages as shown in FIG. 7A, however, the direction of the messages is reversed. For example, call setup begins when Network Access Server 118 sends a Setup message 706 to Signaling Access Server 112. The SAS then sends the Initial Address Message 704 to the network 20. Acknowledgment message 710 is sent from network 20 to Signaling Access Server 112. The remaining messages carry out the same logical steps as described above for FIG. 7A, except in the reverse direction.

Figure 8A:
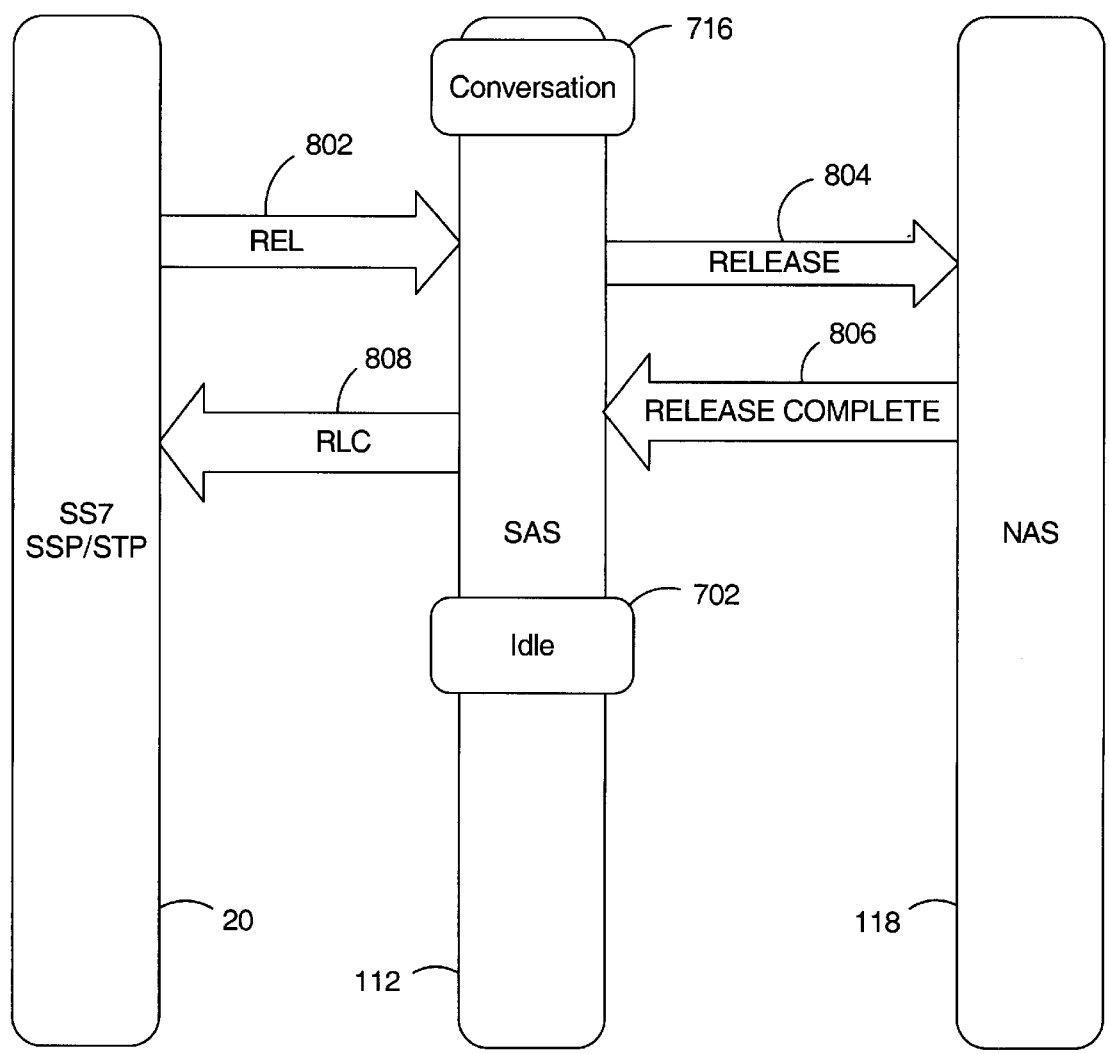
FIG. 8A illustrates messages exchanged in clearing or completing a call.

FIG. 8A illustrates messages exchanged among the network 20, Signaling Access Server 112, and Network Access Server 118 in clearing or completing a call.

The system 2 is assumed to be in the Conversation state 716, meaning that a data conversation or voice conversation is occurring across network 20, Signaling Access Server 112 and Network Access Server 118. When the call is complete, network 20 sends a Release message 802 to Signaling Access Server 112. In response, Signaling Access Server 112 sends a Release message 804 to Network Access Server 118. In response, Network Access Server 118 carries out steps to gracefully terminate the call at its end of the connection.

When call termination is complete, Network Access Server 118 sends a Release Complete message 806 to Signaling Access Server 112. In response, Signaling Access Server 112 sends a Release Complete message 808 to the network 20, providing acknowledgment that the call is terminated. The Signaling Access Server 112 then returns to the Idle state 702.

Figure 8B:
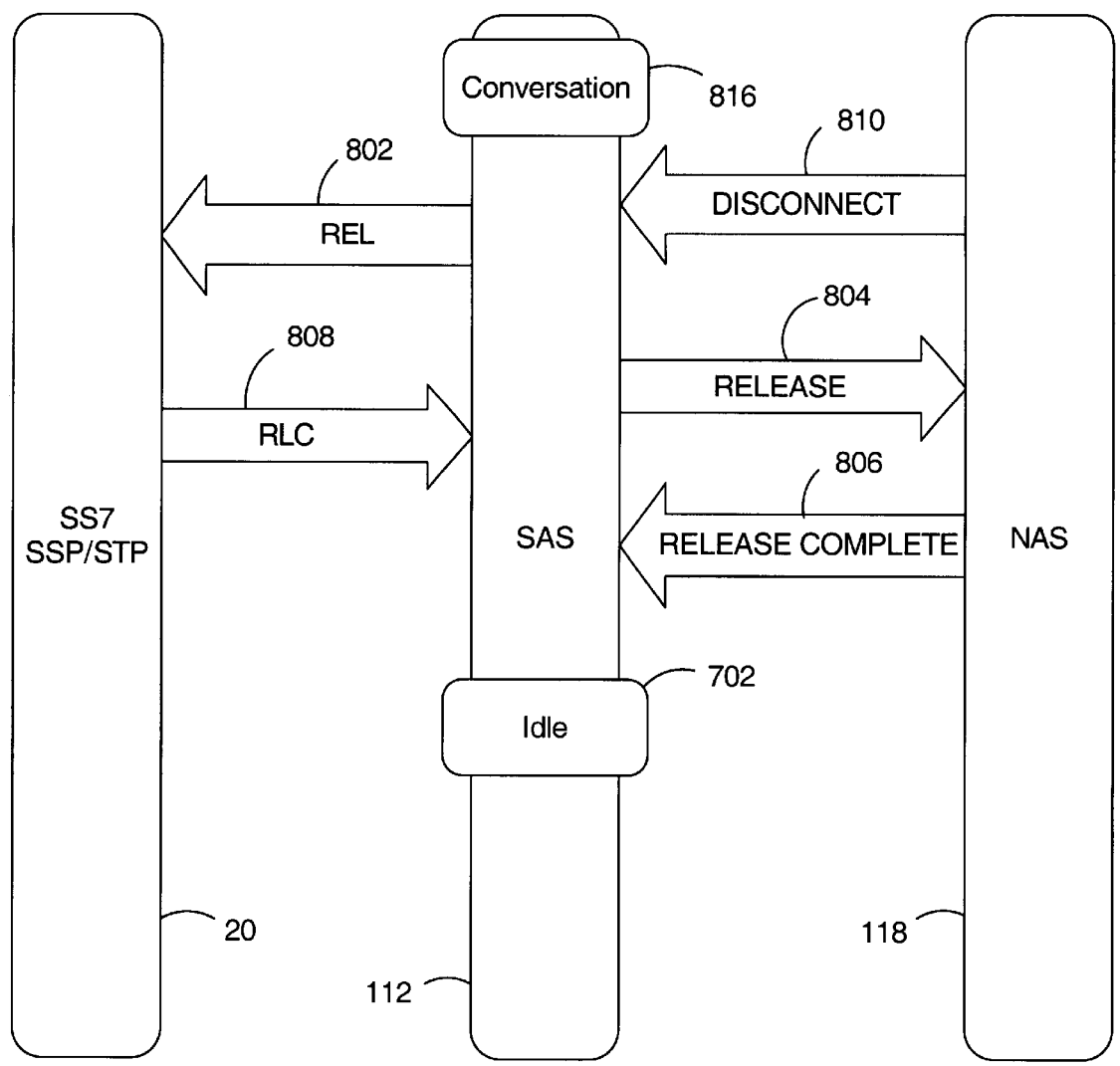
FIG. 8B illustrates messages exchanged when a call is cleared from the Network Access Server side of the connection.

FIG. 8B illustrates messages exchanged when a call is cleared from the Network Access Server 118 side of the connection.

This may occur when, for example, in a call monitoring application when an ISP intentionally terminates a connection that has been up for more than a pre-determined period of time allotted to the customer. The Network Access Server 118 initiates call clearance by sending a Disconnect message 810 to the Signaling Access Server 112. In response, Signaling Access Server 112 sends a Release message 802 to the network 20, to inform the network that the called party has released the call. The network 20 acknowledges the released call by sending a Release Complete message 808 back to the Signaling Access Server 112. In response, Signaling Access Server 112 issues a Release message 804 to the Network Access Server 118. The Network Access Server acknowledges completion of the call termination by issuing a Release Complete message 806 to the Signaling Access Server 112, which then enters Idle state 702.

Figure 8C:
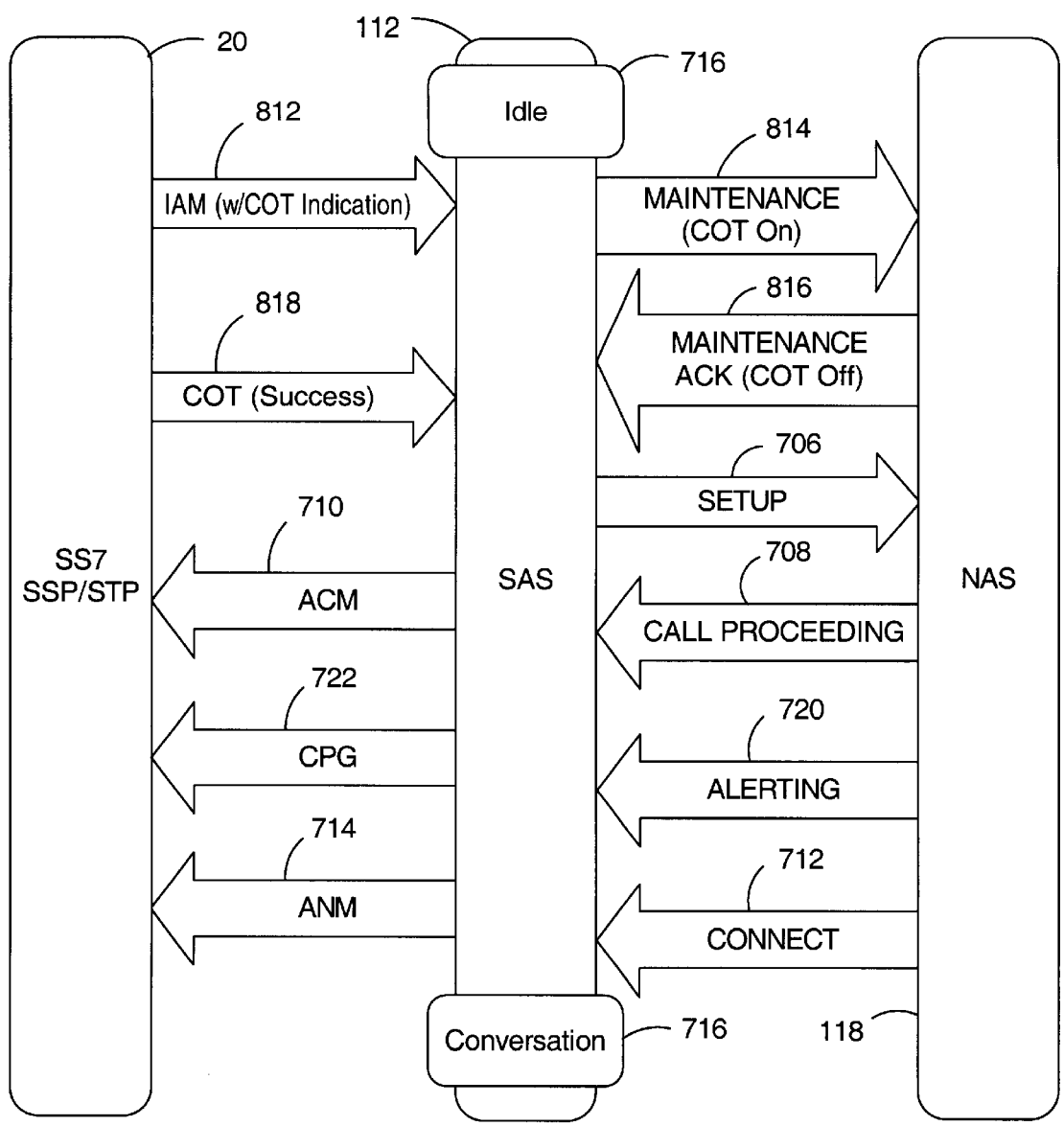
FIG. 8C illustrates messages exchanged in establishing a call originated by the telephone network and with successful continuity testing.

FIG. 8C illustrates messages exchanged in establishing a call originated by the telephone network and with successful continuity testing. The SS7 network 20, in order to detect failures of DS0 channels, will at times request a continuity test of a channel before establishing a call.

From the Idle state 716, the Signaling Access Server 112 receives an Initial Address Message 812, containing a continuity testing ("COT") indication, from the network 20. In response, Signaling Access Server 112 sends a Maintenance message 814 with a COT On parameter to the Network Access Server 118. The Network Access Server 118 then carries out continuity testing of a channel that will be used for the call. If the test is successful, then the Network Access Server 118 returns a Maintenance Acknowledge message 816, with a COT off indication, to Signaling Access Server 112. The Signaling Access Server 112 then receives a COT Success message 818 from the network 20. The direction of arrow 818 indicates that the originating switch has heard a tone played back over a loopback circuit established by the NAS. The purpose of this test is to verify the bearer, so the signaling messages set up the test and reporting the result.

Signaling Access Server 112 then sends the standard call Setup message 706 to Network Access Server 112, as in previous FIG.s. Network Access Server 118 responds with a Call Proceeding message 708 and begins to set up the call internally. Signaling Access Server 112 informs network 20 that the call is being set up by sending the ACM message 710 to the network. When the Network Access Server completes call setup, it sends an Alerting message 720 to Signaling Access Server 112. The Signaling Access Server 112 forwards the CPG message 722 to the network 20. When a call connection is established at the far end, Network Access Server 118 reports the successful connection to Signaling Access Server 112 using Connect message 712. The Signaling Access Server 112 converts the Connect message 712 into an Answer message 714 that will be understood by network 20 and forwards the Answer message to the network. As a result, a data or voice conversation is established, as indicated by Conversation state 716.

Importantly, a Setup message 706 can be sent to the Network Access Server 118 while COT remains on. No explicit COT Off message has to be sent first. The Network Access Server 118 turns COT off before returning the Call Proceeding message 708.

Preferably, one or more software components executing in the Network Access Server 118 provide a guard timer, with a present timing value, which starts running when COT is turned on. If no Maintenance message is received before the guard timer expires, then Network Access Server 118 automatically turns off COT.

Figure 8D:
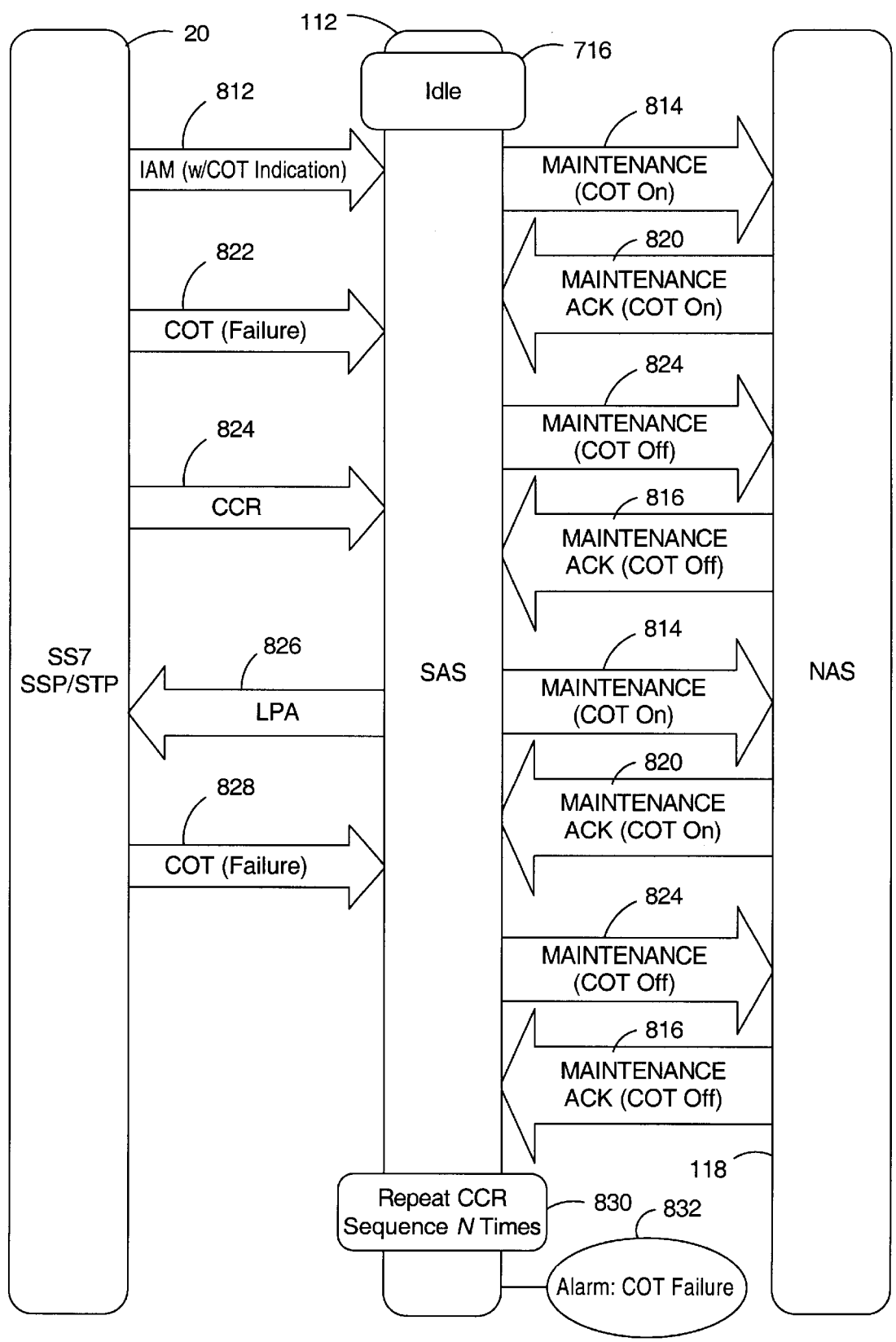
FIG. 8D is a diagram of messages communicated among the network, Signaling Access Server, and Network Access Server in setting up a call, originated at the network, with continuity testing enabled but when continuity fails.

FIG. 8D is a diagram of messages communicated among the network 20, Signaling Access Server 112, and Network Access Server 118 in setting up a call, originated at the network, with continuity testing enabled but when continuity fails. Initially the Signaling Access Server 112 is in the Idle state 716. Network 20 initiates a call by sending Initial Address Message 812 with a continuity testing indication. Signaling Access Server 112 sends a Maintenance message 814 with a COT On parameter to Network Access Server 118, which acknowledges with a Maintenance Acknowledge message 820 that contains the COT On parameter. Network 20 sends Signaling Access Server 112 a continuity testing message 822 with a Failure parameter. The Failure parameter indicates that COT failed. For example, by failing to detect tone on a bearer circuit, a switch may determine that COT failed. The SS7 network is used for signaling messages only, so the SS7 network doesn't detect COT failure; the bearers being tested are a completely separate network. In response, Signaling Access Server 112 turns off continuity testing at the Network Access Server 118 by sending a Maintenance message 824 with the COT Off parameter. Network Access Server 118 acknowledges with the Maintenance Acknowledge message 816.

Network 20 then sends a Continuity Check Request message 824 to Signaling Access Server 112, which requests the SAS to carry out a continuity check. Signaling Access Server 112 again tells Network Access Server 118 to turn on continuity testing with a Maintenance message 814, which is acknowledged by message 820. Signaling Access Server 112 then sends a Loopback Acknowledgement message 826 ("LPA") to the network 20. LPA means that the Continuity Check Request has been satisfied, so the switch on the other end of the circuit can begin testing. The CCR-LPA-COT series of messages may be repeated several times. IAM is one way of starting a COT test; CCR is the other.

If continuity testing still fails, network 20 responds with a continuity message 828 containing the Failure parameter. Signaling Access Server 112 then again tells Network Access Server 118 to turn off continuity testing, using message 824, which is acknowledged by message 816.

As indicated by block 830, the continuity check request sequence of message 824, message 814, message 820, message 826, message 828, message 824, and message 816, may be repeated a predetermined number of times. If continuity testing still fails, then Signaling Access Server 112 raises an alarm indicating continuity failure, as shown by block 832.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

APPENDIX 1—SUPPORTED PROTOCOLS

4.3.1. SAS Network Protocol Support

4.3.1.1. Signaling Protocols to be Supported

| Network Side (Facing PSTN) |
|---|
| ITU MTP 1-3 (ITU White book) |
| ITU MTP 1-3 (ITU Blue book) |
| ANSI MTP 1-3 |
| C-TUP (China) |
| BT-NUP |
| ANSI ISUP |
| ETSI ISUP V.2 |
| Additional ITU Q.76x ISUP national variants (to include France/China) |
| Bellcore ISUP |
| UK ISUP |
| France ISUP |

| User Side (Facing NAS) |
|---|
| NI-2 PRI over T-1/E-1 interface (for early field trial) |
| NI-2 PRI over IP (for general product availability) |

4.3.1.1.1. Bellcore TR-1268 (NI-2) Supported Messages

| |
|---|
| ALERTing |
| CALL PROCeeding |
| CONNect |
| CONNect ACKnowledge |
| DISConnect |
| PROGress |
| RELease |
| RELease COMplete |
| RESTart |
| RESTart ACKnowledge |
| SETUP |
| SERVICE |
| SERVICE ACKnowledge |
| STATus |
| STATus ENQuiry |

4.3.1.1.2. Bellcore TR-1268 (NI-2) Supported Information Elements

| Bearer Capability |
|---|
| Call State |
| Called Party Number |
| Called Party Subaddress |
| Calling Party Number |
| Calling Party Subaddress |
| Cause |
| Channel Identification |
| High-Layer Compatibility |
| Low-Layer Compatibility |
| Progress Indicator |
| Restart Indicator |

4.3.1.1.3. SAS ANSI SS7 (T1-113) Supported Messages and Information Elements

Message Type: Address Complete (ACM)

| Parameter Name | ANSI Reference | Type | Length |
|---|---|---|---|
| Message type | 2.1 | F | 1 |
| Backward call indicators | 3.3 | F | 2 |
| Access transport | 3.1A | O | 3-n |
| Cause indicators | 3.9 | O | 4-n |

Message Type: Answer (ANM)

| Parameter Name | ANSI Reference | Type | Length |
|---|---|---|---|
| Message Type | 2.1 | F | 1 |
| Access transport | 3.1A | O | 3-n |
| Backward call indicators | 3.3 | O | 4 |
| Optional backward call indicators | 3.24C | O | 3 |

Message type: Call Progress

| Parameter Name | ANSI Reference | Type | Length |
|---|---|---|---|
| Message type | 2.1 | F | 1 |
| Event information | 3.17A | F | 1 |

Message Type: Circuit Query Response (CQR)

| Parameter Name | ANSI Reference | Type | Length |
|---|---|---|---|
| Message type | 2.1 | F | 1 |
| Range and status (see note) | 3.27 | V | 2 |
| Circuit state indicator | 3.11B | V | 2-25 |

Message Type: Circuit Reservation (CRM)

| Parameter Name | ANSI Reference | Type | Length |
|---|---|---|---|
| Message type | 2.1 | F | 1 |
| Nature of connection indicators | 3.24 | F | 1 |

| Message Type: | Circuit Validation Response (CVR) | | |
|---|---|---|---|
| Parameter Name | ANSI Reference | Type | Length |
| Message type | 2.1 | F | 1 |
| Circuit validation response indicator | 3.11C | F | 1 |
| Circuit group characteristic indicators | 3.10A | F | 1 |

| Message Type: | Confusion | | |
|---|---|---|---|
| Parameter Name | ANSI Reference | Type | Length |
| Message type | 2.1 | F | 1 |
| Cause indicators | 3.9 | V | 3-n |

* EXTERNAL SYSTEM IMPACTED *

| Message Type: | Continuity (COT) | | |
|---|---|---|---|
| Parameter Name | ANSI Reference | Type | Length |
| Message type | 2.1 | F | 1 |
| Continuity indicators | 3.16 | F | 1 |

| Message type: | Information | | |
|---|---|---|---|
| Parameter Name | ANSI Reference | Type | Length |
| Message type | 2.1 | F | 1 |
| Information indicators | 3.22 | F | 2 |

| Message type: | Information request | | |
|---|---|---|---|
| Parameter Name | ANSI Reference | Type | Length |
| Message type | 2.1 | F | 1 |
| Information request indicators | 3.23 | F | 2 |

| Message type: | | Initial Address (IAM) | | |
|---|---|---|---|---|
| Parameter Name | | ANSI Reference | Type | Length |
| Message type | | 2.1 | F | 1 |
| Nature of connection indicators | | 3.24 | F | 1 |
| Forward call indicators | | 3.20 | F | 2 |
| Calling party's category | | 3.8 | F | 1 |
| User service information | | 3.33 | V | 3-n |
| Called party number | | 3.6 | V | 2-11 |
| Access transport | | 3.1A | O | 3-n |
| Calling party number | | 3.7 | O | 5-12 |
| Generic address (see note) | | 3.20A | O | 6-13 |
| User service information prime | | 3.33A | O | 4-n |

| Message type: | Release | | |
|---|---|---|---|
| Parameter Name | ANSI Reference | Type | Length |
| Message type | 2.1 | F | 1 |
| Cause indicators | 3.9 | V | 3-n |

| Message Type: | Blocking (BLO) | | |
|---|---|---|---|
| Parameter Name | ANSI Reference | Type | Length |
| Message type | 2.1 | F | 1 |

| Message Type: | Blocking Acknowledgment (BLA) | | |
|---|---|---|---|
| Parameter Name | ANSI Reference | Type | Length |
| Message type | 2.1 | F | 1 |

| Message Type: | Circuit Reservation Acknowledgment (CRA) | | |
|---|---|---|---|
| Parameter Name | ANSI Reference | Type | Length |
| Message type | 2.1 | F | 1 |

| Message Type: | Circuit Validation Test (CVT) | | |
|---|---|---|---|
| Parameter Name | ANSI Reference | Type | Length |
| Message type | 2.1 | F | 1 |

| Message Type: | Continuity Check Request (CCR) | | |
|---|---|---|---|
| Parameter Name | ANSI Reference | Type | Length |
| Message type | 2.1 | F | 1 |

* EXTERNAL SYSTEM IMPACTED *

| Message Type: | Loop Back Acknowledgment (LPA) |
|---|---|

| Parameter Name | ANSI Reference | Type | Length |
|---|---|---|---|
| Message type | 2.1 | F | 1 |

Message Type: Release Complete (RLC)

| Parameter Name | ANSI Reference | Type | Length |
|---|---|---|---|
| Message type | 2.1 | F | 1 |

Message Type: Reset Circuit (RSC)

| Parameter Name | ANSI Reference | Type | Length |
|---|---|---|---|
| Message type | 2.1 | F | 1 |

Message Type: Unblocking (UBL)

| Parameter Name | ANSI Reference | Type | Length |
|---|---|---|---|
| Message type | 2.1 | F | 1 |

Message Type: Unblocking Acknowledgment (UBA)

| Parameter Name | ANSI Reference | Type | Length |
|---|---|---|---|
| Message type | 2.1 | F | 1 |

Message Type: Circuit Group Blocking (CGB)

| Parameter Name | ANSI Reference | Type | Length |
|---|---|---|---|
| Message type | 2.1 | F | 1 |
| Circuit group supervision message type indicator | 3.11 | F | 1 |
| Range and status | 3.27 | V | 2-5 |

Message Type: Circuit Group Blocking Acknowledgment (CGBA)

| Parameter Name | ANSI Reference | Type | Length |
|---|---|---|---|
| Message type | 2.1 | F | 1 |
| Circuit group supervision message type indicator | 3.11 | F | 1 |
| Range and status | 3.27 | V | 2-5 |

−80−

| Message Type: | Circuit Group Unblocking (CGU) | | |
|---|---|---|---|
| Parameter Name | ANSI Reference | Type | Length |
| Message type | 2.1 | F | 1 |
| Circuit group supervision message type indicator | 3.11 | F | 1 |
| Range and status | 3.27 | V | 2-5 |

| Message Type: | Circuit Group Unblocking Acknowledgment (CGUA) | | |
|---|---|---|---|
| Parameter Name | ANSI Reference | Type | Length |
| Message type | 2.1 | F | 1 |
| Circuit group supervision message type indicator | 3.11 | F | 1 |
| Range and status | 3.27 | V | 2-5 |

NOTE: In these messages the status sub-field is not present when the range code is zero.

| Message Type: | Circuit Query (note 1) (CQM) | | |
|---|---|---|---|
| Parameter Name | ANSI Reference | Type | Length |
| Message type | 2.1 | F | 1 |
| Range and status | 3.27 | V | 2-5 |

4.3.1.1.4.Information element mapping between ANSI SS7 & NI-2

| ANSI SS7 TI-113 Information Elements | Bellcore TR-1268 (NI-2) Information Elements |
|---|---|
| Call setup - IP Terminating Call - IAM → SETUP | |
| User Service Information | Bearer Capability |
| Transmission Medium Requirements | Bearer Capability |
| Forward Call Indicator | No mapping |
| Access Transport | Progress Indicator |
| Calling Party Number | Calling Party Number |
| Access Transport | Calling Party Subaddress |
| Called Party Number | Called Party Number |
| Access Transport | Called Party Subaddress |
| Access Transport | High-Layer Compatibility |
| Access Transport | Low-Layer Compatibility |
| Generic Address | No Mapping |

| Call setup - IP Originating Call - SETUP → IAM | |
|---|---|
| Bearer Capability | User Service Information |
| Bearer Capability | Transmission Medium Requirements |
| Progress Indicator | Access Transport |
| Calling Party Number | Calling Party Number |
| Calling Party Subaddress | Access Transport |
| Called Party Number | Called Party Number |
| Called Party Subaddress | Access Transport |
| High-Layer Compatibility | Access Transport |
| Low-Layer Compatibility | Access Transport |

APPENDIX 2—SUPPORTED MEASUREMENTS

4.3.2.5.1. List of Supported Measurements

Supported measurements are listed in the following table.

| Component Type | Category | Units | Time Interval | Maintained By |
|---|---|---|---|---|
| C7 Link | Signaling units received | Occurrences | 30 min | IOS |
| C7 Link | Re-alignment (SIF/SIO) transmitted | Occurrences | 30 min | IOS |
| C7 Link | Re-alignment (SIF/SIO) received | Occurrences | 30 min | IOS |
| C7 Link | Duration in-service | Seconds | 30 min | IOS |
| C7 Link | Duration unavailable | Seconds | 30 min | IOS |
| C7 Link | Messaged dropped due to congestion | Count | 30 min | IOS |
| C7 Signaling Point | Duration unavailable | Seconds | 5 min, 30 min | IOS |
| C7 Signaling Point | Transmitted messaged dropped due to routing failure | Count | 30 min | IOS |
| Signal Path | ISUP Messages Sent | Count | 5 min, 30 min | Engine/MDL |
| Signal Path | ISUP Messages Received | Count | 5 min, 30 min | Engine/MDL |
| Signal Path | ISUP ACM Messages Sent | Count | 5 min, 30 min | Engine/MDL |
| Signal Path | ISUP ACM Messages Received | Count | 5 min, 30 min | Engine/MDL |
| Signal Path | ISUP ANM Messages Sent | Count | 5 min, 30 min | Engine/MDL |
| Signal Path | ISUP ANM Messages Received | Count | 5 min, 30 min | Engine/MDL |
| Signal Path | ISUP BLO Messages Sent | Count | 5 min, 30 min | Engine/MDL |
| Signal Path | ISUP BLO Messages Received | Count | 5 min, 30 min | Engine/MDL |
| Signal Path | ISUP BLA Messages Sent | Count | 5 min, 30 min | Engine/MDL |
| Signal Path | ISUP BLA Messages Received | Count | 5 min, 30 min | Engine/MDL |
| Signal Path | ISUP CPG Messages Sent | Count | 5 min, 30 min | Engine/MDL |
| Signal Path | ISUP CPG Messages Received | Count | 5 min, 30 min | Engine/MDL |
| Signal Path | ISUP CGB Messages Sent | Count | 5 min, 30 min | Engine/MDL |
| Signal Path | ISUP CGB Messages Received | Count | 5 min, 30 min | Engine/MDL |
| Signal Path | ISUP CGBA Messages Sent | Count | 5 min, 30 min | Engine/MDL |
| Signal Path | ISUP CGBA Messages Received | Count | 5 min, 30 min | Engine/MDL |
| Signal Path | ISUP GRS Messages Sent | Count | 5 min, 30 min | Engine/MDL |
| Signal Path | ISUP GRS Messages Received | Count | 5 min, 30 min | Engine/MDL |
| Signal Path | ISUP GRA Messages Sent | Count | 5 min, 30 min | Engine/MDL |

| Signal Path | ISUP GRA Messages Received | Count | 5 min, 30 min | Engine/MDL |
| Signal Path | ISUP CGU Messages Sent | Count | 5 min, 30 min | Engine/MDL |
| Signal Path | ISUP CGU Messages Received | Count | 5 min, 30 min | Engine/MDL |
| Signal Path | ISUP CGUA Messages Sent | Count | 5 min, 30 min | Engine/MDL |
| Signal Path | ISUP CGUA Messages Received | Count | 5 min, 30 min | Engine/MDL |
| Signal Path | ISUP CFN Messages Sent | Count | 5 min, 30 min | Engine/MDL |
| Signal Path | ISUP CFN Messages Received | Count | 5 min, 30 min | Engine/MDL |
| Signal Path | ISUP CON Messages Sent | Count | 5 min, 30 min | Engine/MDL |
| Signal Path | ISUP CON Messages Received | Count | 5 min, 30 min | Engine/MDL |
| Signal Path | ISUP IAM Messages Sent | Count | 5 min, 30 min | Engine/MDL |
| Signal Path | ISUP IAM Messages Received | Count | 5 min, 30 min | Engine/MDL |
| Signal Path | ISUP INF Messages Sent | Count | 5 min, 30 min | Engine/MDL |
| Signal Path | ISUP INF Messages Received | Count | 5 min, 30 min | Engine/MDL |
| Signal Path | ISUP INR Messages Sent | Count | 5 min, 30 min | Engine/MDL |
| Signal Path | ISUP INR Messages Received | Count | 5 min, 30 min | Engine/MDL |
| Signal Path | ISUP REL Messages Sent | Count | 5 min, 30 min | Engine/MDL |
| Signal Path | ISUP REL Messages Received | Count | 5 min, 30 min | Engine/MDL |
| Signal Path | ISUP RLC Messages Sent | Count | 5 min, 30 min | Engine/MDL |
| Signal Path | ISUP RLC Messages Received | Count | 5 min, 30 min | Engine/MDL |
| Signal Path | ISUP RSC Messages Sent | Count | 5 min, 30 min | Engine/MDL |
| Signal Path | ISUP RSC Messages Received | Count | 5 min, 30 min | Engine/MDL |
| Signal Path | ISUP RES Messages Sent | Count | 5 min, 30 min | Engine/MDL |
| Signal Path | ISUP RES Messages Received | Count | 5 min, 30 min | Engine/MDL |
| Signal Path | ISUP SAM Messages Sent | Count | 5 min, 30 min | Engine/MDL |
| Signal Path | ISUP SAM Messages Received | Count | 5 min, 30 min | Engine/MDL |
| Signal Path | ISUP SUS Messages Sent | Count | 5 min, 30 min | Engine/MDL |
| Signal Path | ISUP SUS Messages Received | Count | 5 min, 30 min | Engine/MDL |
| Signal Path | ISUP UBL Messages Sent | Count | 5 min, 30 min | Engine/MDL |
| Signal Path | ISUP UBL Messages Received | Count | 5 min, 30 min | Engine/MDL |
| Signal Path | ISUP UBA Messages Sent | Count | 5 min, 30 min | Engine/MDL |
| Signal Path | ISUP UBA Messages Received | Count | 5 min, 30 min | Engine/MDL |
| Signal Path | ISUP USR Messages Sent | Count | 5 min, 30 min | Engine/MDL |
| Signal Path | ISUP USR Messages Received | Count | 5 min, 30 min | Engine/MDL |
| Signal Path | ISUP Abnormal Releases | Count | 5 min, 30 min | Engine/MDL |
| Signal Path | ISUP Unexpected Messages | Count | 5 min, 30 min | Engine/MDL |
| Signal Path | ISUP Unrecognized Messages | Count | 5 min, 30 min | Engine/MDL |

What is claimed is:

1. A telecommunications apparatus that interconnects a circuit-switched telephone network and a packet-switched data network to enable communication among the networks and that provides dial outsourcing, comprising:

a signaling access server coupled to a signaling trunk of the telephone network to interchange call signaling messages therewith, and coupled through a control network to one or more network access servers each coupled to a voice of the telephone network to communicate voice-band information thereon, and coupled to receive instructions from the signaling access server through the contol network, and coupled to the data network to communicate data thereon; and a computer-readable medium coupled to the signaling access server and carrying one or more first sequences of software instructions executed by and controlling the signaling access server which, when executed by the signaling access server, cause the signaling access server to perforn dial outsourcing by carrying out the steps of:

receiving provisioning information from the network access servers that associates each of the network access servers with one of a plurality of Internet Service Providers;

receiving a subscription profile of a caller who is originating a call, wherein the subscription profile identifies one of the Intemet Service Providers to which the caller subscribes;

based on the subscription profile, selecting one of the network access servers for carrying the call into the data network; and establishing the call originating in the telephone network and containing voiceband information and terminating in the data network via the selected one of the network access servers, based on call signaling information received from the signaling trunk by the signaling access server.

2. The apparatus recited in claim 1, wherein the computer-readable medium further comprises a second sequence of instructions which, when executed by the signaling access server, cause the signaling access server to perform call congestion management by carrying out the steps of:

receiving an initial address message associated with a call originating in the telephone network;

receiving resource usage information from the network access servers that indicates processing load associated with the network access servers;

based on the resource usage information, selecting one of the network access servers for carrying the call into the data network; and establishing the call originating in the telephone network and containing voiceband information and terminating in the data network via the selected one of the network access servers, based on call signaling information received from the signaling trunk by the signaling access server.

3. The apparatus recited in claim 1, wherein the network access servers are coupled to the data network by an Internet Protocol (IP) backbone apparatus, and wherein the network access servers are coupled to the signaling access server and to a management network by the control network, and wherein the control network, the management network, the signaling access server, and the network access servers communicate using IP.

4. The apparatus recited in claim 1, wherein the signaling trunk and the voice trunk originate in a Common Channel Signaling telephone network.

5. The apparatus recited in claim 1, wherein the signaling trunk is a Signaling System 7 (SS7) trunk, and wherein the data network is a global, packet-switched network that operates using Internet Protocol (IP) and Transmission Control Protocol (TCP).

6. The apparatus recited in claim 1, wherein the signaling trunk is coupled to a Signal Transfer Point of the telephone network and wherein each of the network access servers is coupled to receive the voiceband information from a switch of the telephone network.

7. The apparatus recited in claim 1, wherein the signaling trunk is coupled from the signaling access server to a digital cross connect apparatus that is coupled to the telephone network, and wherein each of the network access servers is coupled by an associated voice trunk to the digital cross connect apparatus to receive the voiceband information therefrom.

8. The apparatus recited in claim 1, wherein the computer-readable medium further comprises a third sequence of instructions which, when executed by the signaling access server, cause the signaling access server to perform dial origination by carrying out the steps of:

receiving call origination information from one of the network access servers that is associated with an Internet Service Provider that is oriating a call from the data network to a called party in the telephone network who uses the Internet Service Provider for Internet access;

establishing the call originating in the data network and terminating at the called party through the telephone network;

receiving data messages from the Internet Service Provider and directed to the called party; and forwarding the data messages to the called party through the telephone network.

9. The apparatus recited in claim 1, wherein the computer-readable medium further comprises a fourth sequence of instructions which, when executed by the signaling access server, cause the signaling access server to perform access control by carrying out the steps of:

creating and storing an access control policy that specifies that the signaling access server shall block calls based upon one or more pre-defined call criteria selected from among time of day, destination, type of service, protocol used, source number, calling number, transfer status;

receiving a call offer message from the telephone network that contains a called party telephone number;

based on the called party telephone number and the access control policy, determining whether a call associated with the call offer message is allowed to enter the data network;

permitting the call associated with the call offer message to enter the data network through one of the network access severs only when the access control policy indicates that the call is allowed to enter the data network.

10. The apparatus recited in claim 1, wherein the software components further comprise a fifth sequence of instructions which, when executed by the signaling access server, cause the signaling access server to perform calling line identification blocking by carrying out the steps of:

receiving a call setup message that includes a calling line identifier information element for a call originating in the data network and directed to a called party in the telephone network;

suppressing the calling line identifier information element from the call as the call passes through the signaling access server; and directing the call to the called party in the telephone network without the calling line identifier information element.

11. An apparatus as recited in claim 1, wherein the computer-readable medium further comprises a seventh sequence of instructions which, when executed by the signaling access server, cause the signaling access server to perform calling card thresholding by carrying out the steps of:
creating and storing at the signaling access server a pre-defined policy rule that specifies that the signaling access server shall block all calls placed using a calling card if the calling card is used to place more than a specified number of calls within a specified period of time;
receiving call information for a call that is placed using the calling card;
storing a record of the call that includes a counter value that identifies the number of calls that have been placed using the calling card over a pre-determined time period;
determining whether the counter value is greater than the specified number of the policy rule;
blocking the call when the counter value is greater than the specified number of the policy rule.

12. An apparatus as recited in claim 1, wherein the computer-readable medium further comprises a seventh sequence of instructions which, when executed by the signaling access server, cause the signaling access server to perform calling card thresholding by carrying out the steps of:
creating and storing at the signaling access server one or more access control lists of network addresses;
receiving call messages associated with a call originating in the telephone network and directed to a called party in the data network;
determining that the called party has a network address in the data network that is in one of the access control lists; blocking the call from entering the data network when the called party has a network address in the data network that is in one of the access control lists.

13. An apparatus as recited in claim 1, wherein the computer-readable medium further comprises a seventh sequence of instructions which, when executed by the signaling access server, cause the signaling access server to perform destination point code blocking by carrying out the steps of:
creating and storing at the signaling access server one or more access control lists of destination point codes;
receiving call messages associated with a call originating in the data network and directed to a called party in the telephone network;
determining a destination point code of the called party;
determining that the called party has is associated with a destination point code in the telephone network that is in one of the access control lists;
blocking the call from entering the telephone network when the called party has a destination point code in the telephone network that is in one of the access control lists.

14. The apparatus recited in claim 1, further comprising:
a cross-connect apparatus logically coupled between the telephone network and both the signaling trunk and the voice trunk;
means, coupled between the signaling trunk and the signaling access server, for communicating call routing signals from the cross-connect apparatus through the signaling trunk and to the signaling access server;
wherein the software components are configured to receive call signaling messages from the means for communicating and over the control netwok, and to communicate the call signaling messages back over the control network to the network access servers.

15. An apparatus as recited in claim 1, wherein the computer-readable medium further comprises a sixth sequence of instructions which, when executed by the signaling access server, cause the signaling access server to perform originating point code screening by carrying out the steps of:
receiving one or more telephone network messages associated with a call originating in the telephone network and directed to a called party in the data network that including a translated called number and an originating point code value;
converting the originating point code value into an originally called number; and
forwarding the originally called number to the called party with the call as the call passes through the signaling access server to one of the network access servers.

16. A method of interconnecting a circuit-switched telephone network and a packet-switched data network for communication among them and that provides dial outsourcing, comprising the steps of:
receiving provisioning information from network access servers that associates each of the network access servers with one of a plurality of Internet Service Providers;
receiving a subscription profile of a caller who is originating a first call, wherein the subscription profile identifies one of the Internet Service Providers to which the caller subscribes;
based on the subscription profile, selecting one of the network access servers for carrying the first call into the data network;
establishing the first call originating in the telephone network and containing voiceband information and terminating in the data network via the selected one of the network access servers, based on call signaling information received from a signaling trunk by a signaling access server; and
wherein the method further provides call congestion management by crying out the steps of:
receiving an initial address message associated with a second call orginating in the telephone network;
receiving resource usage information from the network access servers that indicates processing load associated with the network access servers;
based on the resource usage information, selecting one of the network access servers for carrying the second call into the data network; and
establishing the second call originating in the telephone network and containg voiceband information and terminating in the data network via the selected one of the network access servers, based on call signaling information received from the signaling trunk by the signaling access server.

17. A method of interconnecting a circuit-switched telephone network and a packet-switched data network for communication among them and that provides dial outsourcing, comprising the steps of:
receiving provisioning informafion from network access servers that associates each of the network access servers with one of a plurality of Internet Service Providers;

receiving a subscription profile of a caller who is originating a first call, wherein the subscription profile identifies one of the Internet Service Providers to which the caller subscribes;

based on the subscription profile, selecting one of the network access servers for carrying the call into the data network;

establishing the fist call originating in the telephone network and containing voiceband information and terminating in the data network via the selected one of the network access servers, based on call signaling information received from the signaling trunk by the signaling access server; and wherein the method further provides dial origination by carrying out the steps of:

receiving call origination information from one of the network access servers that is associated with an Internet Service Provider that is originating a second call from the data network to a called party in the telephone network who uses the Internet Service Provider for Internet access;

establishing the second call originating in the data network and terminating at the called party through the telephone network;

receiving data messages from the Internet Service Provider and directed to the called party; and forwarding the data messages to the called party through the telephone network.

18. A method of interconnecting a circuit-switched telephone network and a packet-switched data network for communication among them and that provides dial outsourcing, comprising the steps of:

receiving provisioning information from network access servers that associates each of the network access servers with one of a plurality of Internet Service Providers;

receiving a subscription profile of a caller who is originating a first call, wherein the subscription profile identifies one of the Internet Service Providers to which the caller subscribes;

based on the subscription profile, selecting one of the network access servers for carrying the first call into the data network;

establishing the first call originating in the telephone network and containing voiceband information and terminating in the data network via the selected one of the network access servers, based on call signaling information received fiom a signaling trunk by a signaling access server;

receiving a call setup message that includes a calling line identifier information element for a second call originating in the data network and directed to a called party in the telephone network;

suppressing the calling line identifier information element from the second call as the second call passes through the singaling access server; and directing the second call to the called party in the telephone network without the calling line identifier information element.

19. A method of interconnecting a circuit-switched telephone network and a packet-switched data network for communication among them and that provides dial outsourcing, comprising the steps of:

receiving provisioning information fom network access servers that associates each of the network access servers with one of a plurality of Internet Service Providers;

receiving a subscription profile of a caller who is originating a first call, wherein the subscription profile identifies one of the Internet Service Providers to which the caller subscribes;

based on the subscription profile, selecting one of the network access servers fbr carrying the first call into the data network; and establishing the first call originating in the telephone network and containing voiceband information and terminating in the data network via the selected one of the network access servers, based on call signaling information received from a signaling trunk by a signaling access server;

receiving one or more telephone network messages associated with a second call originating in the telephone network and directed to a called party in the data network that includes a translated called number and an originating point code value;

converting the originating point code value into an originally called number; and forwarding the originally called number to the called party with the second call as the second call passes through the signaling access server to one of the network access servers.

* * * * *

UNITED STATES PATENT AND TRADEMARK OFFICE
CERTIFICATE OF CORRECTION

PATENT NO. : 6,333,931 B1
DATED : December 25, 2001
INVENTOR(S) : LaPier et al.

It is certified that error appears in the above-identified patent and that said Letters Patent is hereby corrected as shown below:

Column 63,
Line 10, replace "voice of" with -- voice trunk of --.
Line 13, replace "contol" with -- control --.
Line 20, replace "perforn" with -- perform --.
Line 25, replace "Intermet" with -- Internet --.

Column 68,
Line 27, replace "fbr" with -- for --.

Signed and Sealed this

Thirtieth Day of April, 2002

Attest:

Attesting Officer

JAMES E. ROGAN
*Director of the United States Patent and Trademark Office*